US008131723B2

(12) United States Patent
Sim-Tang

(10) Patent No.: US 8,131,723 B2
(45) Date of Patent: Mar. 6, 2012

(54) RECOVERING A FILE SYSTEM TO ANY POINT-IN-TIME IN THE PAST WITH GUARANTEED STRUCTURE, CONTENT CONSISTENCY AND INTEGRITY

(75) Inventor: Siew Yong Sim-Tang, Saratoga, CA (US)

(73) Assignee: Quest Software, Inc., Aliso Viejo, CA (US)

( * ) Notice: Subject to any disclaimer, the term of this patent is extended or adjusted under 35 U.S.C. 154(b) by 356 days.

(21) Appl. No.: 12/059,505

(22) Filed: Mar. 31, 2008

(65) Prior Publication Data
US 2008/0256138 A1 Oct. 16, 2008

Related U.S. Application Data

(60) Provisional application No. 60/909,098, filed on Mar. 30, 2007.

(51) Int. Cl.
*G06F 7/00* (2006.01)
(52) U.S. Cl. ...................................... 707/737
(58) Field of Classification Search .................. None
See application file for complete search history.

(56) References Cited

U.S. PATENT DOCUMENTS

| 3,555,184 A | 1/1971 | Townley |
| 3,555,195 A | 1/1971 | Rester et al. |
| 3,555,204 A | 1/1971 | Braun |
| 3,555,251 A | 1/1971 | Shavit |
| 3,648,250 A | 3/1972 | Low et al. |
| 4,162,536 A | 7/1979 | Morley |
| 4,402,045 A | 8/1983 | Krol |
| 4,415,792 A | 11/1983 | Jordan |
| 4,450,556 A | 5/1984 | Boleda et al. |
| 4,451,108 A | 5/1984 | Skidmore |
| 4,455,483 A | 6/1984 | Schonhuber |
| 4,502,082 A | 2/1985 | Ragle et al. |

(Continued)

FOREIGN PATENT DOCUMENTS

WO WO-98/19262 A1 5/1998

(Continued)

OTHER PUBLICATIONS

Thomas Plagemann, Towards Middleware Services for Mobile Ad-Hoc Network Applications, May 2003,IEEE (FTDCS'03), pp. 1-7.

(Continued)

*Primary Examiner* — Truong Vo
(74) *Attorney, Agent, or Firm* — Knobbe Martens Olson & Bear, LLP

(57) ABSTRACT

A data management system (DMS) includes a continuous real-time object store that captures all real-time activities, with associated object metadata information. The DMS is capable of reintroducing any point-in-time view of data ranging from a granular object to an entire file system. A set of algorithms (for creation of a file or directory, modification of a file or directory, deletion of a file or directory, and relocation/renaming of a file or directory) are used to generate and maintain a file system history in the DMS and to ensure that a latest version of a directory always refers to a latest version of its children until the directory changed. Any point-in-time recovery is implemented using the file system history in one of various ways to provide strong individual file integrity, exact point-in-time crash consistency, and/or recovery of last version of all files in the file system.

16 Claims, 30 Drawing Sheets

U.S. PATENT DOCUMENTS

| | | |
|---|---|---|
| 4,512,020 A | 4/1985 | Krol et al. |
| 4,796,260 A | 1/1989 | Schilling et al. |
| 4,882,737 A | 11/1989 | Dzung |
| 4,916,450 A | 4/1990 | Davis |
| 4,972,474 A | 11/1990 | Sabin |
| 5,005,197 A | 4/1991 | Parsons et al. |
| 5,148,479 A | 9/1992 | Bird et al. |
| 5,177,796 A | 1/1993 | Feig et al. |
| 5,224,212 A | 6/1993 | Rosenthal et al. |
| 5,274,508 A | 12/1993 | Tan et al. |
| 5,280,584 A | 1/1994 | Caesar et al. |
| 5,287,504 A | 2/1994 | Carpenter et al. |
| 5,303,393 A | 4/1994 | Noreen et al. |
| 5,305,326 A | 4/1994 | Solomon et al. |
| 5,311,197 A | 5/1994 | Sorden et al. |
| 5,319,395 A | 6/1994 | Larky et al. |
| 5,321,699 A | 6/1994 | Endoh et al. |
| 5,363,371 A | 11/1994 | Roy et al. |
| 5,365,516 A | 11/1994 | Jandrell |
| 5,373,372 A | 12/1994 | Loewen |
| 5,377,102 A | 12/1994 | Nishiishigaki |
| 5,382,508 A | 1/1995 | Ikenoue |
| 5,386,422 A | 1/1995 | Endoh et al. |
| 5,387,994 A | 2/1995 | McCormack et al. |
| 5,388,074 A | 2/1995 | Buckenmaier |
| 5,392,209 A | 2/1995 | Eason et al. |
| 5,396,600 A | 3/1995 | Thompson et al. |
| 5,416,831 A | 5/1995 | Chewning, III et al. |
| 5,424,778 A | 6/1995 | Sugiyama et al. |
| 5,430,830 A | 7/1995 | Frank et al. |
| 5,440,686 A | 8/1995 | Dahman et al. |
| 5,469,444 A | 11/1995 | Endoh et al. |
| 5,477,492 A | 12/1995 | Ohsaki et al. |
| 5,479,654 A | 12/1995 | Squibb |
| 5,481,531 A | 1/1996 | Yamamuro |
| 5,499,512 A | 3/1996 | Jurewicz et al. |
| 5,502,491 A | 3/1996 | Sugiyama et al. |
| 5,506,965 A | 4/1996 | Naoe |
| 5,507,024 A | 4/1996 | Richards, Jr. |
| 5,511,212 A | 4/1996 | Rockoff |
| 5,526,357 A | 6/1996 | Jandrell |
| 5,537,945 A | 7/1996 | Sugihara et al. |
| 5,560,033 A | 9/1996 | Doherty et al. |
| 5,561,671 A | 10/1996 | Akiyama |
| 5,583,975 A | 12/1996 | Naka et al. |
| 5,602,638 A | 2/1997 | Boulware |
| 5,606,601 A | 2/1997 | Witzman et al. |
| 5,640,159 A | 6/1997 | Furlan et al. |
| 5,644,763 A | 7/1997 | Roy |
| 5,651,129 A | 7/1997 | Yokote et al. |
| 5,657,398 A | 8/1997 | Guilak |
| 5,678,042 A | 10/1997 | Pisello et al. |
| 5,684,536 A | 11/1997 | Sugiyama et al. |
| 5,684,693 A | 11/1997 | Li |
| 5,684,774 A | 11/1997 | Yamamuro |
| 5,724,241 A | 3/1998 | Wood et al. |
| 5,729,743 A | 3/1998 | Squibb |
| 5,737,399 A | 4/1998 | Witzman et al. |
| 5,742,509 A | 4/1998 | Goldberg et al. |
| 5,742,915 A | 4/1998 | Stafford |
| 5,754,772 A | 5/1998 | Leaf |
| 5,764,691 A | 6/1998 | Hennedy et al. |
| 5,768,159 A | 6/1998 | Belkadi et al. |
| 5,778,370 A | 7/1998 | Emerson |
| 5,781,612 A | 7/1998 | Choi et al. |
| 5,784,366 A | 7/1998 | Apelewicz |
| 5,794,252 A | 8/1998 | Bailey et al. |
| 5,805,155 A | 9/1998 | Allibhoy et al. |
| 5,812,130 A | 9/1998 | Van Huben et al. |
| RE35,920 E | 10/1998 | Sorden et al. |
| 5,819,020 A | 10/1998 | Beeler, Jr. |
| 5,822,749 A | 10/1998 | Agarwal |
| 5,826,265 A | 10/1998 | Van Huben et al. |
| 5,831,903 A | 11/1998 | Ohuchi et al. |
| 5,841,717 A | 11/1998 | Yamaguchi |
| 5,841,771 A | 11/1998 | Irwin et al. |
| 5,848,072 A | 12/1998 | Prill et al. |
| 5,854,834 A | 12/1998 | Gottlieb et al. |
| 5,862,136 A | 1/1999 | Irwin |
| 5,864,875 A | 1/1999 | Van Huben et al. |
| 5,877,742 A | 3/1999 | Klink |
| 5,878,408 A | 3/1999 | Van Huben et al. |
| 5,893,119 A | 4/1999 | Squibb |
| 5,894,494 A | 4/1999 | Davidovici |
| 5,909,435 A | 6/1999 | Apelewicz |
| 5,917,429 A | 6/1999 | Otis, Jr. et al. |
| 5,918,248 A | 6/1999 | Newell et al. |
| 5,920,867 A | 7/1999 | Van Huben et al. |
| 5,920,873 A | 7/1999 | Van Huben et al. |
| 5,928,327 A | 7/1999 | Wang et al. |
| 5,930,732 A | 7/1999 | Domanik et al. |
| 5,930,762 A | 7/1999 | Masch |
| 5,931,928 A | 8/1999 | Brennan et al. |
| 5,937,168 A | 8/1999 | Anderson et al. |
| 5,940,823 A | 8/1999 | Schreiber et al. |
| 5,950,201 A | 9/1999 | Van Huben et al. |
| 5,953,729 A | 9/1999 | Cabrera et al. |
| 5,958,010 A | 9/1999 | Agarwal et al. |
| 5,966,707 A | 10/1999 | Van Huben et al. |
| 5,974,563 A | 10/1999 | Beeler, Jr. |
| 5,980,096 A | 11/1999 | Thalhammer-Reyero |
| 5,999,562 A | 12/1999 | Hennedy et al. |
| 6,005,846 A | 12/1999 | Best et al. |
| 6,005,860 A | 12/1999 | Anderson et al. |
| 6,031,848 A | 2/2000 | Brennan |
| 6,035,297 A | 3/2000 | Van Huben et al. |
| 6,047,323 A | 4/2000 | Krause |
| 6,065,018 A | 5/2000 | Beier et al. |
| 6,072,185 A | 6/2000 | Arai et al. |
| 6,088,693 A | 7/2000 | Van Huben et al. |
| 6,094,654 A | 7/2000 | Van Huben et al. |
| 6,108,318 A | 8/2000 | Kolev et al. |
| 6,108,410 A | 8/2000 | Reding et al. |
| 6,154,847 A | 11/2000 | Schofield et al. |
| 6,158,019 A | 12/2000 | Squibb |
| 6,163,856 A | 12/2000 | Dion et al. |
| 6,178,121 B1 | 1/2001 | Maruyama |
| 6,181,609 B1 | 1/2001 | Muraoka |
| 6,189,016 B1 | 2/2001 | Cabrera et al. |
| 6,237,122 B1 | 5/2001 | Maki |
| 6,243,348 B1 | 6/2001 | Goodberlet |
| 6,249,824 B1 | 6/2001 | Henrichs |
| 6,366,926 B1 | 4/2002 | Pohlmann et al. |
| 6,366,988 B1 | 4/2002 | Skiba et al. |
| 6,389,427 B1 | 5/2002 | Faulkner |
| 6,393,582 B1 | 5/2002 | Klecka et al. |
| 6,397,242 B1 | 5/2002 | Devine et al. |
| 6,446,136 B1 | 9/2002 | Pohlmann et al. |
| 6,460,055 B1 | 10/2002 | Midgley et al. |
| 6,463,565 B1 | 10/2002 | Kelly et al. |
| 6,487,561 B1 | 11/2002 | Ofek et al. |
| 6,487,581 B1 | 11/2002 | Spence et al. |
| 6,496,944 B1 | 12/2002 | Hsiao et al. |
| 6,502,133 B1 | 12/2002 | Baulier et al. |
| 6,519,612 B1 | 2/2003 | Howard et al. |
| 6,526,418 B1 | 2/2003 | Midgley et al. |
| 6,549,916 B1 | 4/2003 | Sedlar |
| 6,611,867 B1 | 8/2003 | Bowman-Amuah |
| 6,625,623 B1 | 9/2003 | Midgley et al. |
| 6,629,109 B1 | 9/2003 | Koshisaka |
| 6,670,974 B1 | 12/2003 | McKnight et al. |
| RE38,410 E | 1/2004 | Hersch et al. |
| 6,751,753 B2 | 6/2004 | Nguyen et al. |
| 6,779,003 B1 | 8/2004 | Midgley et al. |
| 6,785,786 B1 | 8/2004 | Gold et al. |
| 6,816,872 B1 | 11/2004 | Squibb |
| 6,823,336 B1 | 11/2004 | Srinivasan et al. |
| 6,826,711 B2 | 11/2004 | Moulton et al. |
| 6,836,756 B1 | 12/2004 | Gruber |
| 6,839,721 B2 | 1/2005 | Schwols |
| 6,839,740 B1 | 1/2005 | Kiselev |
| 6,847,984 B1 | 1/2005 | Midgley et al. |
| 6,907,551 B2 | 6/2005 | Katagiri et al. |
| 6,993,706 B2 | 1/2006 | Cook |
| 7,028,078 B1 | 4/2006 | Sharma et al. |
| 7,039,663 B1 | 5/2006 | Federwisch et al. |
| 7,054,913 B1 | 5/2006 | Kiselev |

| | | |
|---|---|---|
| 7,069,579 B2 | 6/2006 | Delpuch |
| 7,080,081 B2 | 7/2006 | Agarwal et al. |
| 7,092,396 B2 | 8/2006 | Lee et al. |
| 7,096,392 B2 | 8/2006 | Sim-Tang |
| 7,200,233 B1 | 4/2007 | Keller et al. |
| 7,206,805 B1 | 4/2007 | McLaughlin, Jr. |
| 7,207,224 B2 | 4/2007 | Rutt et al. |
| 7,272,613 B2 | 9/2007 | Sim et al. |
| 7,290,056 B1 | 10/2007 | McLaughlin, Jr. |
| 7,325,159 B2 | 1/2008 | Stager et al. |
| 7,363,549 B2 | 4/2008 | Sim-Tang |
| 7,519,870 B1 | 4/2009 | Sim-Tang |
| 7,565,661 B2 | 7/2009 | Sim-Tang |
| 2001/0029520 A1 | 10/2001 | Miyazaki et al. |
| 2001/0043522 A1 | 11/2001 | Park |
| 2002/0022982 A1 | 2/2002 | Cooperstone et al. |
| 2002/0091722 A1 | 7/2002 | Gupta et al. |
| 2002/0107860 A1 | 8/2002 | Gobeille et al. |
| 2002/0144177 A1 | 10/2002 | Kondo et al. |
| 2002/0147807 A1 | 10/2002 | Raguseo |
| 2002/0172222 A1 | 11/2002 | Ullmann et al. |
| 2002/0178397 A1 | 11/2002 | Ueno et al. |
| 2002/0199152 A1 | 12/2002 | Garney et al. |
| 2003/0009552 A1 | 1/2003 | Benfield et al. |
| 2003/0051026 A1 | 3/2003 | Carter et al. |
| 2003/0088372 A1 | 5/2003 | Caulfield |
| 2003/0117916 A1 | 6/2003 | Makela et al. |
| 2003/0200098 A1 | 10/2003 | Geipel et al. |
| 2003/0204515 A1 | 10/2003 | Shadmon et al. |
| 2004/0010544 A1 | 1/2004 | Slater et al. |
| 2004/0036716 A1 | 2/2004 | Jordahl |
| 2004/0047354 A1 | 3/2004 | Slater et al. |
| 2004/0080504 A1 | 4/2004 | Salesky et al. |
| 2004/0098458 A1 | 5/2004 | Husain et al. |
| 2004/0098717 A1 | 5/2004 | Husain et al. |
| 2004/0098728 A1 | 5/2004 | Husain et al. |
| 2004/0098729 A1 | 5/2004 | Husain et al. |
| 2004/0117715 A1 | 6/2004 | Ha et al. |
| 2004/0193594 A1 | 9/2004 | Moore et al. |
| 2004/0199486 A1 | 10/2004 | Gopinath et al. |
| 2004/0250212 A1 | 12/2004 | Fish |
| 2005/0001911 A1 | 1/2005 | Suzuki |
| 2005/0021690 A1 | 1/2005 | Peddada |
| 2005/0076066 A1 | 4/2005 | Stakutis et al. |
| 2005/0166179 A1 | 7/2005 | Vronay et al. |
| 2005/0251540 A1 | 11/2005 | Sim-Tang |
| 2005/0262097 A1* | 11/2005 | Sim-Tang et al. ............... 707/10 |
| 2005/0286440 A1 | 12/2005 | Strutt et al. |
| 2006/0020586 A1 | 1/2006 | Prompt et al. |
| 2006/0026220 A1 | 2/2006 | Margolus |
| 2006/0050970 A1 | 3/2006 | Gunatilake |
| 2006/0064416 A1 | 3/2006 | Sim-Tang |
| 2006/0101384 A1 | 5/2006 | Sim-Tang et al. |
| 2006/0130002 A1 | 6/2006 | Hirayama et al. |
| 2006/0137024 A1 | 6/2006 | Kim et al. |
| 2006/0236149 A1 | 10/2006 | Nguyen et al. |
| 2006/0259820 A1 | 11/2006 | Swoboda |
| 2006/0278004 A1 | 12/2006 | Rutt et al. |
| 2007/0067278 A1 | 3/2007 | Borodziewicz et al. |
| 2007/0094312 A1 | 4/2007 | Sim-Tang |
| 2007/0168692 A1 | 7/2007 | Quintiliano |
| 2007/0214191 A1 | 9/2007 | Chandrasekaran |
| 2010/0146004 A1 | 6/2010 | Sim-Tang |

FOREIGN PATENT DOCUMENTS

| | | |
|---|---|---|
| WO | WO-02/25443 A1 | 3/2002 |
| WO | WO-03060774 A1 | 7/2003 |

OTHER PUBLICATIONS

U.S. Appl. No. 12/696,691, Sim-Tang.
U.S. Appl. No. 12/488,657, Sim-Tang.
U.S. Appl. No. 10/862,971, Sim-Tang.
U.S. Appl. No. 10/862,971.
U.S. Appl. No. 11/185,168, Sim-Tang.
U.S. Appl. No. 11/185,313, Siew Yong Sim-Tang.
U.S. Appl. No. 12/099,837, Sim-Tang, Siew Yong.
Housel et al. "WebExpress: A client/intercept based system for optimizing Web browsing in a wireless environment", Mobile Network and Applications, vol. 3, pp. 419-431, 1998, Baltzer Science Publishers.
Psounis, "Class-based Delta-encoding: A Scalable Scheme for Caching Dynamic Web Content", Proceedings of the 22nd International Conference on Distributed Computing Systems Workshops, 2002 IEEE (pp. 1-7).
Microsoft Windows Storage Server 2003, NSI Software, "Improving Business Continuity Using Windows Storage Server 2003", White Paper, Oct. 2003, pp. 1-15.
Burton H. Bloom, Space/Time Trade-offs in Hash Coding with Allowable Errors, Communications of the ACM, vol. 13/No. 7/Jul. 1970, pp. 422-426.
Beausoliel, Rob, "International Search Report" for PCT/US05/15651 as mailed Sep. 29, 2005. (1 page).
Abel-Jalil, Neveen, "International Search Report" for PCT/US05/32958 as mailed Jul. 8, 2008. (1 page).
Thomson, William, "International Search Report" for PCT/US05/39709 as mailed Oct. 16, 2007. (1 page).
Vo, Tim, "International Search Report" for PCT/US05/15662 as mailed Feb. 1, 2008. (2 pages).
Zhen, Li B., "International Search Report" for PCT/US05/15653 as mailed Nov. 30, 2006. (3 pages).
U.S. Appl. No. 12/901,824, Siew Yong Sim-Tang.
U.S. Appl. No. 12/901,888, Siew Yong Sim-Tang.
U.S. Appl. No. 12/845,215, Sim-Tang.

* cited by examiner

DATA STRUCTURE OF A SIMPLE OBJECT INSTANCE

AN EXAMPLE OF A DIRECTORY OBJECT INSTANCE

AN EXAMPLE OF A FILE OBJECT INSTANCE

AN EXAMPLE OF A FILE SYSTEM HISTORY IN THE DMS

A SAMPLE STARTING POINT OF A FILE SYSTEM HISTORY IN THE DMS

FIG. 10    The DMS process for the Creation of a new File or Directory

CREATE A NEW FILE OBJECT IN THE DMS

EXAMPLE: CREATE "fo3"

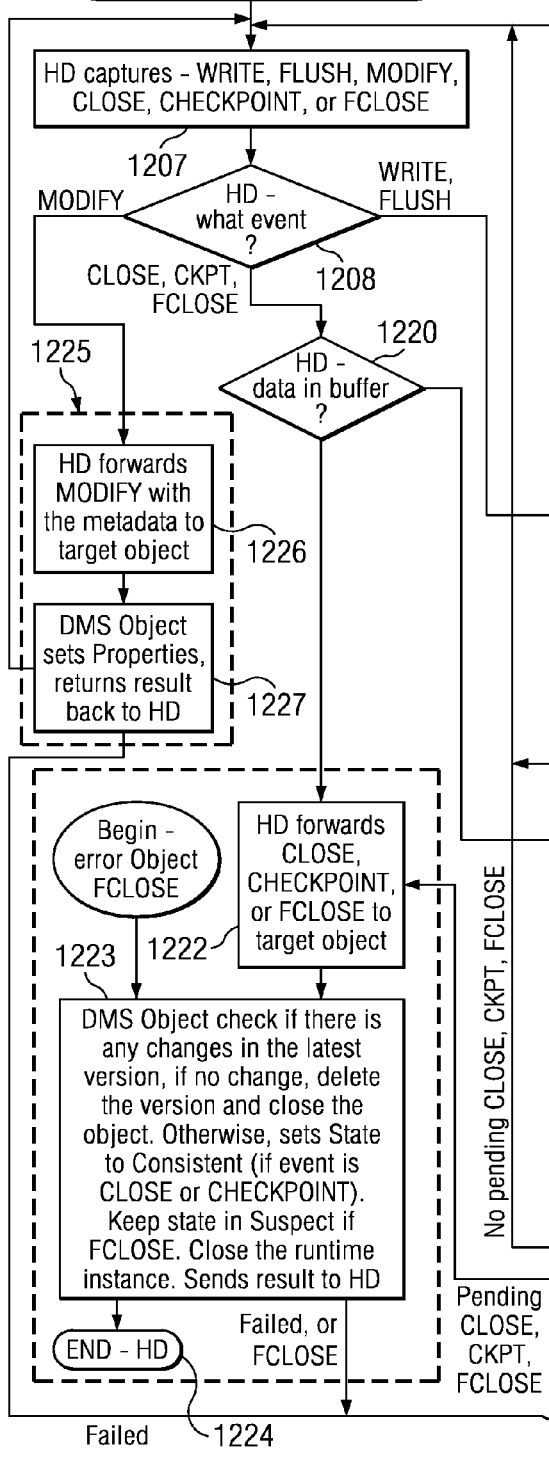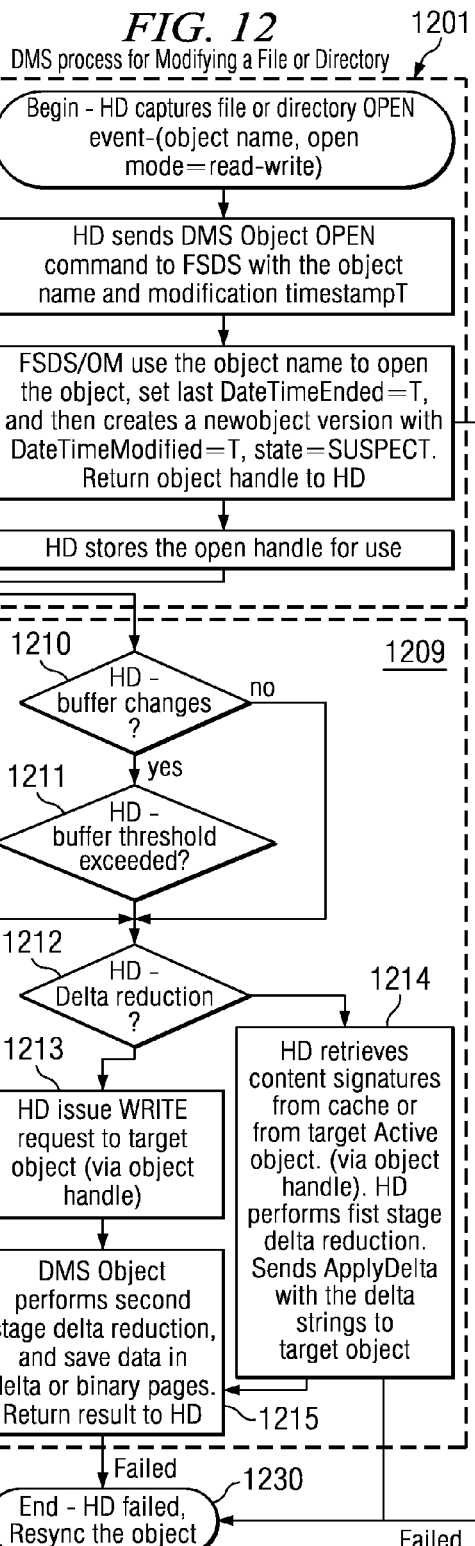
FIG. 12 — DMS process for Modifying a File or Directory

MODIFYING A DIRECTORY OBJECT IN THE DMS OBJECT STORE

MODIFYING A FILE OBJECT IN
THE DMS OBJECT STORE

DMS process for the Deleting a File or Directory object

DELETING A FILE OBJECT IN THE DMS OBJECT STORE

EXAMPLE: DELETE "fo1". NOTE THAT DELETION OF A DIRECTORY INVOLVES TRAVERSING ALL ITS CHILDREN AND TERMINATING ALL OF THEM BY SETTING DateTimeTerminated AND DateTimeEnded ACCORDINGLY.

DMS process for the renaming or relocating a File or Directory object

RENAMING A FILE OBJECT IN THE DMS OBJECT STORE (PARENT DOES NOT TRACK CHILD NAME)

EXAMPLE: RENAME "fo3" TO "foz"

RELOCATING A FILE OBJECT IN THE DMS OBJECT STORE (MODEL 2 – VERSIONED BY OBJECT PATH)

SAMPLE DMS FILE SYSTEM OBJECT STORE (PRIOR TO RELOCATING Dir-4 FROM Dir-2 TO Dir-3)

RELOCATING DIRECTORY OBJECT BASED ON VERSIONED BY OBJECT PATH MODEL

«RECOVERING A FILE SYSTEM TO ANY POINT-IN-TIME IN THE PAST WITH GUARANTEED STRUCTURE, CONTENT CONSISTENCY AND INTEGRITY

This application is based on and claims priority to Ser. No. 60/909,098, filed Mar. 30, 2007.

RELATED APPLICATIONS

This application is related to the following commonly-owned applications:

Ser. No. 10/841,398, filed May 7, 2004, titled "Method and system for automated, no downtime, real-time, continuous data protection,"

Ser. No. 10/842,286, filed May 10, 2004, titled "Method and system for real-time event journaling to provide enterprise data services,"

Ser. No. 10/863,117, filed Jun. 8, 2004, titled "Method and system for no downtime, real-time, continuous data protection,"

Ser. No. 10/862,971, filed Jun. 8, 2004, titled "Method and system for no downtime, resynchronization for real-time, continuous data protection,"

Ser. No. 11/185,313, filed Jul. 20, 2005, titled "Method and system for virtual on-demand recovery for real-time, continuous data protection," and Ser. No. 10/943,541, filed Sep. 17, 2004, titled "Method and system for data protection."

Ser. No. 11/638,253, filed Apr. 26, 2007, titled "Method and system for managing real-time data history of a file system."

BACKGROUND OF THE RELATED ART

Today's legacy data protection and recovery solutions are highly fragmented across a wide variety of applications, systems, and storage models. The overhead and data management maze that existing approaches bring to the network, storage, tape, and application infrastructure has caused increasing expenditures with little tangible returns for the enterprise. Worse, manual recovery techniques compound the problem with the same issues that cause downtime in the first place—human errors and process issues constitute 80% of unplanned downtime.

One recently-introduced technique for addressing the complex problem of providing heterogeneous, enterprise-wide data management is illustrated in FIG. 1. FIG. 1 illustrates a representative enterprise 100 in which a data management system (DMS) is implemented to provide enterprise data protection. A commercial version of this architecture is available from Asempra Technologies, Inc., of Sunnyvale, Calif. In this illustrative example, an enterprise 100 comprises a primary data tier 102 and a secondary data tier 104 distributed over IP-based wide area networks 106 and 108. Wide area network 106 interconnects two primary data centers 110 and 112, and wide area network 108 interconnects a regional or satellite office 114 to the rest of the enterprise. The primary data tier 102 comprises application servers 116 running various applications such as databases, email servers, file servers, and the like, together with associated primary storage 118 (e.g., direct attached storage (DAS), network attached storage (NAS), storage area network (SAN)). The secondary data tier 104 typically comprises one or more data management server nodes, and secondary storage 120, which may be DAS, NAS, and SAN. The secondary storage may be serial ATA interconnection through SCSI, Fibre Channel (FC or the like), or iSCSI. The data management server nodes create a logical layer that offers object virtualization and protected data storage. The secondary data tier is interconnected to the primary data tier, preferably through one or more host drivers to provide real-time data services. Data management policies 126 are implemented across the secondary storage in a well-known manner. A similar architecture is provided in data center 112. In this example, the regional office 114 does not have its own secondary storage, but relies instead on the facilities in the primary data centers.

As described in co-pending application Ser. No. 10/841, 398, the DMS system associates a "host driver" 128 with one or more of the application(s) running in the application servers 116 to transparently and efficiently capture the real-time, continuous history of all (or substantially all) transactions and changes to data associated with such application(s) across the enterprise network. This facilitates real-time, so-called "application aware" protection, with substantially no data loss, to provide continuous data protection and other data services including, without limitation, data distribution, data replication, data copy, data access, and the like. In operation, a given host driver 128 intercepts data events between an application and its primary data storage, and it may also receive data and application events directly from the application and database. The host driver 128 may be embedded in the host application server 116 where the application resides; alternatively, the host driver is embedded in the network on the application data path. By intercepting data through the application, fine grain (but opaque) data is captured to facilitate the data service(s). To this end, and as also illustrated in FIG. 1, each of the primary data centers includes a set of one or more data management servers 130a-n that cooperate with the host drivers 128 to facilitate the data services. The DMS servers provide a distributed object storage that can be built above raw storage devices, a traditional file system, a special purpose file system, a clustered file system, a database, or the like. In this illustrative example, the data center 110 supports a first core region 130, and the data center 112 supports a second core region 132.

As described in co-pending application Ser. No. 11/123, 994, each DMS node executes an object runtime environment. This object runtime environment includes an object manager that manages the lifecycle of all the DMS objects during runtime. The object manager creates DMS objects, and the object manager saves them in the shared storage. The objects continually undergo modification as the system protects data in the enterprise's primary storage. In an illustrative embodiment, the system automatically creates a trail of objects called versions; typically, the versions do not actually exist on primary storage, outside of the data management system. The DMS manages the creation, storage, display, recovery to primary storage, deletion (automatic via policy, or manual) and the like, of these versions. The host drivers protect data into the continuous object data store. Using this architecture, data in primary storage can be recovered to any point-in-time.

BRIEF SUMMARY OF THE INVENTION

A data management method is provided for storing a real-time history of a file system, or a component thereof, such as a directory or a file. The real-time history is stored as an object-oriented logical representation comprising at least a set of version metadata objects, and a set of one or more links that associate given objects of the set of version metadata objects. As one or more events occur in the real-time history, the logical representation is restructured dynamically. The logical representation is useful to provide any point-in-time reconstruction of the file system component on an as-needed basis.

A data management system (DMS) includes a continuous real-time object store that captures all real-time activities, with associated object metadata information. The DMS is capable of reintroducing any point-in-time view of data ranging from a granular object to an entire file system. A set of algorithms (for creation of a file or directory, modification of a file or directory, deletion of a file or directory, and relocation/renaming of a file or directory) are used to generate and maintain a file system history in the DMS and to ensure that a latest version of a directory always refers to a latest version of its children until the directory changed. Any point-in-time recovery is implemented using the file system history in one of various ways to provide strong individual file integrity, exact point-in-time crash consistency, and/or recovery of last version of all files.

The foregoing has outlined some of the more pertinent features of the invention. These features should be construed to be merely illustrative. Many other beneficial results can be attained by applying the disclosed invention in a different manner or by modifying the invention as will be described

BRIEF DESCRIPTION OF THE DRAWINGS

For a more complete understanding of the present invention and the advantages thereof, reference is now made to the following descriptions taken in conjunction with the accompanying drawings, in which:

FIG. 12 illustrates a process flow that is implemented to modify a file or a directory in a master data source operating in data protection scenario;

FIG. 24 illustrates a directory relocation based on versioned by object instance model using FIG. 23 as the initial baseline;

FIG. 25 illustrates a directory relocation based on versioned by object path model using FIG. 23 as the initial baseline;

FIG. 26 illustrates a directory relocation based on a combination of versioned by object path and versioned by object instance, again using FIG. 23 as the initial baseline;

DETAILED DESCRIPTION

Figure 1:
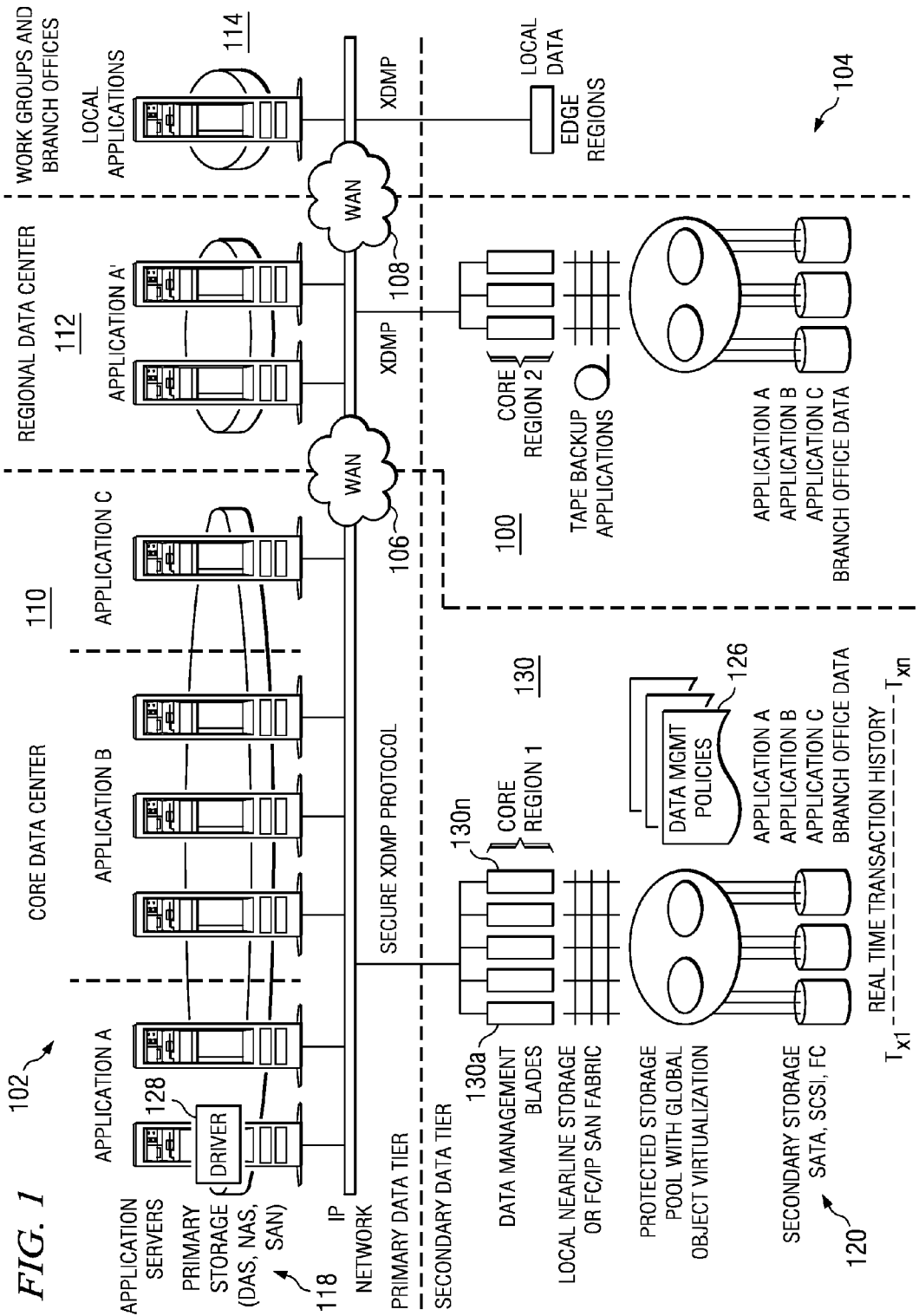
FIG. 1 is an illustrative enterprise network in which the described subject matter may be deployed.
Figure 2:
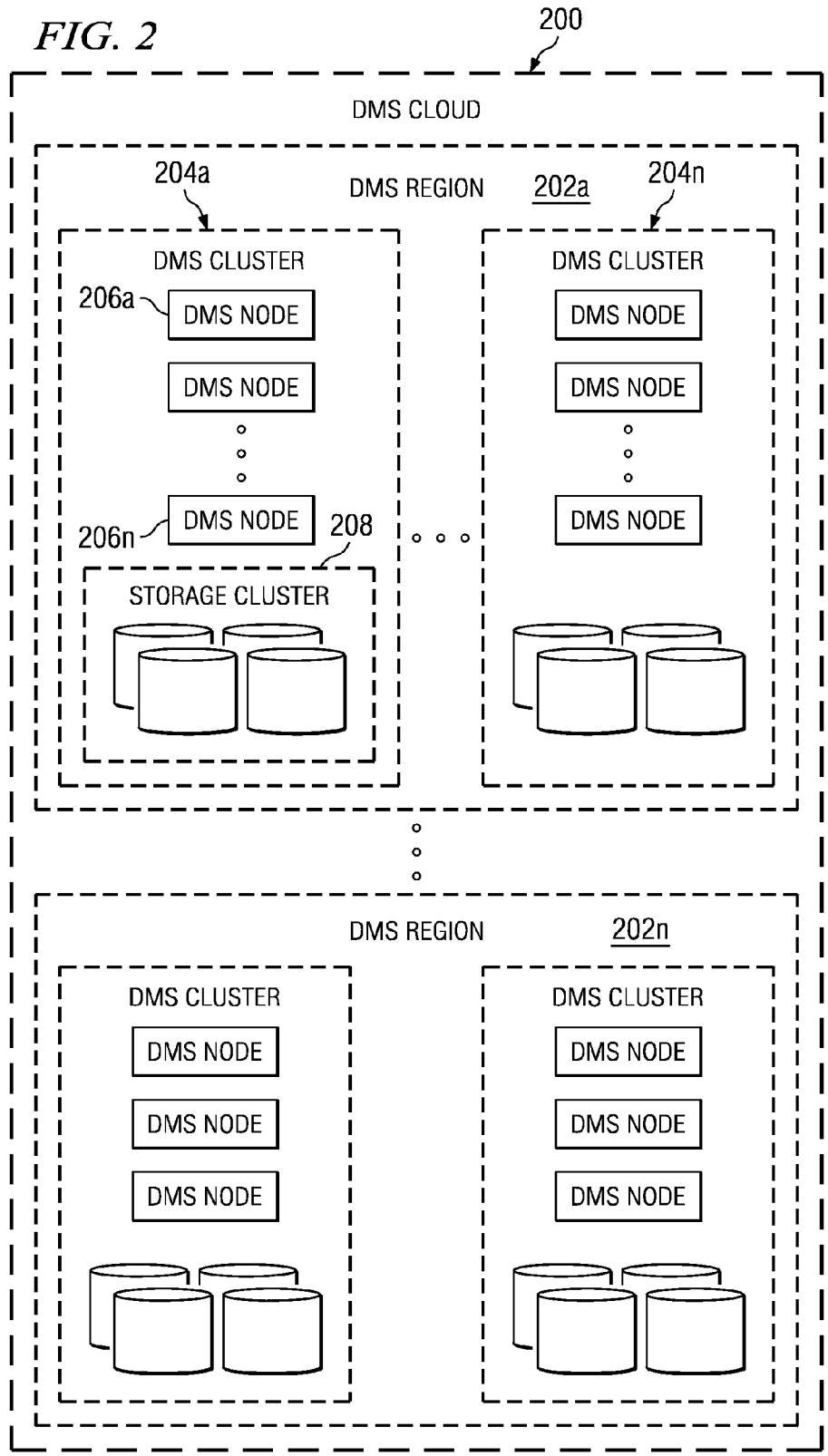
FIG. 2 is an illustration of a general data management system (DMS)

FIG. 2 illustrates a preferred hierarchical structure of a data management system 200 in which the subject matter described herein may be implemented. As illustrated, the data management system 200 comprises one or more regions 202a-n, with each region 202 comprising one or more clusters 204a-n. A given cluster 204 includes one or more nodes 206a-n and a shared storage 208 shared by the nodes 206 within the cluster 204. A given node 206 is a data management server as described above with respect to FIG. 1. Within a DMS cluster 204, preferably all the nodes 206 perform parallel access to the data in the shared storage 208. Preferably, the nodes 206 are hot swappable to enable new nodes to be added and existing nodes to be removed without causing cluster downtime. Preferably, a cluster is a tightly-coupled, share everything grouping of nodes. At a higher level, the DMS is a loosely-coupled share nothing grouping of DMS clusters. Preferably, all DMS clusters have shared knowledge of the entire network, and all clusters preferably share partial or summary information about the data that they possess. Network connections (e.g., sessions) to one DMS node in a DMS cluster may be re-directed to another DMS node in another cluster when data is not present in the first DMS cluster but may be present in the second DMS cluster. Also, new DMS clusters may be added to the DMS cloud without interfering with the operation of the existing DMS clusters. When a DMS cluster fails, its data may be accessed in another cluster transparently, and its data service responsibility may be passed on to another DMS cluster.

Figure 3:
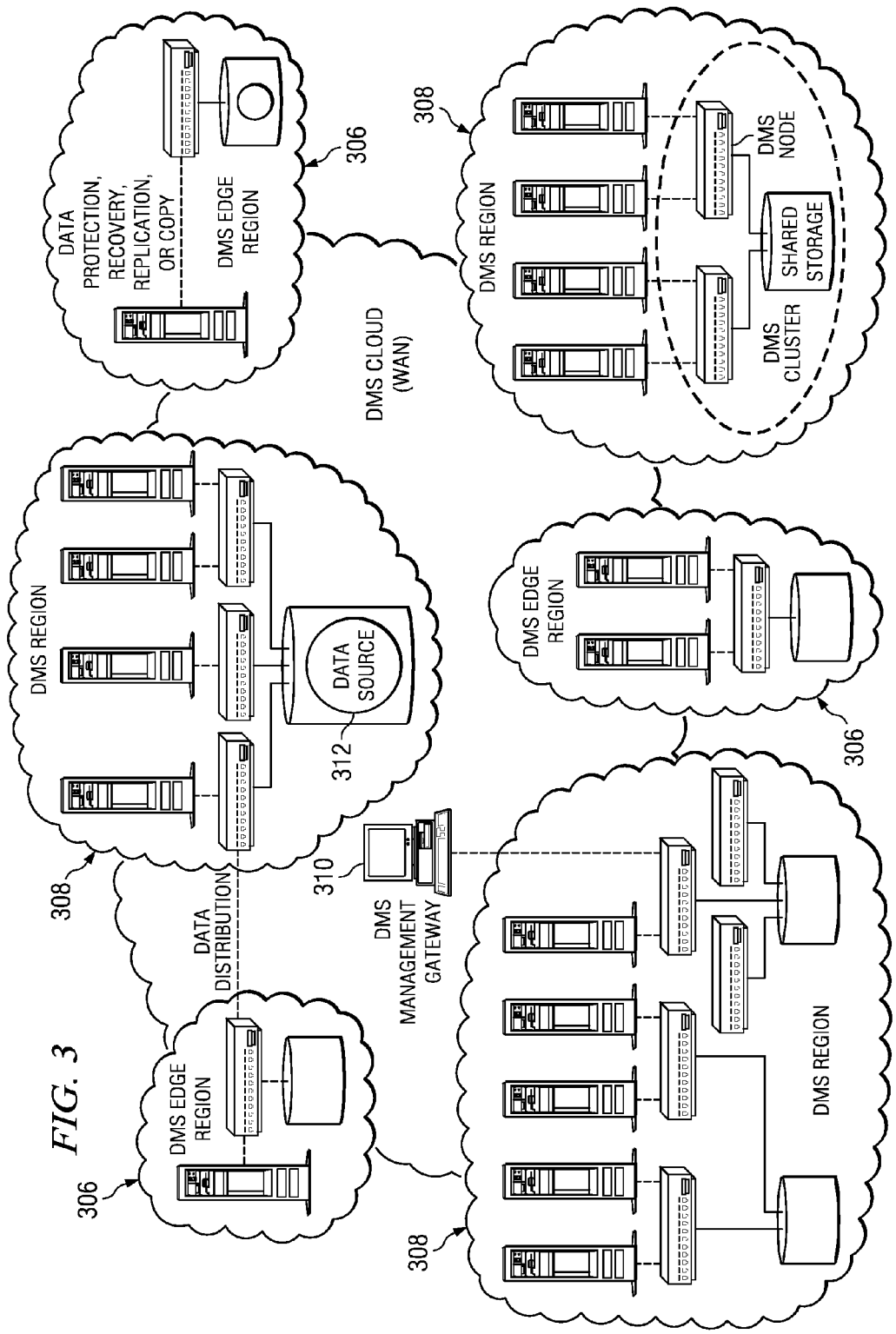
FIG. 3 illustrates the data management system (DMS) as a network of peer-to-peer DMS service nodes.

FIG. 3 illustrates the data management system (DMS) as a network (in effect, a wide area network "cloud") of peer-to-peer DMS service nodes. As discussed above with respect to FIG. 2, the DMS cloud 300 typically comprises one or more DMS regions, with each region comprising one or more DMS "clusters." In the illustrative embodiment of FIG. 3, typically there are two different types of DMS regions, in this example an "edge" region 306 and a "core" region 308. This nomenclature is not to be taken to limit the invention, of course. An edge region 306 typically is a smaller office or data center where the amount of data hosted is limited and/or where a single node DMS cluster is sufficient to provide necessary data services. Typically, core regions 308 are medium or large size data centers where one or more multi-node clusters are required or desired to provide the necessary data services. The DMS preferably also includes a management gateway 310 for controlling the system. As seen in FIG. 3, conceptually the DMS can be visualized as a set of data sources 312. A data source is a representation of a related group of fine grain data. For example, a data source may be a directory of files and subdirectory, or it may be a database, or a combination of both. A data source 312 inside a DMS cluster captures a range of history and continuous changes of, for example, an external data source in a host server. A data source may reside in one cluster, and it may replicate to other clusters or regions based on subscription rules. If a data source exists in the storage of a DMS cluster, preferably it can be accessed through any one of the DMS nodes in that cluster. If a data source does not exist in a DMS cluster, then the requesting session may be redirected to another DMS cluster that has the data; alternatively, the current DMS cluster may perform an on-demand caching to bring in the data.

As described in U.S. Ser. Nos. 10/841,398 and 11/123,994, the DMS provides real time data services, such as continuous data protection, data replication, data distribution, any-point-in-time recovery, and any-point-in-time snapshot. To support these services, preferably the DMS host driver resides in an application host or the network, monitoring and capturing application events and data changes in real time, and then processing and forwarding actual data changes, events, and metadata to a DMS node. The host driver preferably performs delta reduction (e.g., to extract byte level changes), identifies metadata changes such as access control, detects application checkpoint events, and then forwards this information as a stream to a DMS node in a DMS cluster. A DMS cluster is a group of DMS nodes that share a storage module. These nodes work as a cooperative unit. Preferably, they obey a set of access rules such as acquiring lock of different classes, and they honor the access locks of the others so as to perform parallel access to the storage module. These nodes also watch for the health of one another and when one node fails, the other nodes preferably repair any partially modified or corrupted data that may be caused by the failure, and take over the tasks of the failed node.

The DMS nodes are the entities that provides real-time data services. When providing continuous data protection and data distribution as subscriber, the nodes take incoming data streams, preferably translate the streams into an object-oriented data structure (or another structure that provides similar data associations and indices), and save the data in a storage module that is referred to herein as an object store. The object store is designed with the purpose of managing real-time continuous history. When providing data replication, data recovery, and generating a snapshot, the DMS node navigates its object store, reconstructs a desired point-in-time data object, and forms outbound data streams that are then delivered to target nodes or host machines. To provide continuous replication, once replicating a point-in-time data object, the DMS node also forwards, to a remote DMS or a remote host server, a continuous redo log of the objects (in the form of a real-time event journal). A goal of the DMS is to store fine grain and real-time data history. Thus, the DMS object store is designed to track fine grain data changes without using excessive storage. The DMS preferably also indexes by time and events all fine grain objects, application checkpoints, and metadata globally across DMS clusters. The events may include any object events such as email arrival, transaction activity, a file open, a file modification, a file close, a directory change, an application checkpoint, a system upgrade, a virus detection (such as from an external network service), a business event tag, or the like.

The DMS nodes create distributed object storage to provide the necessary real-time data management services. The objects created by the DMS nodes are sometimes referred to herein as active objects. The active objects at any moment in time may be dormant in the storage or instantiated by the DMS nodes to handle requests and to perform activities. The details of active objects are discussed in the following sections.

The distributed object store can be built above raw storage devices, a traditional file system, a special purpose file system, a clustered file system, a database, and so on. Preferably, DMS chooses to build the distributed object store over a special purpose file system for storage and access efficiency. The files in the special purpose file system and the active objects in the DMS preferably are all addressed by a (e.g., 128 bit) global unique identifier (GUID). During runtime, a GUID can be de-referenced to a physical address in a storage device. By doing so, this allows the object store to scale beyond a single storage device, such that an object (1) in a device (A) can refer to another object (2) in device (B), e.g., by referring to the GUID of object (2).

Preferably, each DMS node executes an object runtime environment. This object runtime environment includes an object manager that manages the lifecycle of all the DMS objects during runtime. The object manager creates DMS objects, namely the active objects, and the object manager saves them in the shared storage. When requested, the object manager loads an existing active object from the storage, and then routes object requests directly to the instantiated active object. Once an active object is created or loaded (instantiated) into the memory, it is responsible for executing requests routed from the object manager. The object manager may perform authentication and/or authorization before allowing any access to an active object. An active object, upon request, may update its internal information, execute an object specific program, and terminate itself from the runtime environment. Both the object manager and the active objects are responsible for acquiring shared lock as necessary so that all the nodes can have parallel access to the same objects. The object manager is also responsible for permanently removing active objects from the shared storage when requested. In a non object-oriented embodiment, an object manager may not be required. Also, while the use of an object manner is preferred, it is also possible to implement the present invention by storing the object information in a different manner while still achieving similar results, and the processes and object functions that change the information may be modified accordingly.

Preferably, an instance of an active object has a set of properties, with each property having a label and value pair. For example, an active object may have one property labeled as "name" with an associated value being "The design of a PC," and another property labeled "content" which associated value is a binary blob. A property has a value type definition, for example, the value of the "name" property is a string, and the value of the "content" property is an opaque binary chunk of data.

In the context of a traditional file system, preferably all properties beside the "content" property are classified as metadata whereas, in the DMS, preferably all properties including the "content" itself are managed as metadata. Preferably, the DMS active objects store metadata from the protected server as well as metadata generated by the DMS itself. In DMS active object point of view, all the properties are metadata, including the binary content from the external world, while binary content is just a specific property type (random access binary blob type).

A property on an active object preferably also has specific attributes such as—modifiable, modifiable-internal, readable, versionable, single-value vs multi-value, inheritable, index, mandatory, replicate-able, and the like. Some object properties, such as ObjectClass, ObjGUID, Creator, ExternalCreationDateTime, and DMSCreationDateTime do not change once the object is created, while the other properties can be modified. There are also properties, such as Version, DMSModifiedDateTime, and DMSTerminationDateTime, that are not modifiable by any external entity besides the Object Manager and the object itself.

Figure 4:
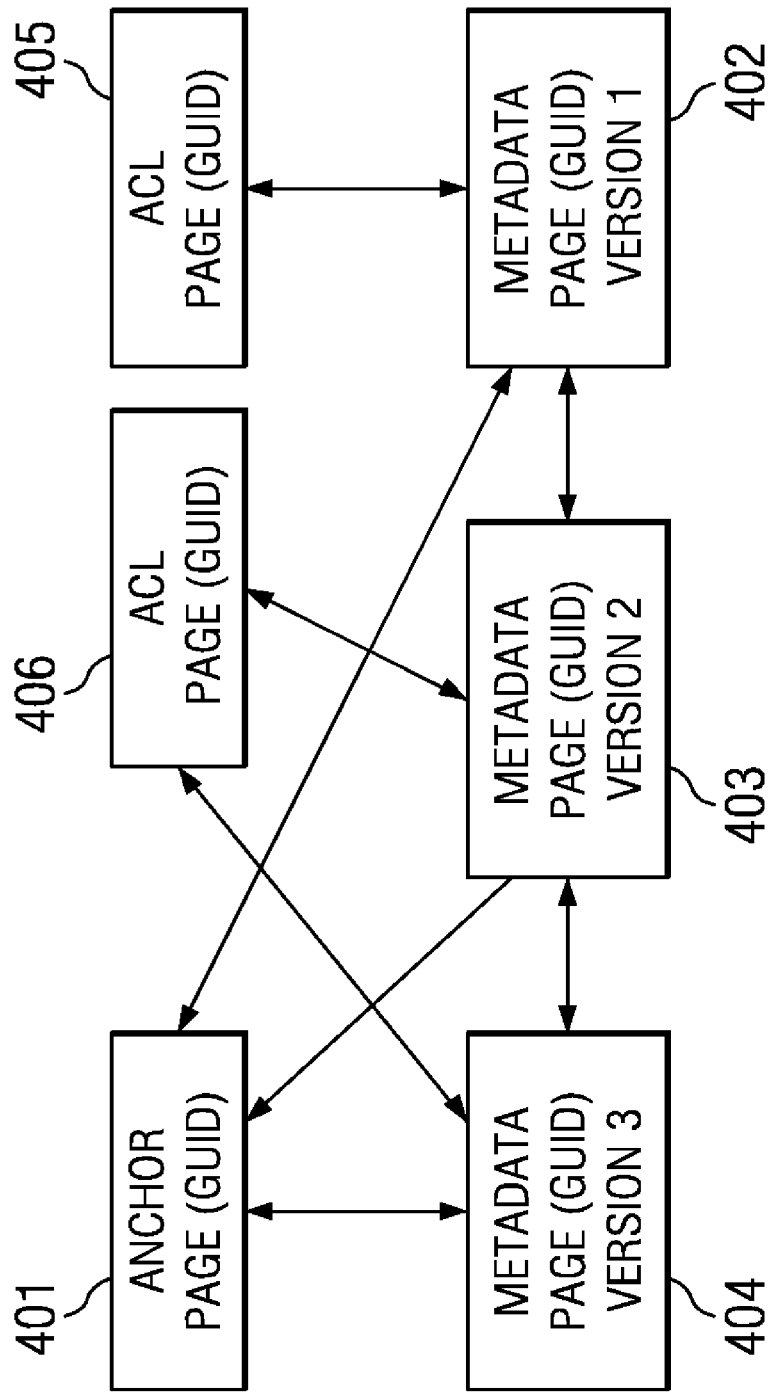
FIG. 4 illustrates an object data structure for tracking data history.

To track real-time changes, some object properties are defined as version-able. In the DMS, an object data structure for tracking data history is as shown in FIG. 4. In FIG. 4, pages are simply logical and variable size chunk of data entities. Each page is labeled with a GUID. An anchor page 401 contains the <property, value> of those metadata that are not version-able and do not change over time, while the metadata page (402, 403 and 404) of each version contains only the versioned properties. The pages refer to one another by GUID (which is an address or a link to another group of information). In addition, an object may have an access control list (ACL) that specifies who has what level of access right to the data. In the case of DMS, the ACL is stored in a separate page 405 or 406, such that multiple objects that have the same ACL can refer to the same ACL page. Multiple ACL pages can also be grouped into a sorted structure and stored in a physical storage unit. Access control lists can also be stored within the version metadata pages or as separate active objects. The object anchor and version pages can also be grouped and re-organized for storage efficiency to fit in one or multiple physical storage units. As noted above, in an alternative embodiment, these different pages can be structured in a non object-oriented way, such as by using relational database tables. As long as the information can be linked and indexed, the present invention can be realized by such different implementations.

In DMS, preferably all the anchor and version metadata pages are combined together into a variable sized file. If desired, each one of the pages can be stored in a separate file, or in raw storage blocks. When stored in files, each file is also named by GUID. There are page GUID to file GUID mappings, and file GUID to physical address mappings so that the physical data of an object can be retrieved. An object can be reference by the GUID of its anchor page, or the GUID of its version metadata page. When referred by the GUID of its version metadata page, a point-in-time object is presented.

According to another aspect of the inventive DMS, an active object has a basic set of behaviors and some specific set of behaviors that are schema dependent and may be created specifically for the class definition. These functions may be implemented readily in software code, i.e., as a set of program instructions executable in a processor. CreateObject( ) creates a physical active object in the DMS object store, while DestroyObject( ) removes the physical object completely. Once created, an active object can be instantiated by ObjectOpen( ) and it can be manipulated. ObjectClose( ) ends the execution cycle of an object. ObjectTerminate( ) terminates an object version and prevents a new version from ever be created. ObjectGet( ) and ObjectSet( ) are for accessing a single value property; the generic behavior for setting a property is to first validate the property type before allowing the update to occur. ObjectMVGetFirst( ), ObjectMVGetNext( ), ObjectMVGet( ), ObjectMVAdd( ), and ObjectMVDelete( ) are for accessing a multi-value property. A multi-value property has unique key, for example, CHILDREN may be a multi-value property, and its unique key may be the name or the GUID of the child. ObjectRead( ), ObjectWrite( ), and ObjectApply( ) are for accessing metadata of a random access binary blob type. ObjectRecordAppend( ), ObjectRecordGetFirst( ), ObjectRecordGetNext( ), and ObjectRecordGetAt( ) are for accessing metadata of sequential access binary blob type.

The above object interfaces are a representative subset of the actual basic object behaviors of the DMS. There are merely illustrative of the functional behavior of the active objects. If desired, an object class may define its own set of specific behaviors.

Figure 6:
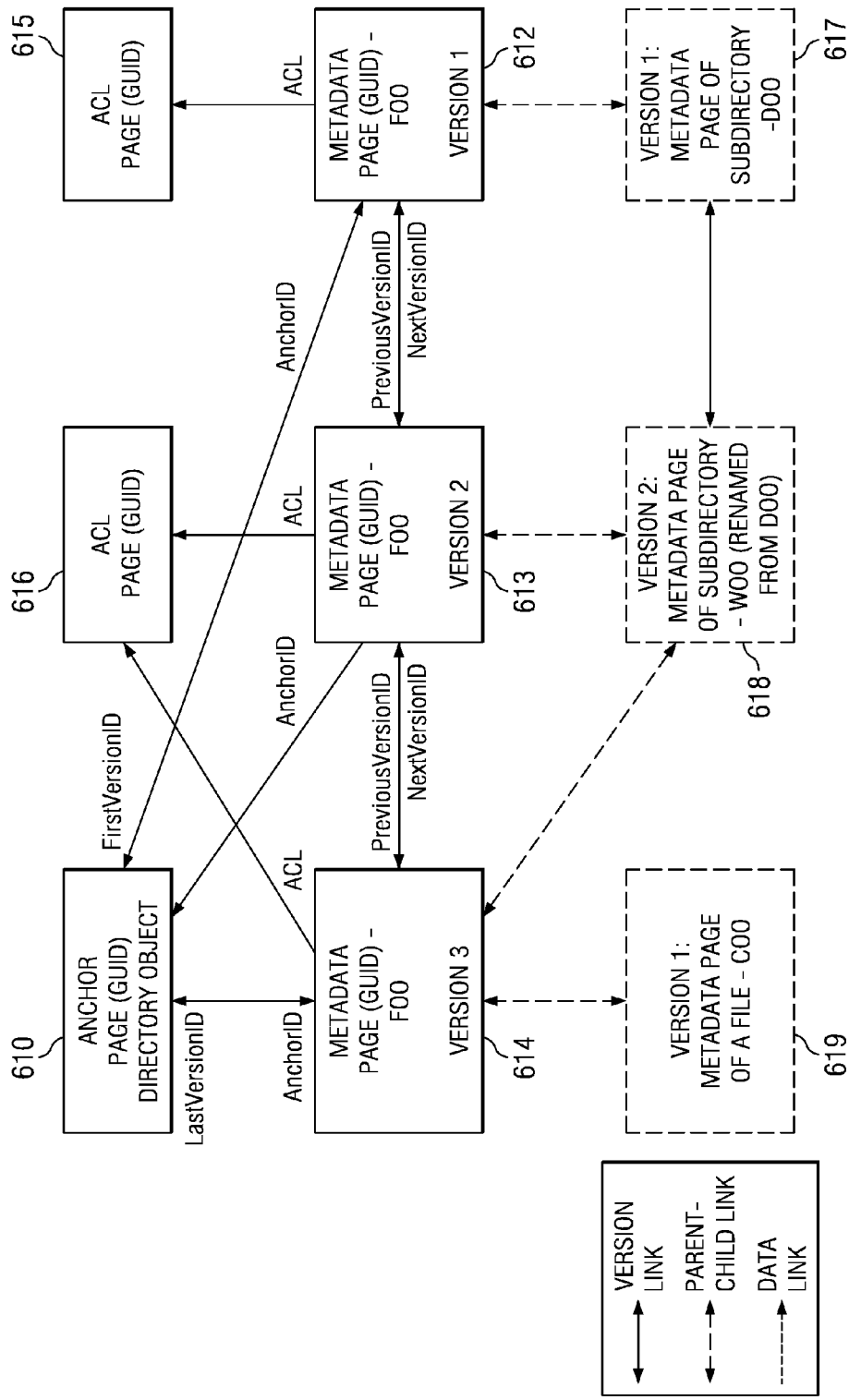
FIGS. 6-7 illustrate sample instances of a respective directory object and a file object.
Figure 7:
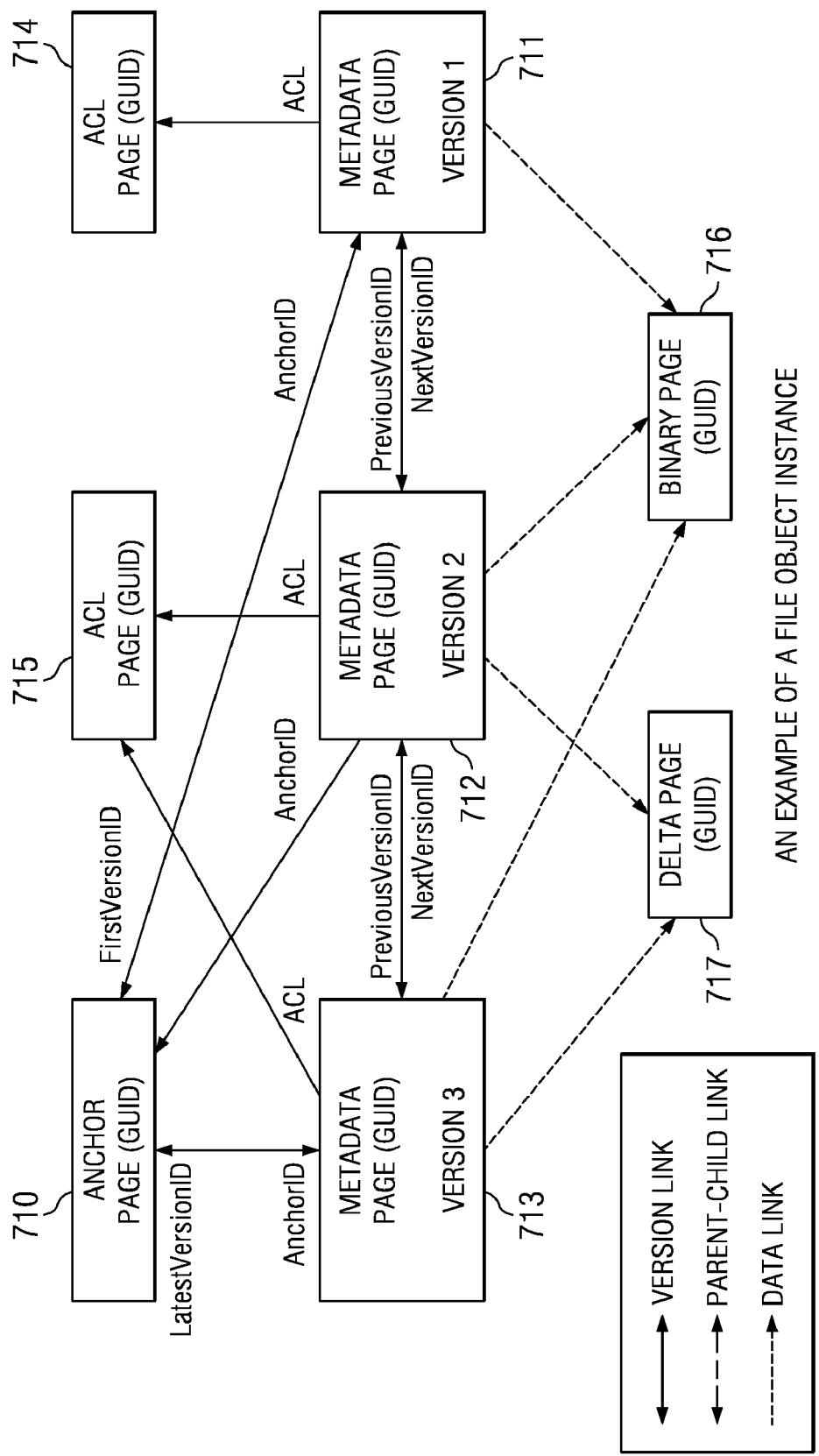

In DMS, and as will be described in more detail below, preferably there are many data source active object classes, for example, a directory object, a file object, database object, and the like. FIGS. 6-7 illustrate sample instances of a respective directory object and a file object. In particular, in FIG. 6 the directory object (FOO) has three versions. In the first version, the directory object only has the version 1 of a subdirectory object—DOO. The subdirectory object changed its name to WOO, thus a version 2 of the subdirectory object is created; as a result, a version 2 of FOO is created to link to the version 2 of the subdirectory. On version 3 of FOO, a new file under the directory FOO is created. The links, shown as dotted arrows, on the directory object FOO are stored as a "CHILDREN" property, and this property is of multi-value GUID type. These links allow the active object to build up object relationships or an object hierarchy; in this case, which is merely representative, it is parent-child relationship. This is a logical view of the directory data structure. For conservation of storage usage, the directory version pages may be combined into a table or a journal, and the table or journal may be stored in a special purpose file or a raw device block. For simplicity, the above diagram intentionally does not show the entire subdirectory and file objects (for example, the anchor pages are not shown).

FIG. 7 is an example of a DMS file object, which is an active object that tracks history, as opposed to a file in a traditional file system. The DMS uses this object structure for storing the history of a file from an external host server. As previously mentioned, in one embodiment of the invention, the DMS overlays the object structure of its object store over a special purpose file system for storage usage efficiency. Thus, the object store is a logical structure and the file system is the physical structure. In the DMS file object, preferably there is a property called "CONTENT," and this property is of the type random access binary blob. The binary value of this property type may be stored inside or outside of the metadata page. In this case, the binary data of version 1 is in a binary page 716 that has its own GUID. The changes (deltas) that are made to the file for version 2 may be stored as a sequence of forward deltas in a delta page 717. The changes (deltas) of version 3 may also be appended to the same delta page or another new delta page. Both the binary and delta pages may be stored in one special purpose file, be broken up and stored in multiple special purpose files, be stored in a database, or be stored in raw storage devices. The purpose of storing a baseline and a set of deltas is for storage efficiency, and this binary data format can be used with other embodiments (such as where the logical representation is not in object-oriented form). Also, for access efficiency, there may be a new baseline after some number of deltas. This means that, for objects with a long history, there may be multiple baselines and a set of deltas for each baseline.

Figure 8:
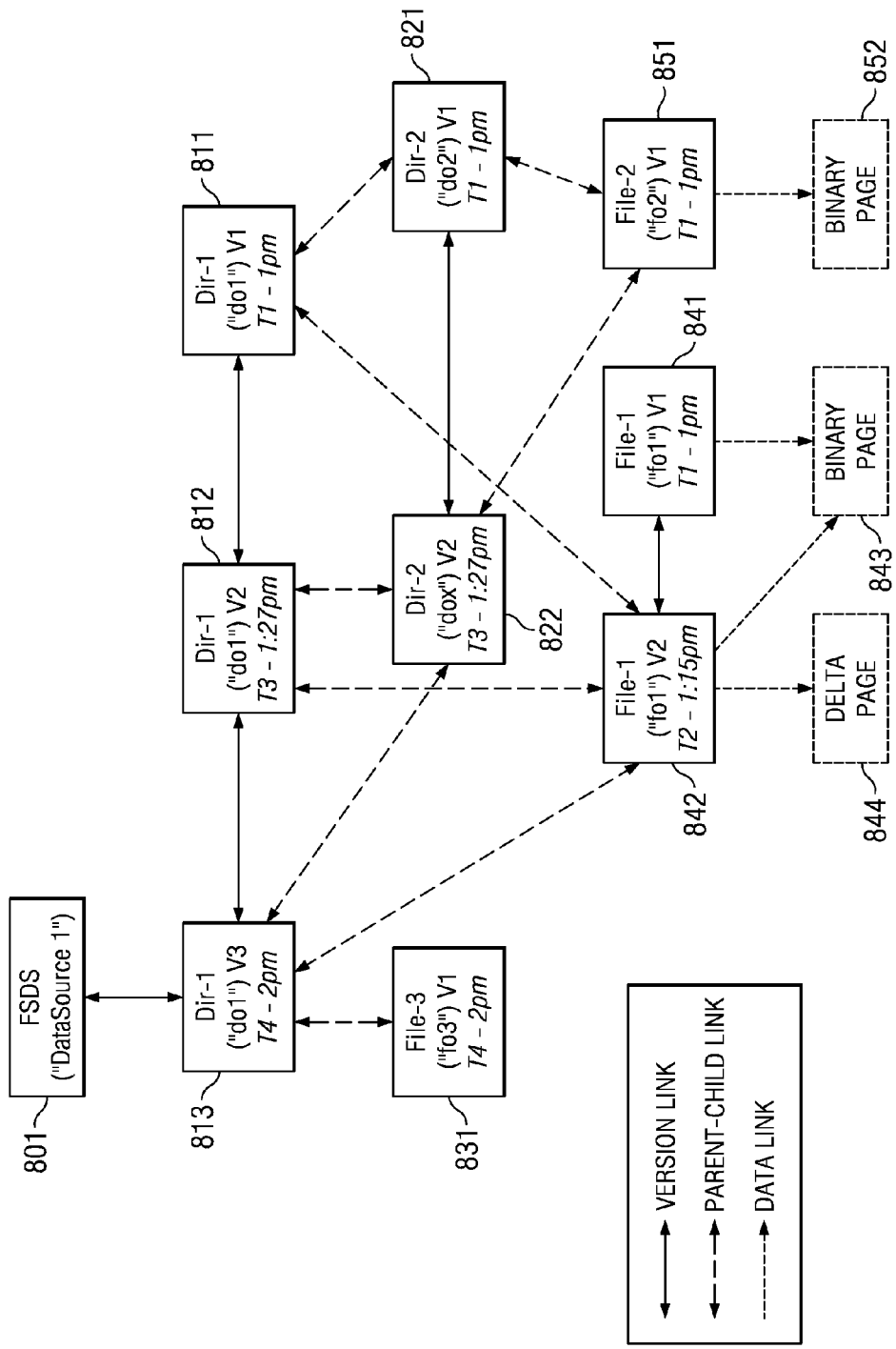
FIG. 8 shows a sample file system history captured by the DMS.

Active object binary data management is designed for managing history of random access binary blob property type. As shown in FIG. 8, the property type of random access binary blob may be stored inside a metadata page, or it may be stored outside a metadata page in both binary and delta pages. Regardless of how the random access binary data are stored, the DMS manages this data the same way, preferably through a sparse index. As mentioned earlier, for binary data management, an initial full binary content is first captured into a binary page, and then the random changes to the binary contents are stored as a sequence of forward deltas (or delta strings) in delta pages. Delta strings preferably are of specific syntax. A delta string can represent an insertion, a deletion, or a replacement to an existing binary blob. To avoid having to apply deltas in real-time when a file version is accessed, preferably a byte level index is maintained as part of the random access binary blob property. The sparse index for version 1 of a file may specify that the entire binary content of the file is in a specific binary page. The sparse index for version 2 of the same file may specify that certain byte ranges of the binary content of version 2 are in some specific locations of the binary page, while other byte ranges are in some specific locations of the delta pages.

For the active objects to manage history of sequential access binary blob such as database journal activities, a binary page of sequentially appended records structure can be used in the DMS. Records management is designed for managing property type of sequential access binary blob. There are three different types of record management namely— formatted records, unformatted records, and file object associated records. Formatted records are a sequence of well defined records, each record is of specific structure of fields, and each field has well defined data type and length. A record schema (record structure definition) is defined for formatted record property type. This type of record can be used to track SQL requests of a database history, or email activities of an email server history. A formatted record can also be used to track real-time events associated with any data object. Unformatted records are a sequence of binary record chunks, in this case, the record chunks may be appended continuously to a binary data page with or without a header that specifies the length of the record. Alternatively, records can be appended to a binary data page without a header, in which case, the boundary of each record chunk is tracked separately. The boundary of unformatted records can be tracked using formatted record management structure. This type of record can be used to track sequential binary journal of a database or sequential journal file of any application. The characteristic of this type of binary journal is that records are always appended to the end and never override previous records. File object associated records are sequences of meta-information containing binary data updates to an associated file object. A file object associated record is used to track the location and length of each modification to a file object. Besides tracking the file modifications, a file object associated record can also be used to track checkpoints that occur with respect to the file.

Once an object schema is created, an active object instance can be created from the schema. The active object instance has the defined metadata and behavior. As in any object-oriented system, an object schema may be defined based on another object schema so that metadata and behaviors can be inherited, or so that coded functions can be reused. In DMS, a generic object is clsObject, which defines basic metadata such as name, creation date and time, creator, modification data and time, and so on. It also defines the basic object behavior. Preferably, other object schemas are defined based on clsObject (i.e., they inherit from clsObject). The object inheritance feature is an advantage of the object-oriented embodiment, however, it is not a limitation of the invention.

Figure 5:
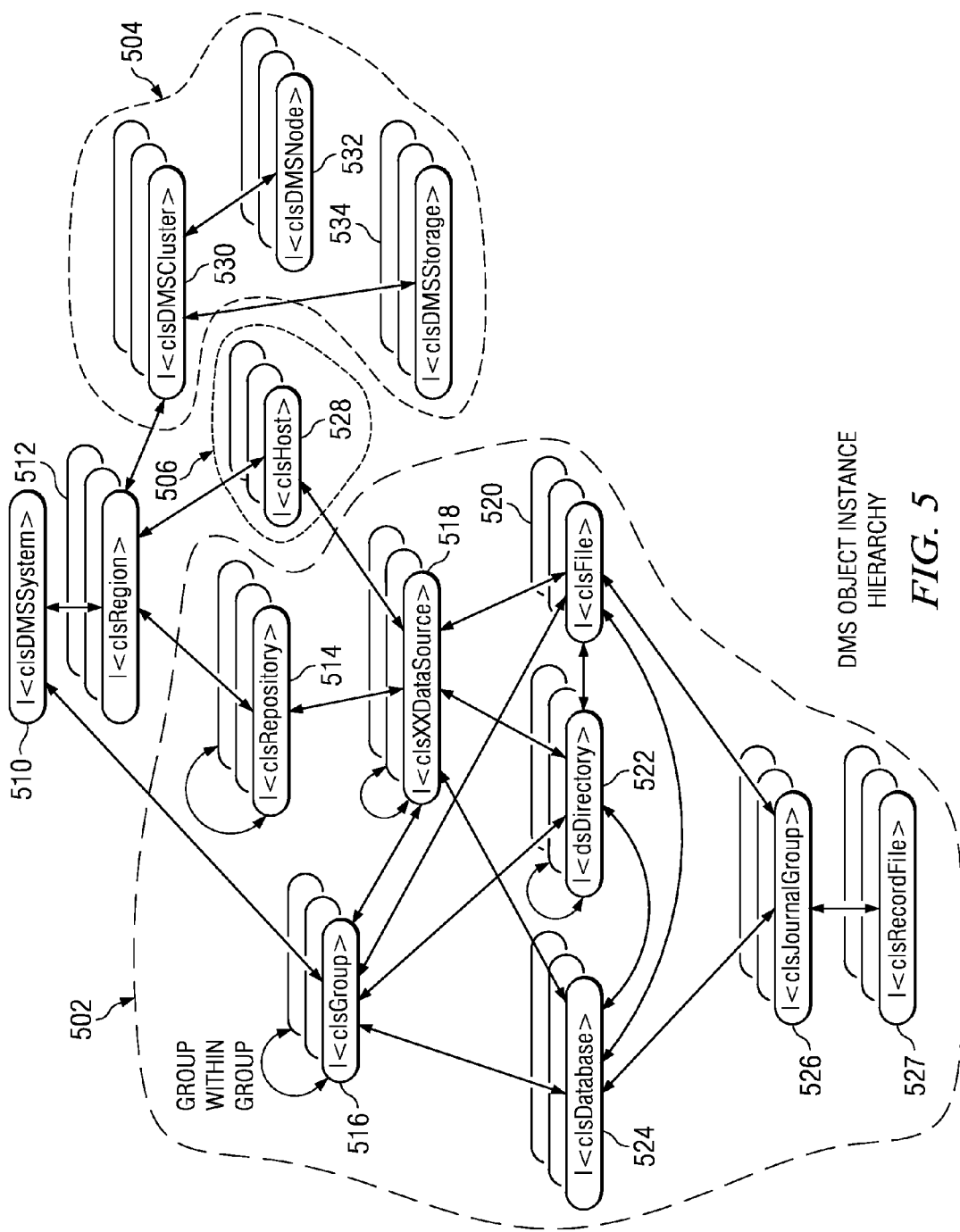
FIG. 5 is a representative host driver according to an embodiment having an I/O filter and one or more data agents.

Thus, to provide real-time data management services, DMS preferably defines a set of data management specific object schemas as shown in FIG. 5. These object schemas are used to create the "active" objects that have specific metadata and behaviors as defined in the schema. The DMS object definition set forth below is a preferred (but non-limiting) way of organizing the control, data, and functional structure for the DMS to provide real-time data management services.

The schema clsDMSSystem is a class for creating a DMS cloud active object 520 that represents the logical network of the entire DMS system (with multiple DMS clusters over multiple regions). Preferably, there is only one instance of clsDMSSystem in a DMS network, as it is the root object instance of the entire DMS network. Preferably, this object is used for tracking DMS regions 512 (each as an instance of a clsRegion schema as described below) and DMS functional groups that own data across regions 516 (each as an instance of a clsGroup schema as described below). The instance typically has a randomly assigned unique identifier. The instance preferably is created automatically by the DMS network when a first cluster is configured, i.e. it is created by a first node. This object instance is populated to all the storage clusters in the entire DMS network. Preferably, there is only one master copy of this object, which is the original copy, the one that was created first. When the properties of the instance change, the properties are populated to all replicas.

The schema clsRegion is a class for creating DMS region active objects 512 that represents and tracks a DMS cluster network, data network, and server network. Preferably, there is one instance of clsRegion in each physical location. An active object instance of clsRegion is used for tracking all the DMS clusters 530 (each as an instance of a clsCluster schema as described below), repositories 514 (each as an instance of a clsRepository schema as described below), and host servers 528 (each as an instance of a clsHost schema as described below) in the region. Because each region may have multiple storage clusters, the local instance of the clsRegion object is replicated to all the local storage clusters. The GUID of each instance of clsRegion are randomly assigned when created. Preferably, policies are encoded as properties in clsDMSSystem, clsRegion, clsRepository, clsGroup, and clsXXDataSource.

The schema clsRepository is a class for creating a DMS data container 514 for storing protected data sources. A repository instance may have sub-repository instances 514 and/or protected data sources 518. A root repository object that is directly under a region represents a segment of a data network. A repository may be a child of a region or a child of another repository. The child of a region is the root of a DMS data object hierarchy. The repository object provides regional data grouping and policy enforcement. The policies in a repository are executed against all the data sources within the scope of the repository. Alternatively, a separate policy object may be defined and used for storing policies explicitly in the data hierarchy. If policy object instances are used, they can be attached to any one of the data container object instances.

The schema clsXXDataSource is a class for creating data source instances 518. Preferably there are three basic data source schemas, clsFSDataSource, clsDatabaseDataSource, clsCompoundDataSource. If desired, there may be more schemas for application data other than the file system and one or more databases. An active object instance of a clsXXDataSource is a root container for a protected data source where a data source from a host is streamed. An instance of clsFSDataSource contains a file, a directory, or a volume of a file system and its history, while an instance of a clsDatabaseDataSource contains one or more databases and their history from a database server. An instance of a clsCompoundDataSource is a container for multiple data source instances. Unlike a repository that only provides logical containership, a compound data source instance preferably provides activity sequencing and indexing, as well as consistency marking to the real-time activities of its related group of data sources so that group consistency can be maintained.

The class clsFile is a schema for creating object instances for the DMS to store the information of a file 520 from a host server and also to track the history of that file in the host. An instance of a clsFile is similar to a file in a file system, except that an instance captures, indexes and manages file history. In DMS, this object is used for data protection, with each instance of clsFile used to represent an external file in an external host.

The class clsDirectory is a schema for creating object instances for the DMS to store the information of a directory 522 from a host server and also to track the history of that directory in the host. An instance of a directory simply represents a container of files and other sub-directories.

The class clsDatabase is a schema for creating object instances for the DMS to store the information of a database 524 within a database server, and also for tracking and indexing the history and checkpoints of that database in the server. This object is used to provide database protection services. An instance of a clsDatabase represents a continuous consistent image of a database, across a range of time, from an external host server.

The class clsJournalGroup is a schema for creating object instances 526 for the DMS to journal the redo and undo log (journal) activities of a database. The database journal activities may be a sequence of updates to a group of related journal log files, or application level transaction records.

The class clsRecordFile is a schema for creating object instances 527 for the DMS to track sequential journal entries within a journal group.

An active object instance of the clsHost is created whenever a host driver from a new host server first connects to the DMS network. This object allows the DMS to track the data services provided to the information on the host 528. This object also associates the protected data sources in the DMS to the data source on its host server. An instance of clsHost preferably contains information such as the platform of the host, the operating system, the host configuration, data sources that are protected from the host, DMS data sources that are replicated to the host, and the like. The protected or replicated data source properties preferably include the host path, the size of the sources in the host, the activities and statistical information about those data sources, and the GUID of the clsXXDataSource instance.

An active object instance of the clsDMSCluster schema represents a DMS cluster 530 with one or more DMS nodes and the DMS storage. This instance provides statistics and status information of its specific cluster. Typically, there is only instance per storage cluster, thus the processes (e.g., the object runtime environment) of all the nodes use this instance as shared memory to keep information such as node availability, master election, and the like. Information about a DMS cluster (as instances of a clsDMSCluster), a DMS node (as instances of clsDMSNode), and DMS storage (as instances of clsDMSStorage) may be stored together with the other active objects or may be in a specific volume used exclusively by the cluster manager.

An active object instance of the clsDMSNode schema represents a DMS node 532 within a DMS cluster. This instance provides statistics and status information about the DMS node it represents. Preferably, the object runtime environment of a node is responsible for locating a cluster and joining that cluster. Once joined in a cluster, the runtime environment creates the clsDMSNode instance.

An active object instance of the clsDMSStorage schema represents the storage volumes 534 of a DMS cluster. This instance allows the DMS storage to be configured, and it also provides statistics and status information of the storage volumes.

An active object instance of the clsGroup schema is a data container that also represents a logical group 516 in an organization. This allows user to map data sources from one or multiple repositories in one or more regions to a functional group of an organization. Its purpose is to enable an administrator or other permitted entity to assign data management policy across multiple regions.

As described above, in the FIG. 5 hierarchy preferably policies are stored as properties in a given data container although, in an alternate embodiment, a separate policy object (e.g., clsPolicyProfile) may be used. An active instance of the clsPolicyProfile schema may contain a set of data management policies. There may be one or many policy profiles in the DMS network. A policy profile object can be assigned (as a default data management policy) to any data container, such as the universe (an instance of clsDMSSystem), regions, repositories, groups, or protected data sources, or to any data object, such as files, directories, and databases. When assigned to a container, all sub-containers or the data objects within that root container are governed by the set of policy rules. As noted above, a region (or a repository) object allow an administrator to set policies for data in the same region, while a functional group object allows an administrator to set policies for data in multiple regions. Typically, a policy is a combination of a set of properties, e.g., a rule, an override rule, one or more qualifying events, one or more qualifying property values, and/or a schedule. A rule may be a Boolean expression with an action, and a rule may be nested.

Similar to an instance of a clsPolicyProfile object, an active object instance of a clsPolicyOverride can be introduced that may also contain a subset of data management policies. When assigned to a data container or data object, the policies in the override object takes precedent over the default policy on an assigned policy profile objects.

The DMS object definition discussed above is merely one way of organizing the control, data and functional structure for the DMS to provide real-time data management services. One could easily reorganize the structure to achieve that goal, and the present invention is not limited to any specific organization. Thus, for example, clsRegion may be broken down in to multiple hierarchies to represent local lines of business and departments, clsDMSCluster may include and nodes and storage so as to eliminate clsDMSNode and clsDMSStorage definitions, clsJournalGroup may be part of clsDatabase definition, and so on. Also, as described above, the effect of this object-oriented hierarchy can be realized in different non object-oriented structures, such as a relational database. All of these variants are within the scope of the present invention.

FIG. 5 illustrates a relationship among DMS active objects. This diagram does not show any object history (object versions). Policy profile and policy override objects are also not shown in this figure to avoid complexity.

In FIG. 5, an active object instance is represented by I<object schema> (note that a schema is the same as a class; it is the definition of an object). The "I" stands for instance, and object schema is the definition of that object class. As illustrated, there is only one instance of the DMS system object 510 (i.e. one DMS network). As illustrated, one or more regions 512, and zero or more functional groups 516 can be created under the DMS network. As noted above, the region and group active objects are used for storing configuration information about the region and the functional group. Functional groups may have sub-groups (i.e. group within group). Data repositories 514 can be created under a region 512. Much like groups, repository may have sub-repositories 514, as has been described. Protected data sources 518 reside within a repository 514. Data may be streamed into a data source from a protected host server, or streamed into a data source from another DMS data source through remote distribution service provided by the DMS. A data source may be configured to replicate to a remote repository. Within a data source 518, the real-time history of data files 520, directories 522, databases 524, database journals 526, email databases, email messages, and the like, are captured and indexed. The present invention focuses on file system data history, as will be seen. The groups 516, repositories 514, protected data sources 518, and the data objects within the data sources are known as the data network 502. Although not shown in this diagram, policy can be assigned to all the objects in the data network and all the objects above the hierarchy of the data network. Preferably, policies are enforced in hierarchical order and with specific override rules.

Whenever a DMS host driver is installed into a host server, the host driver reports to the DMS, and this operation results in an instance of host object 528 being created in the DMS. As noted above, preferably a host object 528 contains information such as the host OS and platform about the host server. Once a host object is created, IT administrators can identify host data to be protected, and then configure for the host data to be protected. An IT administrator can also configure for DMS protected data to be replicated to a host server. As noted above, the host active object refers to the data source(s) that are protected from its host server or data sources that are replicating to its host (as illustrated by the link between 518 and 528). The host objects in the DMS form an external host server network 506.

A region may have one or more DMS clusters, with all DMS clusters preferably tracked by the DMS via DMS cluster active objects 530. Each cluster has a representation active object that refers to the node active objects 532 and storage active objects 534. The cluster object also contains cluster statistic and status information. A node object 532 contains configuration information, statistics and status about the node. The storage object contains storage volume information, and storage group information. Volume information includes all the raw storage volumes that are provisioned to the DMS. It also includes the DMS partitioning of the raw storage volumes, and the assignment of the partitions to storage groups. In the DMS, a protected data source has its own storage space that is called a storage group. A storage group is an aggregated DMS storage partitions carved out from the volume groups. The cluster, storage, and node objects form a DMS server network 504.

File System Data History

The following section describes representative object schemas defined for protecting a file system. Preferably, and with reference to FIG. 5, there are three object classes (schemas) for file system protection, namely File System Data Source class (clsFSDataSource), Directory class (clsDirectory) and File class (clsFile).

In the context of a file system at a host server, typically all properties except the content are usually known as metadata. As described above, the DMS active objects store metadata from the protected host server as well as metadata generated by the DMS itself. In the DMS, all the properties are metadata including the binary content from the external world. For a clsFile object, binary content is a "content" property with random access binary blob type.

ClsFSDataSource

This is a schema of a file system data source; as noted above, this object preferably serves as a container for the history of a protected file system or folder in a host. It is also a data service entity for managing inbound and outbound traffic for the file system, the policy management entity for its data, and a security guard for any access to the protected data history.

The properties of this object class typically include the configuration of the protected data source. The following table illustrates representative property examples of this object class:

| Properties of clsFSDataSource | Descriptions |
| --- | --- |
| ID | GUID |
| Name | Name of the data source |
| Parent | GUID of its parent container (a repository object) |
| DateTimeCreated | Timestamp when this data source container is created |
| Owner | The user ID of the creator |
| ACL | Key or GUID to the access control list of this object |
| DataSourceType | File system |
| RuntimeStates | Protecting, replicating, disconnected from host, and the like |
| Status | Active, archived |
| Master | GUID of the original protected data source (if this is a replica) |
| Replicas | GUID of the replicas that need input from this object |
| Host | GUID of the associated host object where the data source resides |
| HostPath | The path name in the host that is protected by this object |
| ProtectedDateTime | Timestamp when protection begun |
| ArchivedDateTime | Timestamp when this data source became idle |
| Children | The root directories or files in this container |
| EventTags | List of entries with event and timestamp. The events are in data source level, may be set by users. |

The above table is a subset of properties used in the DMS; one may add more or remove some of the above properties. For example, policy may be added, and one may not need RuntimeStates. In one embodiment, the properties of this object are not versioned so that the history of the object is not tracked. Alternatively, one can version some of the properties, such as HostPath, ProtectedDateTime, ArchivedDateTime, and Children, such that these configuration changes are recorded in time. When properties are versioned, it is desirable to track the version begin and end timestamp.

ClsDirectory

The ClsDirectory schema is defined for tracking the history of a directory (folder) in a file system. This schema is used for protecting a directory, and it is capable of recovering a directory to any point-in-time in the past.

The properties of this object class preferably include the following:

information and all the changes to a directory within a period of time. A directory journal entry may be "version ID, DateTimeModified, add new child, child GUID, . . . " and so on. Once that is done, a logical version of a directory can be constructed on demand (i.e., upon request) by applying the necessary activities to a baseline directory image. The present invention is not limited to any physical layout of the object in the physical store.

FIG. 6 shows a sample instance of a directory object. As can be seen, a representative directory object (FOO) has three versions. The anchor 610 represents the entire directory object, and the anchor has a reference (FirstVersionID) to a

| Properties of clsDirectory | Descriptions |
|---|---|
| Non-versioned Properties: | |
| ID | GUID of this object instance, also GUID of this anchor page |
| DataSourceParent | GUID of its protection data source container |
| DateTimeCreated | Timestamp when this object is created (from the protected host) |
| Creator | The user ID of the creator |
| DateTimeTerminated | Timestamp when this object is deleted (from the protected host) |
| EventTags | List of entries with event and timestamp. The event tags may be set by users for tracking purposes. |
| FirstVersionID | GUID of the first version |
| LatestVersionID | GUID of the latest version |
| VersionCount | Total number of versions |
| Versioned Properties: | |
| ID | The version GUID of this object, also GUID of this page |
| AnchorID | The GUID of the anchor page (i.e., the GUID of this object) |
| PreviousVersionID | The version GUID of the previous version |
| NextVersionID | The version GUID of the next version |
| Parent | GUID of parent object which can either be the data source container or another directory |
| Name | Name of the directory |
| DateTimeModified | Timestamp when the version is created (or when the modification occurs) |
| ModifiedBy | ID of a user who modified the directory |
| DateTimeEnded | Timestamp when this version is ended (i.e., a new modification results in another version being created and old version ended) |
| ACL | Key or GUID to the access control list of this object |
| ChildrenCount | Number of children |
| Children | A list of its children which can be sub-directories or files. Each entry is a reference to the version ID of a child. |

These properties are merely illustrative of what a directory active object contains. One may include more properties, such as a full path name, children name, policies, metadata from the host server, and more.

As can be seen, the above table shows the logical information of a directory object. Whenever a new child is added, an existing child is deleted, the directory is moved, the directory is renamed, or the name of its child has changed (if child name is also captured in this object), a new logical version of the directory is created. Whenever a new version is created, preferably a previous version is terminated. DateTimeModified of a new version must be after or same as the DateTimeEnd of the previous version. ModifiedBy indicates the user who made the modification to create the new version. If desired, an Event tag may be added; preferably, it is a sequence list of entries each having a timestamp.

This logical layout may map directly into a physical store (e.g., overlaying a file system or a database), but this is not required. With respect to persistent storage, preferably DMS stores multiple logical versions of a directory in one physical store unit. Or, DMS may also combine multiple versions into one directory journal. For example, one physical storage unit of a directory object may contain the initial directory baseline first version page 612, and a reference (LastVersionID) to a last version page 614. All three versions (612, 613 and 614) have reverse reference (Parent) to their object anchor. All three versions are linked together with their PreviousVersionID and NextVersionID. With these references, one can traverse a directory object and locate the directory information at any point-in-time in the past. In this example, all versions also reference to an ACL page (615 and 616) so that the access control at a point-in-time can also be located. In each of the version pages (612, 613, and 614) there are DateTimeModified and DateTimeEnded properties. As noted above, the DateTimeModified of version 2 should be before or equal to the DateTimeEnded of version 1; this property allows one to find out what version existed at what time frame. The version pages also preferably contain the ModifiedBy property, which allows one to find out who did what to the directory object when. User events and any system events that are meaningful to the directory can be tagged at the anchor page. When the directory is deleted, the DateTimeTerminated property in the anchor page is set to the deletion time. As can be seen, the this data structure and the associated metadata allows one to track a directory history from what information has changed at what time, by whom, through what event, as well as what meaningful events to this object occurred during its lifecycle.

In this example, in the first version 612, the directory object only has the version 1 of a subdirectory object, namely, DOO 617. At some point in time, the subdirectory object changed its name to WOO; thus, a version 2 of the subdirectory object was created and is represented by reference number 618. In this example, the directory active object tracks its children's name; thus, version 2 of FOO 613 was created to link to the version 2 of the subdirectory WOO 618. On version 3 of FOO 614, a new file of the name GOO under the directory FOO was created. This is illustrated by reference numeral 619. The links, shown as dotted arrows, are references of the CHILDREN property of the directory object. As can be seen, these links allow active objects to build up object relationships or object hierarchy (e.g., a parent-child relationship). The result is a logical view of the directory data structure. To conserve data storage usage, the directory version pages may be combined into a table or a journal, and the table or journal may be stored in a physical storage unit. For simplicity, it should be appreciated that the above diagram does not show the complete subdirectory and file objects (for example, the anchor pages of the file and subdirectory objects are not shown).

ClsFile

The ClsFile schema is defined for tracking the history of a file from a file system. This schema is used for protecting a file, and it allows for the recovery of the protected file to any point-in-time in the past.

The properties of this object class preferably include the following:

erably include a timestamp when the object is created, creator information, identification of access journal for forensic purposes, and event tags for tracking user events across time line. The versioned properties preferably include name, modification information, status, ACL, and content. Preferably, a new logical version is created when the name of the document changes, the content of the document changes, the ACL changes, document metadata or attributes change, or when the document is moved. When the document is deleted from the protected data source, the file object at the DMS is terminated with (DateTimeTerminated timestamped), and the last version ended.

FIG. 7 is an example of a DMS file object that stores data history of a file from an external host server. As described above, preferably the file object has an anchor page 710 for its non-versioned metadata. This example shows a file object with three versions (711, 712, and 713). The FirstVersionID and LatestVersionID properties from the anchor refer to the first and third version of the file. The AnchorID property on each version contains the GUID of its anchor page. The versions are connected into a double link list with the PreviousVersionID and NextVersionID properties on each version property set. In this example, each version has an ACL property that refers to the access control list. Each version page also has a pair of timestamps, DateTimeModified and DateTimeEnded, to indicate when the version becomes existent and when the version is ended and a new version born.

| Properties of clsFile | Descriptions |
| --- | --- |
| Non-versioned Properties: | |
| ID | GUID of this object instance, also the GUID of this anchor page |
| DataSourceParent | GUID of its protection data source container |
| DateTimeCreated | Timestamp when this object is created (from the protected host) |
| Creator | The user ID of the creator |
| DateTimeTerminated | Timestamp when this object is deleted (from the protected host) |
| AccessLog | List of entries with timestamp, user id, and access mode. |
| EventTags | List of entries with event and timestamp. The event tags may be set by users for tracking purposes. |
| FirstVersionID | GUID of the first version |
| LatestVersionID | GUID of the latest version |
| VersionCount | Total number of versions |
| Versioned Properties: | |
| ID | The version GUID of this object, also GUID of this page |
| AnchorID | The GUID of the anchor page (the ID of this object) |
| PreviousVersionID | The version GUID of the previous version |
| NextVersionID | The version GUID of the next version |
| Parent | GUID of parent object which can either be the data source container or a directory |
| Name | Name of this file at this version |
| DateTimeModified | Timestamp when the version is created (or when the modification occurs) |
| ModifiedBy | ID of a user who modified the file |
| DateTimeEnded | Timestamp when this version is ended (i.e., a new modification results in another version being created and an old version ended) |
| Status | Consistency, DMS checkpoint, suspect |
| ACL | Key or GUID to the access control list of this object |
| Fingerprint | A hash key of the entire content (e.g. MD5, SHA-1, CRC, or the like) |
| Signatures | A sequence of hash keys each generated from a contiguous chunk of the content |
| Content | The sparse index of this version. Sparse index is byte level reference to the binary content. Binary contents are in baseline binary pages and delta pages. |
| Additional metadata and attributes | Information from the original document |

The above table is merely illustrative; other properties, such as a full path name, policies, and the like, may be included. As can be seen, the non-versioned properties pref- There is also a ModifiedBy property to capture the user who modifies the file. When a file is deleted, the DateTimeEnded property on the last version page and the DateTimeTerminate property in the anchor page are set to the deletion date. The File version is created when a file is modified and ended when the file is closed.

In the DMS file object, preferably each version has an associated property called "CONTENT," and this property is of the type random access binary blob. The binary value of this property type may be stored inside or outside of the metadata page. In this example, the binary data of version 1 is in the binary page 716, which has its own GUID. The changes (deltas) that are made to the file for version 2 are stored as a sequence of forward deltas in the delta page 717. The changes (deltas) of version 3 are appended to the same delta page 717 or another new delta page. A file object may have one or multiple binary pages. The binary pages contain the baseline data. A file object also may have one or multiple delta pages for all its changes. The sparse index refers to the data in both the baseline and the deltas to make up the content for the version. The binary and delta pages may be stored in one physical storage unit; alternatively, the pages may be broken up and stored in multiple physical storage units. As one of ordinary skill will appreciate, the above-described example is simply one way in which DMS structures the binary data. Alternatively, each version may have its own binary pages so that no delta has to be kept. Yet another alternative is to store reverse deltas or multiple baselines at different versions with a combination of reverse and forward deltas.

This file object structure and the associated metadata allows DMS to track a file history, e.g., what information has changed at what time, by whom, through what event, and what meaningful events to this object occurred during the object's lifecycle. To conserve data storage usage, preferably the metadata of the version pages may be combined into a table or a journal, and preferably the table or journal may be stored in a physical storage unit. Also, this structure can be stored over a raw storage device, or by overlaying a file system or a database.

History of Protected File System

FIG. 8 shows a sample file system history captured by the DMS. For simplicity, only the version metadata pages are shown; the anchor pages and the ACL pages are omitted. As mentioned above, when a newer version of a file or directory is created, preferably the older version is terminated. Therefore, as indicated, each version preferably has a DateTimeModified and DateTimeEnded. The DateTimeEnded of the latest version is NULL (i.e., not ended yet).

In this example, it is assumed that the entire file system is uploaded to the DMS for protection from a host server at T1. This is represented by FSDS 801 (DataSource 1). At T1, there is a version 1 of the directories 811 and 821, and of the files 841 and 851. While this representation refers to a time T1, this time may be a time range or period, as upload of the entire file system typically takes a given amount of time.

At T2, the content of the file by the name "fo1" changed, which is represented by the new object 842. Because this is a content change, the parent "do1" v1 (reference numeral 811) is unaffected.

At T3, the directory by the name "do2" changed its name to "dox" (as now indicated by object 822). Because in this example a directory also tracks the name of its children, this change causes parent "do1" (which has reference to this object) to also generate a new version 812.

At T4, a new file by the name "fo3" is added to "do1" (as now indicated by object 831); thus, a third version of "do1" is generated as indicated by reference 813.

As can be seen, within this DMS file system history, preferably there are version links, parent-child links (i.e., object relationships), as well as the data links to binary and delta pages (852, 843, 844). Therefore, this structure forms a three dimensional (3-D) object store. Navigating this object store enables DMS to identify the history and state of the DataSource 1 at any point-in-time, as will be described in more detail below.

As mentioned in the above sections, physical structure of the object versions can be organized in any fashion to optimize for the storage usage at the DMS.

As also mentioned, an alternate non object-oriented embodiment may be implemented with techniques that link and index the object versions, object relationships and data changes by applying a schema over a relational database, together with a set of processes (described below) that update the database according to the invention.

File System Events and DMS Operations

The above sections discuss the DMS logical object data structure for file system protection. The following sections discuss the functional behavior of file system protection in more detail.

The following is directed to the end-to-end process (e.g., from host driver to active objects in one cluster, or from active objects in one cluster to active objects in another cluster) that changes the DMS logical object store structure when a file system history is captured. In particular, this disclosure also describes the processes involved in the storing of real-time history of a file system, and the use of the real-time history for any point-in-time recovery for guaranteed consistency. The DMS file system history structure changes are triggered by one or more events from file system, users, or applications.

Thus, as illustrated in FIG. 8, DMS file system data source object (801) in a DMS cluster receives file system activities and other events, typically from a host driver that resides in a server or from another file system data source object that resides in another DMS cluster. If a data source receives a data stream directly from a host driver, it is providing a data protection service, and the data source/storage group in the DMS storage is a master data source. If a data source object receives a data stream from another data source object, the service is called data distribution, and the data source/storage group in the DMS storage is a replica. As described in Ser. No. 10/842,286, filed May 10, 2004, a file system data protection or data distribution stream contains real-time event journal of a file system. The file system event journal is a stream of file system events, metadata, and associated data. Metadata may include, for example, information such as who did what when. Typically, the events include OPEN, CLOSE, CREATE, DELETE, MOVE, RENAME, MODIFY (data, attributes or metadata such as ACL), DELTA APPLY, FLUSH, and CHECKPOINT. CREATE event results in new file system active object (version 1) being created. Host drivers (for data protection) or active objects in a source cluster (for data distribution) may accumulate changed data depending on the data type; host drivers send (either instantaneously or periodically) MODIFY and DELTA APPLY along with the data and metadata to the target DMS active objects. DELTA APPLY is used to send delta changes after delta reduction. For some data types, such as database log activities, the host driver does not perform delta reduction and does not accumulate changes; rather, the host driver instead forwards changes with MODIFY events as soon as the events are received. FLUSH, CLOSE, and CHECKPOINT each trigger all accumulated changes to be sent to the target DMS active objects through MODIFY and DELTA APPLY events. CLOSE and CHECKPOINT events result in an old version being terminated, and a new object version created. MOVE and RENAME re-locate or modify the name property of an active object version, and DELETE ends the life of an active object by setting a timestamp on DateTimeTerminated and ends the last version.

DMS Processes for File System

Figure 9:
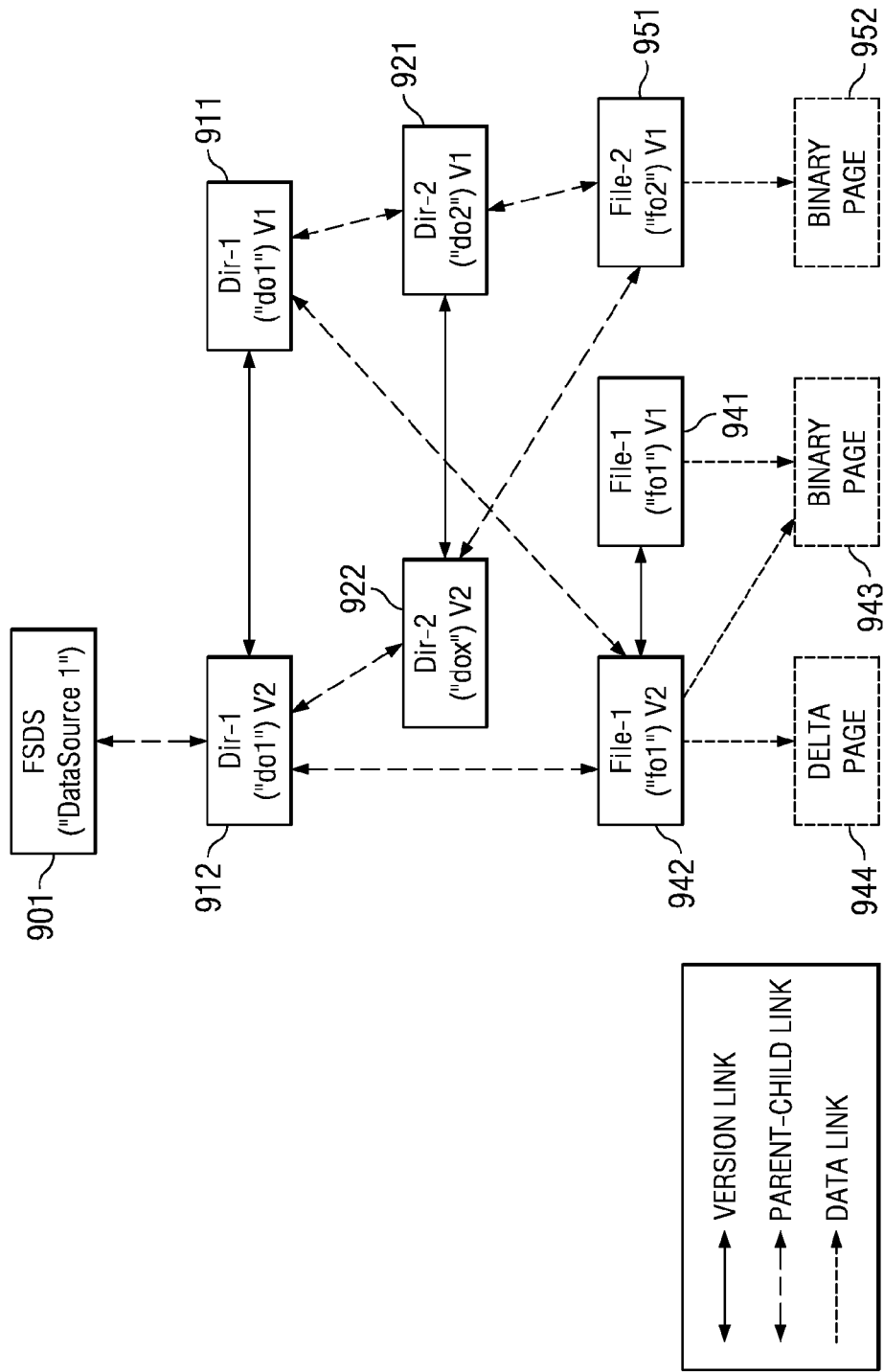
FIG. 9 is the historical starting point of the sample file system.

The following sections describe the DMS (host driver and active object) processes and the associated data history structure changes in response to specific file system events. Illustrations of sample DMS file system history are shown for each case. For illustrative purposes, FIG. 9 is the historical starting point of the sample file system. As can be seen, the history comprises first and second versions 911 and 912 of the directory Dir-1, first and second versions 921 and 922 of the directory Dir-2, first and second versions 941 and 942 of File-1, and a first version 951 of File-2. Binary and delta pages (952, 943 and 944) are also referenced.

Creation of a File or a Directory

Figure 10:
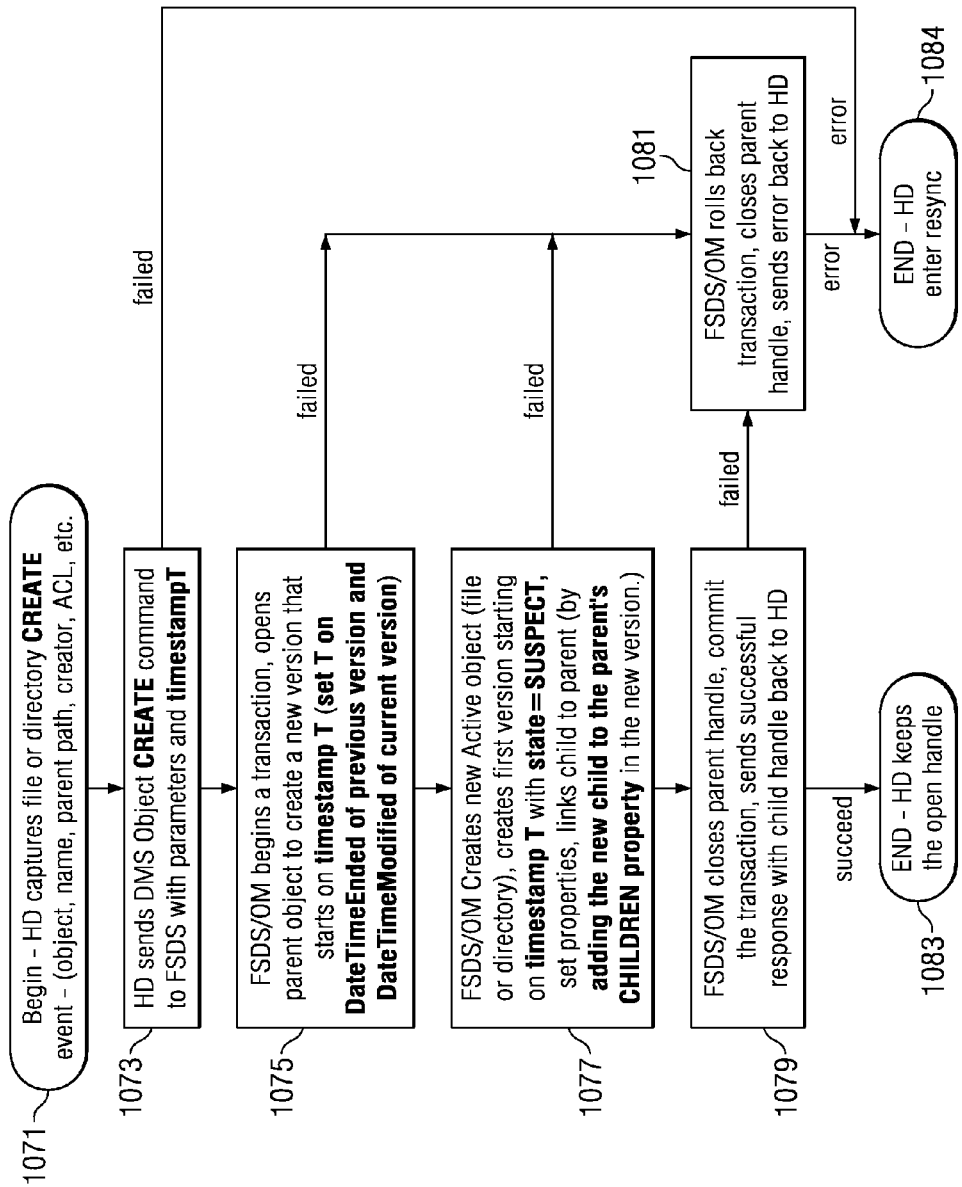
FIG. 10 illustrates creation of a file or a directory in the DMS file system history structure.

The creation of a file or a directory in the DMS file system history structure is initiated by a CREATE event captured by a DMS host driver operating to provide data protection, or by a similar event distributed from one data source to another data source. This function is illustrated in the process flow of FIG. 10. This method is implemented in software (a set of one or more program instructions) executable in one or more processors. In a data distribution scenario, the same event would be forwarded from the master DMS data source to another replicated DMS data source, which would cause an equivalent data structure change in the replica. For simplicity, the following paragraph describes the data protection scenario.

This process begins with the DMS host driver capturing a file or directory CREATE event at step 1071. The host driver then issues an Object Create command to the associated DMS file system data source to create an active object with the following parameters—object class, parent path, object name, creation timestamp, owner, ACL, and other attributes. This is step 1073. An object manager at the DMS handles the request for the DMS file system data source object by opening the parent active object and creating a new version thereof. This is step 1075, and this operation has been described and illustrated above. The DateTimeEnded of the parent's previous version is set to T, and the DateTimeModified of its new version is set to T as well. The object manager also creates a new file or directory object with a first version and sets all the properties as necessary. This is step 1077. The DateTimeCreated property in the anchor of the new object is set to T, as is the DateTimeModified property in the first version. Preferably, the state of the first version of this new object is temporarily set to SUSPECT, as it has not closed yet. Once the object is created, it is linked to its parent, preferably by adding its GUID to the CHILDREN property of its parent's latest version. This also occurs in step 1077. Thereafter, the parent object is closed and the new child handle remain open; this handle is passed over to the host driver, which can issue more updates to the new child. This is step 1079. If any failures occur during the above-described steps of the process, the transaction is rolled back at step 1081 and the host driver is notified; the host driver then performs a resynchronization on that object at step 1084. The host driver keeps the child handle in an open handle list at step 1083. If the new object is a file object, the host driver forwards data (via a MODIFY event) to the DMS file object handle and then closes the file handle to generate a consistent (State=CONSISTENT) version. At this point, the new object state is SUSPECT not CONSISTENT.

In the data distribution scenario, a master DMS data source object is forwarding events and a data stream to a target DMS replicated data source object. The process described in the flowchart of FIG. 10 applies in this data distribution scenario as well; in that scenario, the host driver is replaced by a master DMS data source object in a first cluster, and the file system data source (FSDS) object is replaced by a target DMS replicated data source object in a second cluster. Otherwise, the operations are similar.

Figure 11:
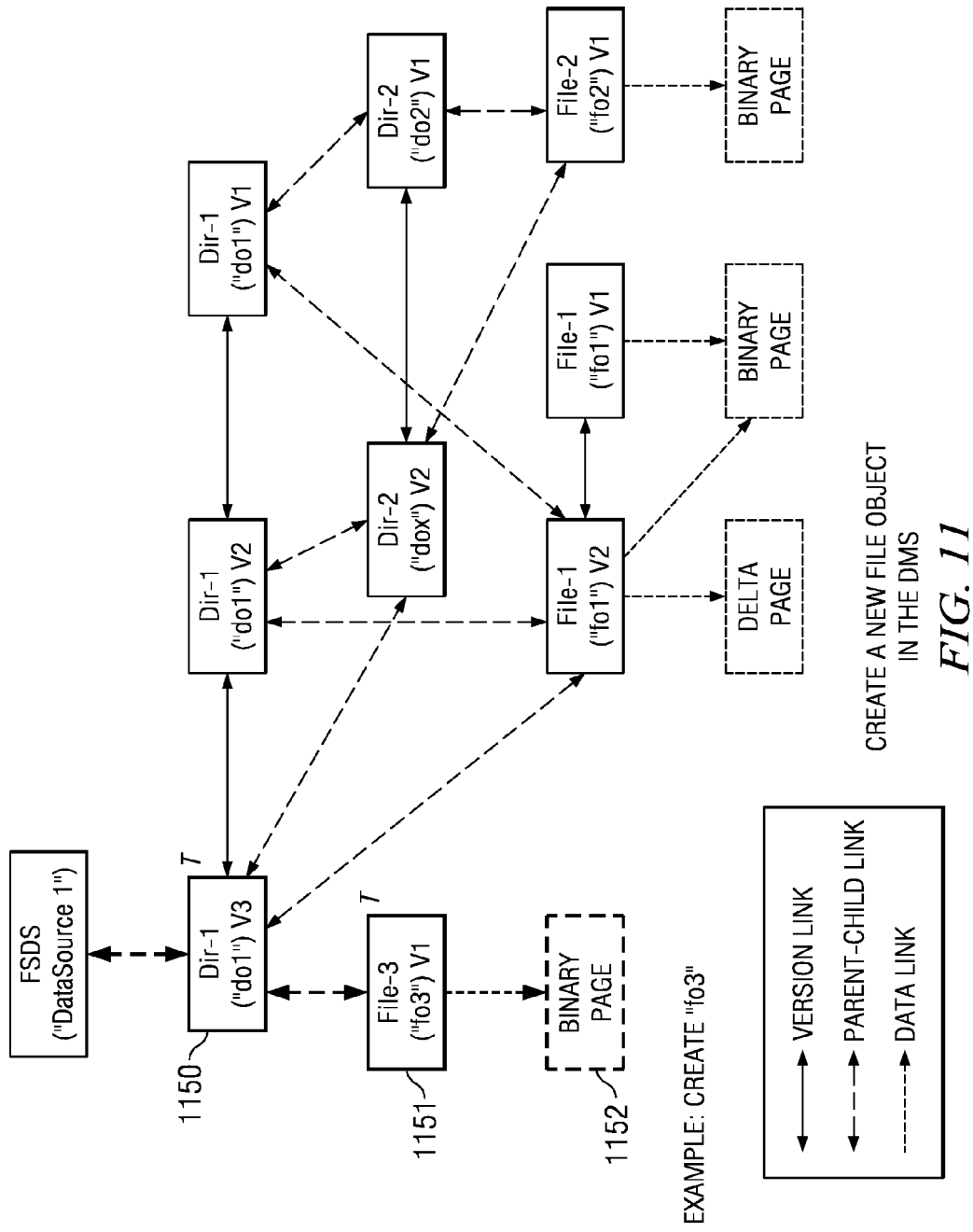
FIG. 11 illustrates how a new file is created and added to the DMS file system data source shown in FIG. 9.

FIG. 11 illustrates how a new file by the name "fo3" is created and added to the DMS file system data source shown in FIG. 9. For simplicity again, the anchor page of the objects are not shown. An anchor page stores the permanent properties of an object, which properties do not changed over time. The creation of "fo3" results in new version of "do1" 1150 being created. The DateTimeEnded is set to T, and the DateTimeModified of object 1150 is also set to T. The anchor page (not shown in the diagram), version page 1151 (version 1), as well as binary page 1152 for the new file object, are also created. The DateTimeCreated property in the anchor page (not shown) is set to T, as is the DateTimeModified property for the version page 1151. The State property of page 1151 is set to SUSPECT temporarily (see the discussion below concerning closing a file for additional details). The GUID of page 1151 is added to the Children property in object 1150, which links the parent-child relationship. The sparse index of the Content property refers to the content in binary page 1152. If the new object added is a directory object, there is no binary page.

Modification of a File or a Directory

A file or a directory modification in the DMS object store preferably is represented by the creation of a new object version. The modification of a file system object preferably is broken into three phases, and each phase involves a set of events. The three phases of active object modification cycle are (1) instantiating an active object, (2) modifying the object properties, and (3) freezing the version. FIG. 12 illustrates a process flow that is implemented (e.g., in software) to modify a file or a directory in a master data source operating in data protection scenario. Similar object store changes occur when the same events are forwarded from a master data source to a replicated data source in the data distribution scenario.

As noted above, phase 1 is instantiation of the target active object, which can either be a CREATE (as in FIG. 11) or an OPEN process, as represented by block 1201. Thus, instantiating an active object can be initiated by a CREATE event or an OPEN (write mode) event. When a CREATE event is received, a new object with the first version is created in the object store. The object handle remains open for further update until the target DMS active object is explicitly closed, e.g., in response to events to freeze the object version. FIG. 11 described the process for creating a file or directory. When a DMS host driver captures a file system OPEN event to update a file or a directory at step 1202, it issues an Object Open request to the associated file system data source active object. This is step 1203. When the DMS active object is opened, its handle is returned to the host driver at step 1205. The flow sub-diagram (in block 1201) describes the object open process in response to OPEN event. The host driver sends to DMS the timestamp when a file system object is created or opened; the timestamp is used for stamping on the DateTimeEnded property of the previous version of the target DMS object, and on the DateTimeModified property of the new version created.

Phase 2 is the actual modification of the target object, which occurs either in block 1225 or in block 1209. The events that modify object properties preferably include MODIFY (metadata) and WRITE (binary data). There may be many more modification events depending on the application and system to which the DMS is applied. The test at step 1208 determines which event has occurred. A MODIFY event changes file system object metadata (such as access control list (ACL), object title, company name, document statistics and other user defined properties) that is associated with a file system object. The flow sub-diagram at block 1225 describes the process to modify object metadata. In particular, in response to capture of the modification event (steps 1207 and 1208), at step 1226 the host driver issues an object MODIFY event to the target active object (via the opened object handle) at the DMS, which target object then changes the object property in the latest object version at step 1227.

The WRITE event is for file object only; it represents binary content updates. In this path, when host driver captures the WRITE event (steps 1207 1208), it enters the processing block 1209 in the file modification process. Host driver first decides if it should buffer the changes. This is step 1210. For a database log file, for example, the host driver would not buffer the log entries; however, when dealing with a regular document changes are buffered. If changes are buffered, then the host driver decides if it is time to forward the changes to the DMS target active file object. This is step 1211. If no data should be forwarded at the meantime, the host driver continues to watch for events at step 1207. Otherwise, the host driver decides if delta reduction should be applied on the changes to extract the actual changed byte range. This is step 1212. Again, for database log entries, delta reduction is not necessary because log entries are appended onto the file. If no delta reduction is necessary, the changed data is packaged with a WRITE event and forwarded to the DMS target active object. This is step 1213. Otherwise, the host driver retrieves the last binary content signatures and, for one or more byte ranges that actually changed (deltas), the host driver calculates and forwards those deltas to the DMS target object. This is done using a host driver-generated (namely, APPLYDELTA) event and occurs at step 1214. The target DMS file object receives both WRITE and APPLYDELTA events, applies second stage delta reduction as necessary to extract the exact bytes changed, saves the deltas or binary data in the binary or delta pages, and then creates or updates the sparse index in the working (last) object version. This is step 1215. If the file has not been closed, the host driver continues to capture more modification events for the file at step 1207; otherwise, the closing process continues, which is step 1222. If any failure occurs, the host driver abandons all the events associated with the target file and performs resynchronization of the entire object at step 1230. In the preferred embodiment, the host driver uses a FLUSH event as one of the events to decide if buffered data should be forwarded to the DMS without causing the DMS target object to generate new version.

Phase 3 freezes the changes into an object version. This is block 1221. The possible events that cause a DMS target file or directory active object to freeze the latest object version (and thus to prevent any more changes into that version) are CLOSE, CHECKPOINT, and FORCE-CLOSE. The flow diagram in block 1221 illustrates the processing of handling of these events to freeze a DMS active file or directory object version. A CLOSE is a file system event. When this event is detected by the host driver, the associated file is consistent. A CHECKPOINT may be generated by an application with or without user initiative, or it may be generated by the host driver. A CHECKPOINT event is generated when the associated application or the host driver have taken some appropriate action to ensure that the version to be frozen is consistent in its application point of view. For example, a database manager periodically flushes its memory and generates an internal CHECKPOINT, during which a set of database files are consistent. The CHECKPOINT event from a database manager can be detected by the host driver, which indicates that the group of files belonging to the particular database is consistent and a DMS version of each of the files should be frozen. In yet another example, an application or the host driver may generate a CHECKPOINT to all the system state files (or even the entire file system) to create a snapshot of all the files all at once (an exact time). This CHECKPOINT forces all the related files to freeze their latest version all at once. If a CLOSE or CHECKPOINT event is detected by the host driver at step 1208, the host driver checks if there is any buffered data for that object. This is step 1220. If so, the host driver first forces the data to be forwarded to the target DMS object. After that, the host driver forwards the event to the DMS target object. This is step 1222. Both CLOSE and CHECKPOINT events generate a consistent DMS object version with the State property of the frozen version set to "Consistent." This is step 1223.

As noted above, another event that freezes a file or a directory object is FORCE-CLOSE. This event may be generated by an application or the host driver itself (step 1207), or it can be generated by the DMS (step 1225) when an error is encountered. The error could be that the host driver connection to the DMS has failed. The FORCE-CLOSE event generated by an application or host driver goes through the same process as the CLOSE and CHECKPOINT events (steps 1220, 1209, 1222, and 1223). FORCE-CLOSE freeze the latest version, as it is in Suspect state (i.e., the consistency is unknown). This is step 1223. Any DMS object that ends with Suspect state is eventually resynchronized with its corresponding file system object in the host, which is step 1230.

In one embodiment, the DMS data source object automatically creates a new object version when it handles a CREATE or OPEN event. In this case, step 1223 involves freeing an unmodified object version. An alternate embodiment forces the DMS data source object to create a new object version when it receives the first modification event.

The above described process with respect to the given events is merely illustrative. Other events and/or other handling techniques may be implemented. Thus, e.g., an alternative embodiment may choose to freeze file system objects more frequently (by using events such as FLUSH or possibly the WRITE events with TIMEOUT in step 1221). Another embodiment includes other application and host driver generated events, such as AUTO-SAVE. Also, with alternate embodiments, the process may be somewhat different than as illustrated in FIG. 12. For example, if a relational database is used to store the logical representation, the object-oriented behavior (with object methods/functions) would not be required.

In the data distribution scenario as noted above, a master DMS data source object is forwarding events and a data stream to a target DMS replicated data source object. The process described in FIG. 12 applies in this data distribution scenario as well. In particular, the host driver is replaced by a master DMS data source object in a first cluster, and the DMS file system data source object (FSDS) and DMS objects are replaced by a target DMS replicated objects in a second cluster.

Figure 13:
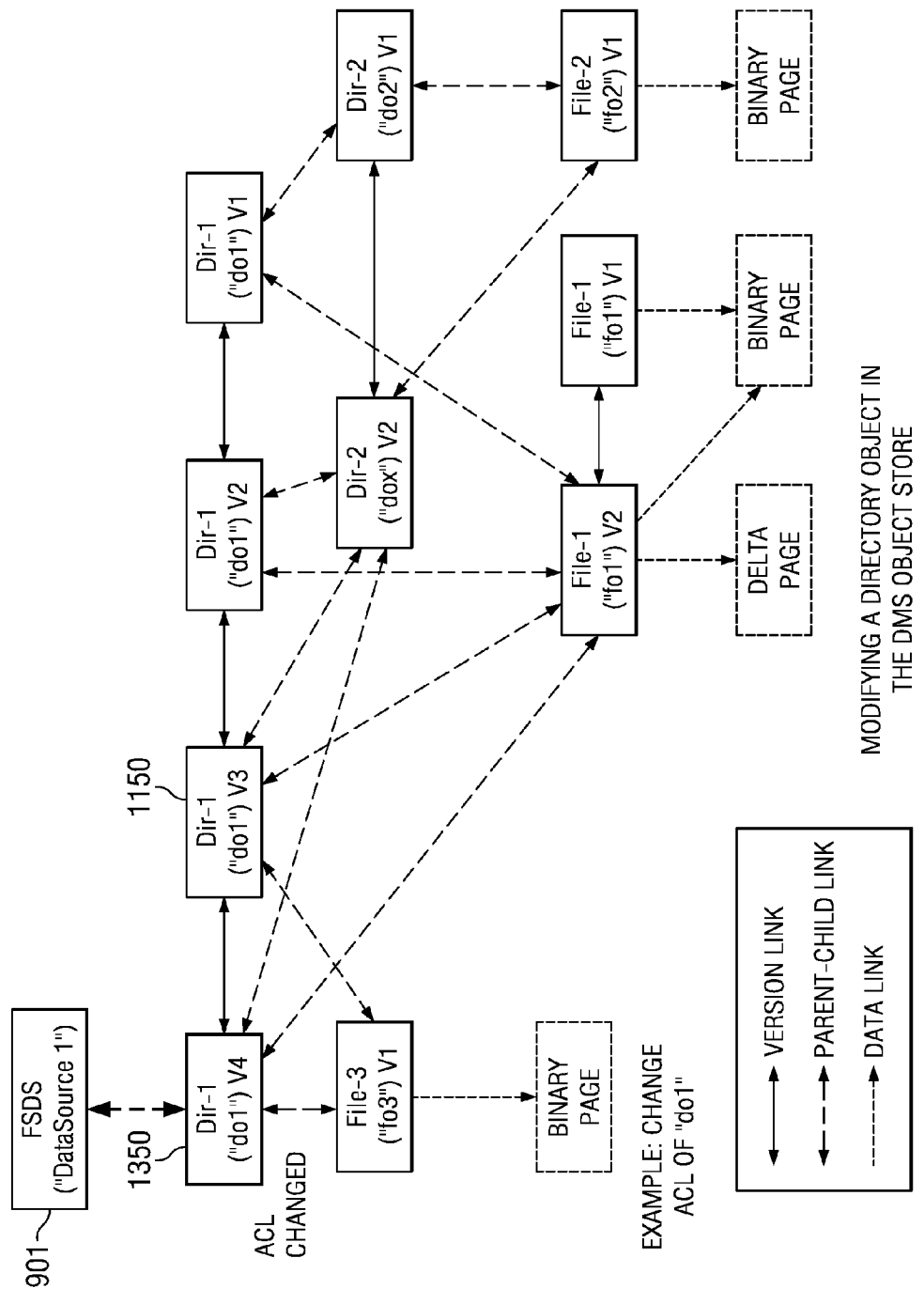
FIG. 13 illustrates how modifying a directory object alters the DMS object store of FIG. 11.
Figure 14:
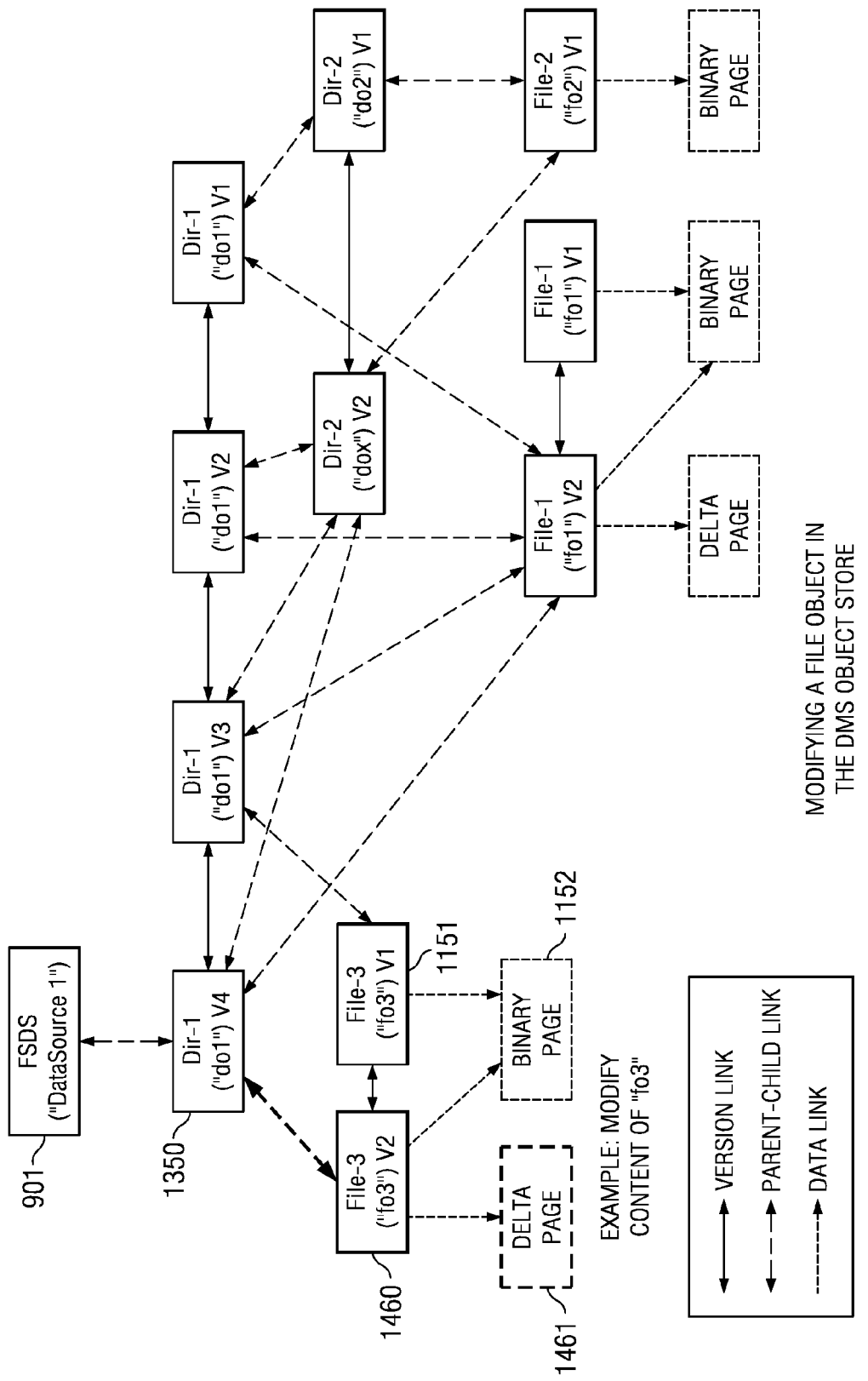
FIG. 14 illustrates how modifying a file object alters the DMS object store of FIG. 13.

FIG. 13 illustrates how modifying a directory object alters the DMS object store of FIG. 11. FIG. 14 illustrates how modifying a file object alters the DMS object store of FIG. 13.

In particular, FIG. 13 illustrates the modification of an ACL on version 3 of the Dir-1 directory object, which was object 1150 in FIG. 11. Once again, for simplicity the anchor page of all objects is not shown. In this case, a new version (object 1350) of "do1" is created with its ACL property changed; other properties, such as the children links, remain unchanged. In other words, both version 4 (object 1350) and version 3 (object 1150) refer to the same version of their children. Suppose the ACL of "do1" is modified at T2, in such case, T2 would be stamped on the DateTimeEnded property of version 3 (object 1150), and on the DateTimeModified property of version 4 (object 1350) of the directory "do1." After the new version 1350 is created, the parent of "do1, in this case object 901, is modified to refer to the new version.

FIG. 14 illustrates the modification of a file object (labeled 1151 in FIG. 11), on FIG. 13 whose content is modified. Note that FIG. 13 is derived from FIG. 11 as a result of a change to "do1." This file object modification generates a new version of File-3, which is represented as object 1460. In this case, the deltas of the modification are saved in a delta page (object 1461) or in the binary page (object 1152) associated with the prior version. Preferably, the sparse index in version 2 (object 1460) refers to the byte ranges in both the binary and delta pages for the version 2 content. Suppose the file "fo3" is modified on T3, in such case T3 is stamped on the DateTimeEnded property of version 1 (object 1151) and on the DateTimeModified property of version 2 (object 1460). Because the content change to "fo3" does not affect directory "do1," no new version is created. Version 4 of "do1" continues after T3, however, thus note that the child link to "fo3" (object 1150) is changed to refer to version 2 (object 1460) of "fo3" instead of version 1 (object 1151). This reflects the fact that, at the current point-in-time, the information of "do1" is in its V4 and that from there, the current point-in-time "fo3" can be located.

Deletion of a File or a Directory

Figure 15:
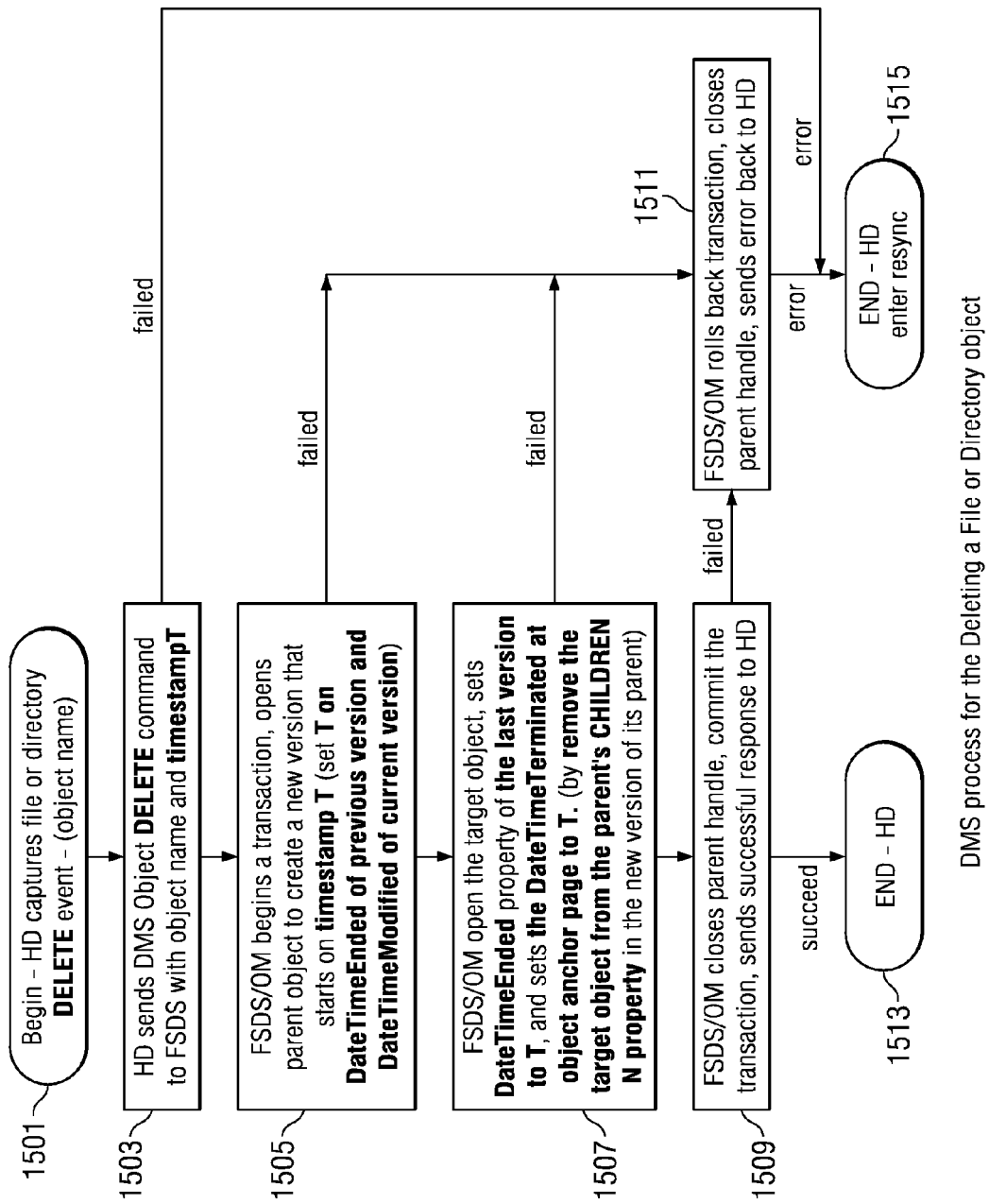
FIG. 15 illustrates a process for deleting a file or a directory in the DMS file system history structure.

FIG. 15 illustrates a process for deleting a file or a directory in the DMS file system history structure. This process is initiated by a DELETE event captured by a DMS host driver operating in the data protection scenario. In the data distribution scenario, the same event is forwarded from the master DMS data source to another replicated DMS data source, which causes equivalent data structure changes in the replica. The following section describes the data protection scenario.

FIG. 15 begins with the DMS host driver capturing a DELETE event for a file or a directory. This is step 1501. The event is forwarded to the file system data source active object, together with the target object name and timestamp T. This is step 1503. The file system data source object then begins a transaction for the modification of properties in both the target object and its parent. In particular, on behalf of the file system data source object, the object manager opens the parent of the target DMS object and creates a new object version for the parent. The DateTimeEnded property of the previous version of the parent object is set to T, while the DateTimeModified property of the new version is also set to T. This is step 1505. Thereafter, the target object is instantiated, and both the DateTimeTerminated anchor property and DateTimeEnded property at the latest version page are set to T. This is step 1507. The next step is to remove from the latest parent version page the child reference to the target object. This also occurs in step 1507. Once the process is completed, the transaction is committed at step 1509. Any failure results in rolling back the transaction (step 1511) and complete resynchronization of the target object between the host and the DMS (step 1515). Step 1513 illustrates that the process has succeeded.

In a data distribution scenario, as described above a master DMS data source object forwards events and the data stream to a target DMS replicated data source object. The process described FIG. 15 applies in this scenario as well. In particular, the host driver is replaced by a master DMS data source object in a first cluster, and the file system data source (FSDS) object is replaced by a target DMS replicated data source object in a second cluster.

Figure 16:
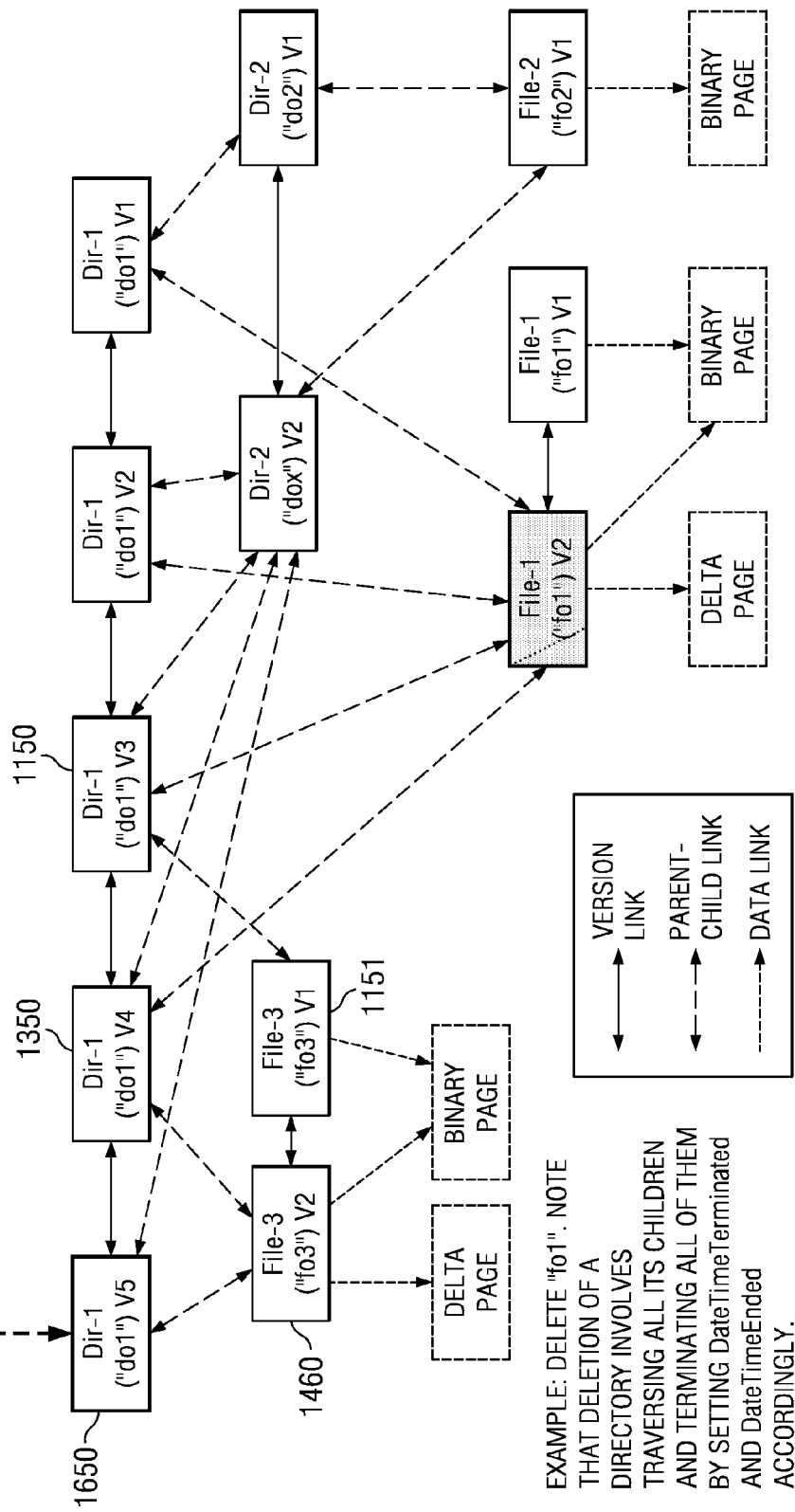
FIG. 16 shows DMS data structure changes upon deletion of a file.

FIG. 16 illustrates the deletion of a file object "fo1" 942 from the file system data source in FIG. 14. Once again, the anchor pages of the objects are not shown. At version 4, "do1" (object 1350) has three children, namely "dox" v2, "fo1" v2, and "fo3" v2. When the DELETE event (to remove "fo1") is detected at time T4, a new version of do1's parent is created, and this new version is object 1650. This new version has its reference to "fo1" removed so that it is no longer linked to the deleted child. The DateTimeEnded property of object 1350 is set to time T4 and the DateTimeModified property of object 1650 is also set to T4.

In the "fo1" file object, the DateTimeTerminated property in the anchor page (not shown) is set to T4 to indicate that the object does not exist beyond T4. The latest version of "fo1," which is version 2 (object 942) is ended by its DateTimeEnded property set to T4. As can be seen, preferably the object "fo1" does not get removed physically from the DMS object store when it is deleted. Instead, its history terminates at T4. Preferably, the DMS object store keeps growing its history until a user explicitly prunes the history, either manually or via retention policy, during which older versions of the active objects get dropped off at the tail end.

Although FIG. 16 shows the deletion of a file, the DMS file system history changes are similar when a directory object is deleted. In particular, a version is added to the parent directory of the target directory with the link between the parent and the target removed, and the target directory is terminated (in the same manner as if a target file object is terminated as illustrated). In deleting a directory, all the directory children should be terminated at once. In particular, the process traverses down the children of the directory object, sets the DateTimeTerminated property (at each anchor page of each child) to the time when the target directory is deleted, and sets the DateTimeEnded property at the latest version page (of all the children) to the same termination timestamp.

Relocating or renaming a File or a Directory

In this section, renaming a file system object refers to changing the name of the object without moving it away from its directory. While relocating a file system object refers to moving an object from one directory to another different directory, the name of the object may also change during relocation. Relocation is a superset of renaming; one can relocate from within the same directory for changing an object's name path. In either case, the destination name either of the rename or relocate operation may already exist and be used by another object, in which case the original destination object is deleted and the target object to be renamed or relocated takes over the destination name.

In some file systems, a MOVE event is used for both renaming a file system object (file or directory) as well as relocating (moving) a file system object from one directory to another. In other file systems, a RENAME event may be used for both renaming and relocating of a file system object. There are also file systems where a MOVE event is used for relocating file system objects while a RENAME event is used for re-labeling (renaming) file system objects. In one embodiment of this invention, both MOVE and RENAME events are treated the same, in other words, both events initiate renaming and relocating of file system objects.

Figure 17:
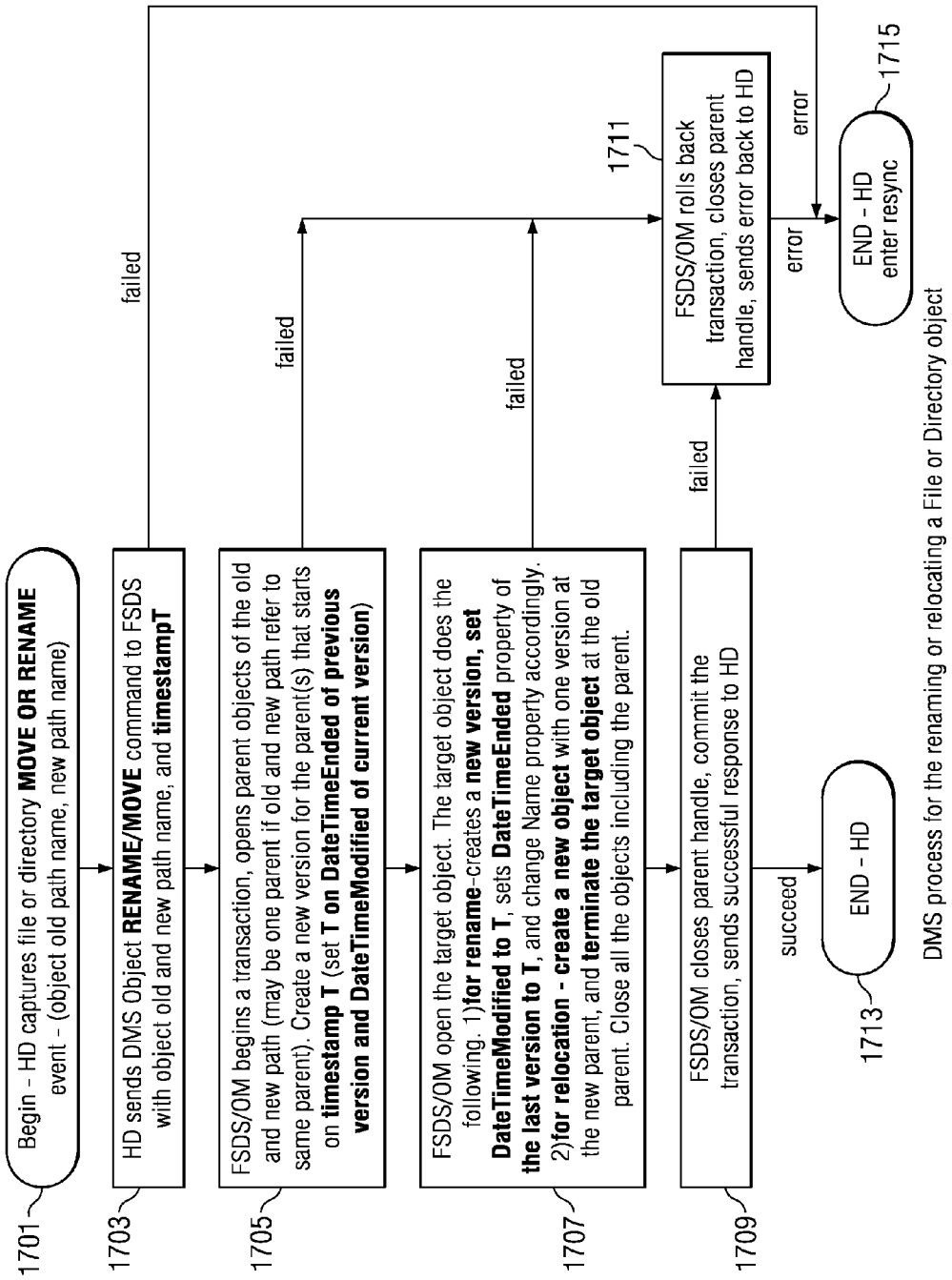
FIG. 17 is a flow diagram illustrating a process of moving a file or a directory

FIG. 17 is a flow diagram illustrating a process of moving a file or a directory. Typically, the process involves a host driver capturing a MOVE or a RENAME event (at step 1701), and passing the event to the DMS file system data source object (at step 1703). The DMS file system data source object then opens the target object (and its parent object(s)) to handle the event. This is step 1705. DMS handling of a MOVE or RENAME event occurs at steps 1705 and 1707; the particular functionality for object relocation varies depending on which object history model is adopted, and the details are discussed in following sections. If step 1707 does not fail, the transaction is committed at step 1709. Step 1713 indicates a success. If, however, a failure occurs during the renaming or relocation process, object resynchronization is performed at step 1711.

As described previously, in the data distribution scenario the host driver in the process flow is replaced by a master DMS file system data source, and the DMS file system data source is a replication data source. Otherwise, the process flow in FIG. 17 is identical.

Figure 18:
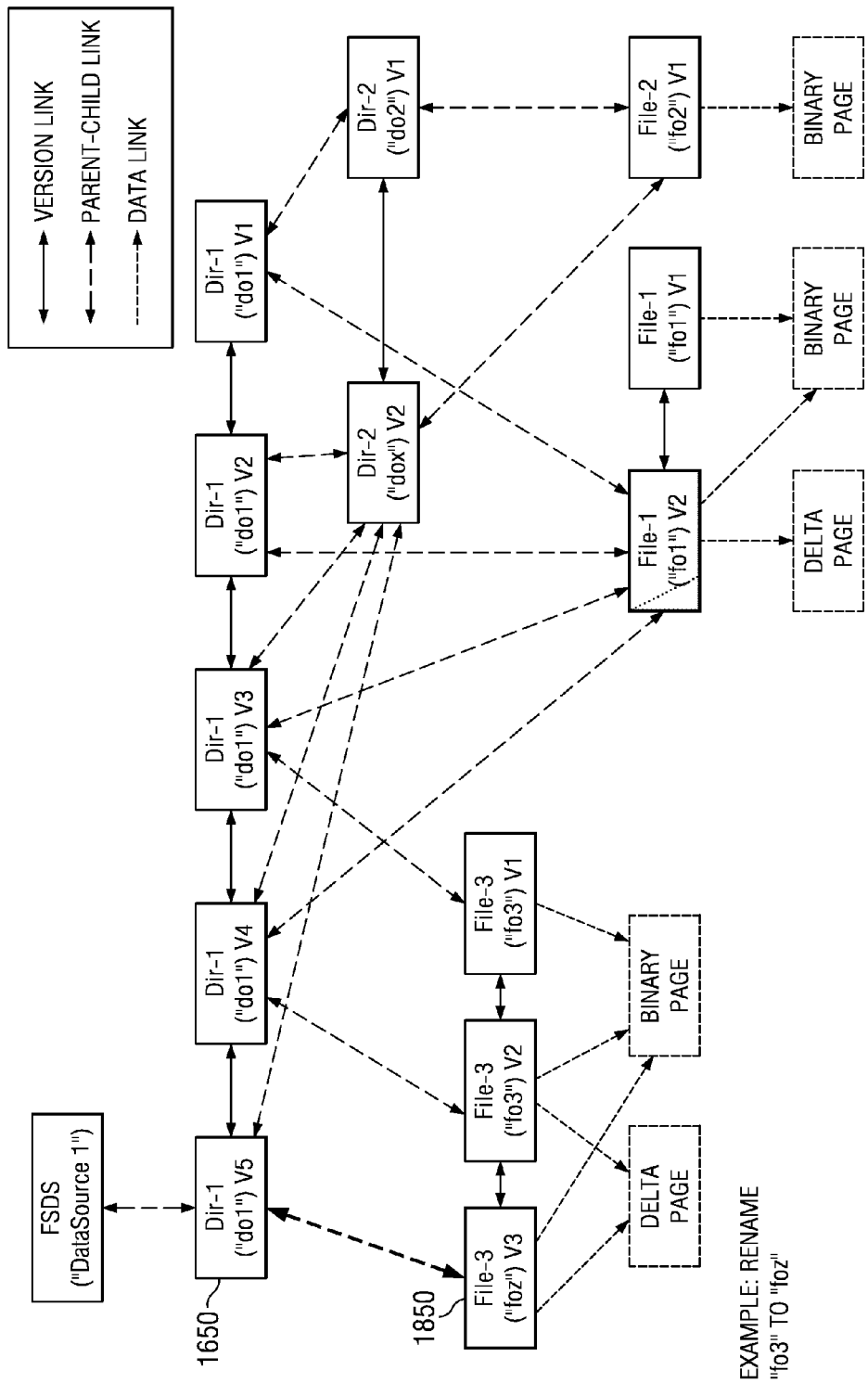
FIG. 18 shows DMS data structure changes when a file is renamed and a parent object does not track a child object name.
Figure 19:
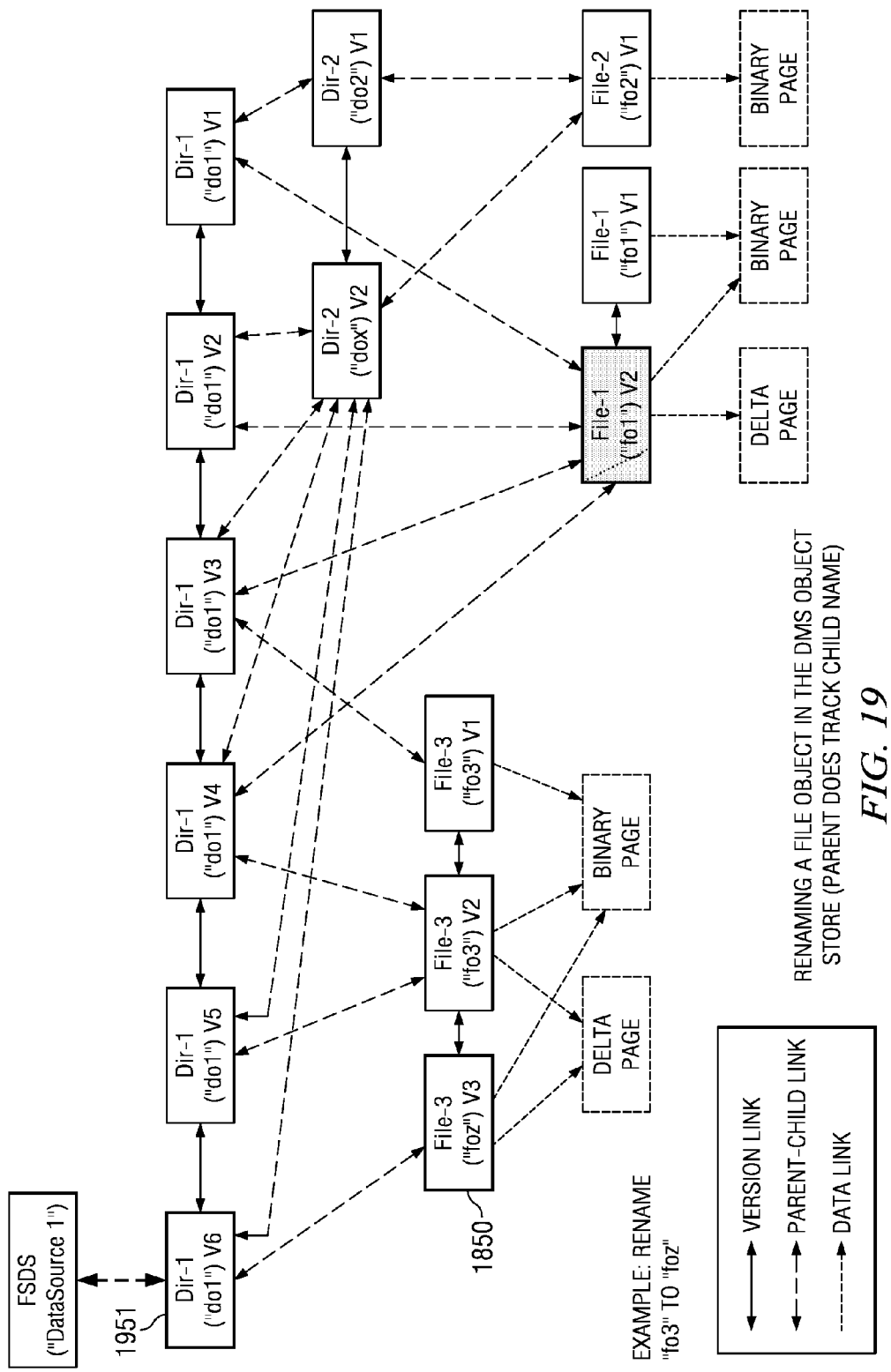
FIG. 19 shows DMS data structure changes when the file is renamed and parent object does track child object name.

FIG. 18 shows DMS data structure changes when a file is renamed and a parent object does not track a child object name; FIG. 19 shows DMS data structure changes when the file is renamed and parent object does track child object name. In both cases the resulting data structures illustrated are built from the data structure in FIG. 16. As before, no anchor pages are shown in the diagrams to simplify the representation. In a rename operation, the target file system object does not move from one parent to another; thus, the process (corresponding to steps 1705 and 1707 in FIG. 17) is relatively straightforward. In such case, the target object is opened, a new version is created with the given timestamp T (i.e., the old version DateTimeEnded property as well as the new version DateTimeModified property are set to T), and the NAME property in the new version is changed to the new name. The new version is object 1850, which is seen in FIG. 18. If object name is not tracked (in the CHILDREN property of the parent directory), the CHILDREN property link (of the last version of the new object's parent) is changed to refer to the new object version (see, objects 1650 and 1850). If, however, object name is tracked in the parent's CHILDREN property, the parent object is opened, and once again a new version of the parent is created. In this case, however, the new version is seen as object 1951 in FIG. 19. Here, the new object name is changed on the CHILDREN property of the new parent version. This process is the same regardless of the whether the target object is a file or a directory. In the two examples (FIGS. 18 and 19), the destination name "foz" does not exist before the rename. In the event "foz" already exists and is owned by another object, a relocate process is used instead of the rename operation.

Figure 20:
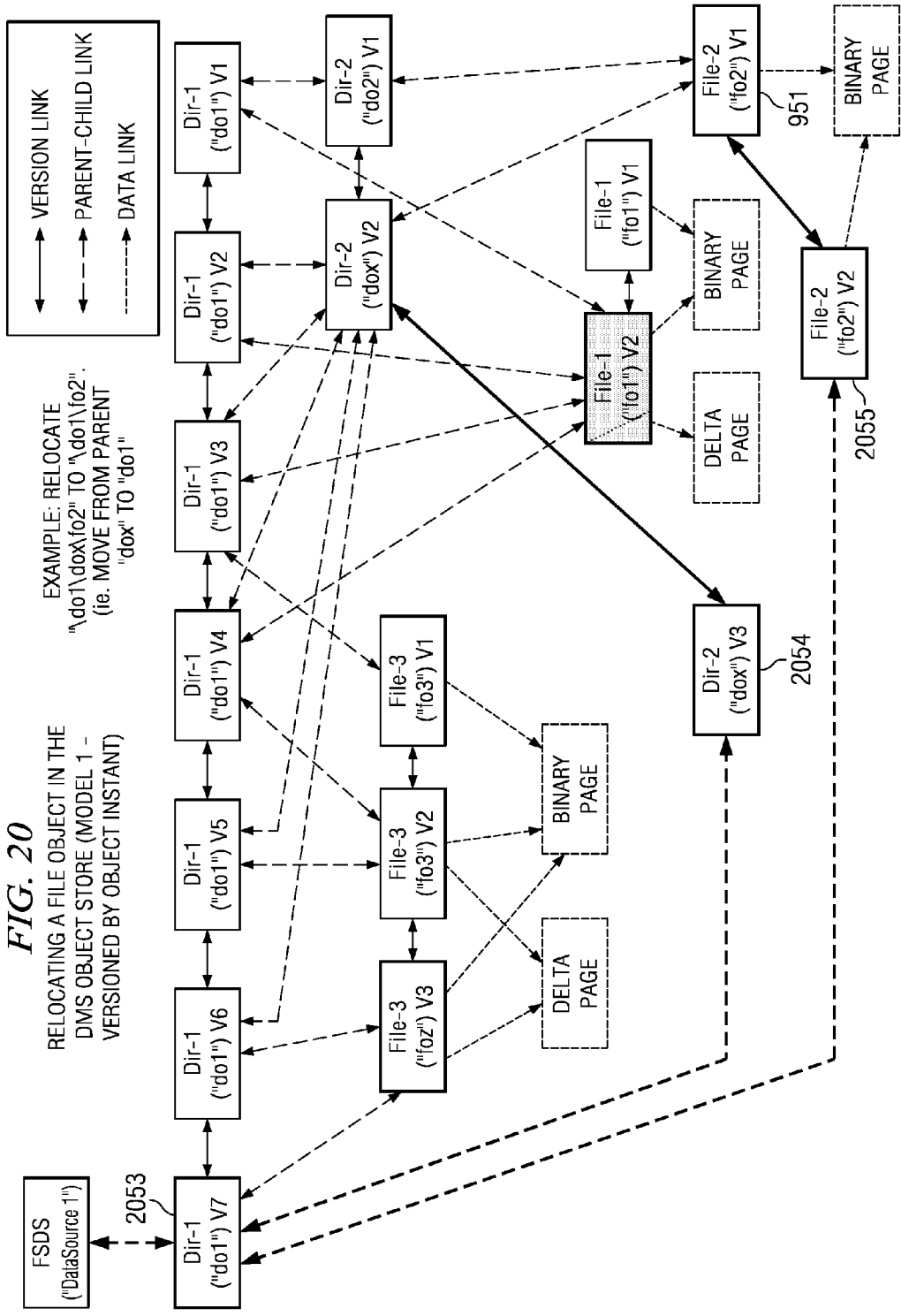
FIGS. 20 and 21 show DMS object structure changes associated with relocating a file object.
Figure 21:
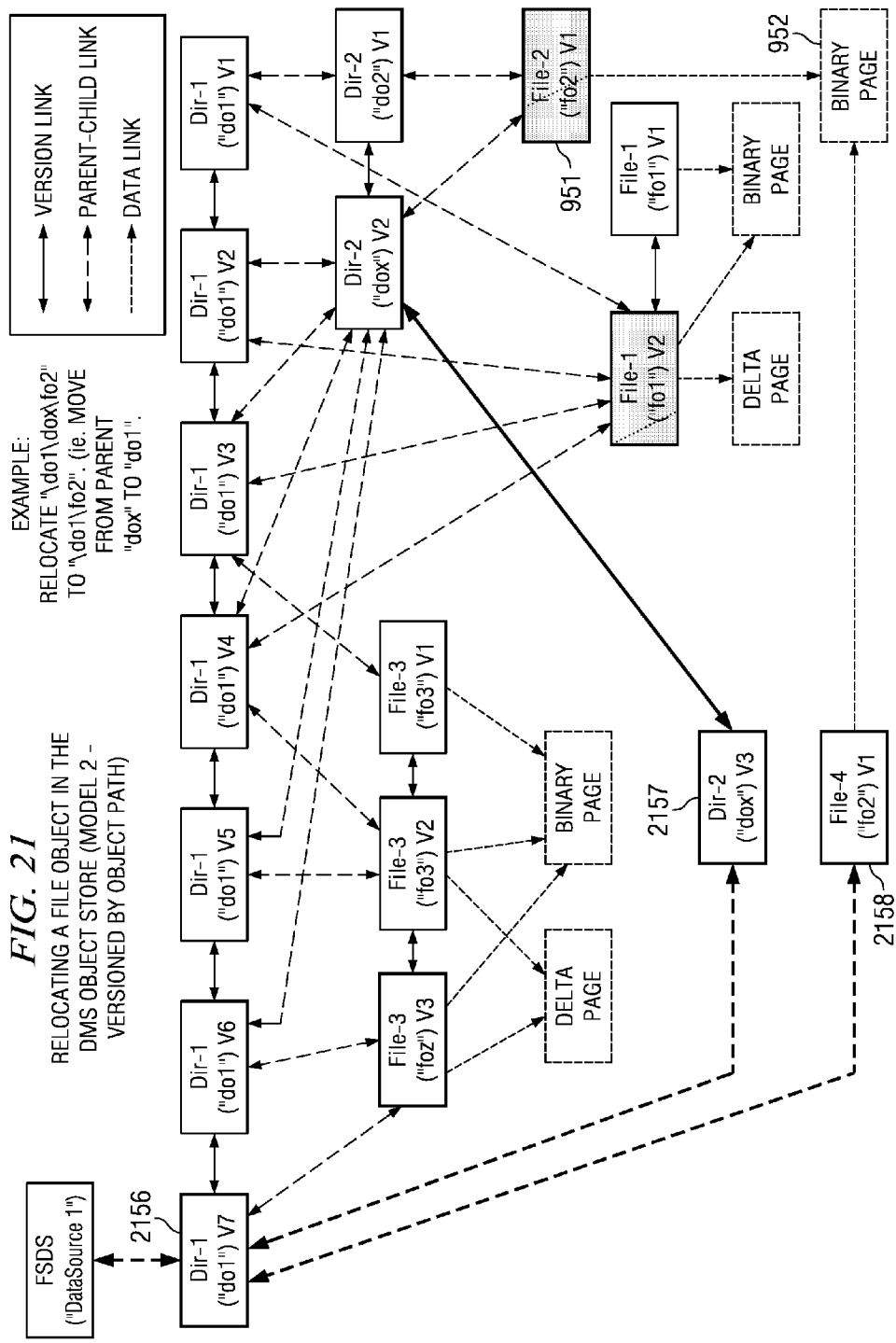

FIGS. 20 and 21 show DMS object structure changes associated with relocating a file object. For convenience, both FIGS. 20 and 21 are built upon the data structure that remains in FIG. 19. No anchor pages are shown in these diagrams to simplify the representation. According to this feature, there are two (2) different models for tracking history of file system object relocation, one (FIG. 20) is versioned by object instant while the other (FIG. 21) is versioned by path.

In FIG. 20 (the versioned by object instant model), object versions are connected across the lifetime of the object regardless of where the object is relocated. Thus, with reference to FIG. 20, for example, when "fo2" relocated from "dox" to "do1," new versions of the affected objects are created. This results in the following new versions: (2055 "fo2" v2), (2054 "dox" v3) and (2053 "do1" v7). The DateTimeModified property of these new versions is set to the time when "fo2" is relocated, and the DateTimeEnded property of the new versions is set to NULL. The DateTimeEnded property of the previous versions is set to the relocation time of "fo2." The most current version of the parent-child link (CHILDREN property) for both "dox" and "do1" are fixed (with FSDS referring to object 2053, and object 2053 referring to object 2054). The parent-child link (object 2054 to object 2055) from "dox" to "fo2" is removed, and parent-child link (object 2053 to object 2055) from "do1" to "fo2" is connected via CHILDREN property in object 2053. In this model, although "fo2" is relocated, its history continues to connect (via VERSION property) back to when it was a child under "dox" (object 2055 and object 951 are connected, and object 2055 is v2 and object 951 is v1). In this case, where an object already exists that owns the destination pathname, the object is terminated (deleted).

In FIG. 21 (the versioned by object path model), object versions are only connected when the object is in the same directory container (i.e., the same parent pathname). When the same object is moved out of the container, a new one is born on the new container, and the old one from the old container is terminated. In FIG. 21, for example, when "fo2" is relocated from "dox" to "do1," a new version of "dox" (object 2157) and a new version of "do1" (object 2156) are created. The parent of "do1," which FSDS 901 is now referring to "do1" v7 (object 2156), and the parent of "dox," which is "do2" v7 (2156), is now referring to "dox" v3 (object 2157). In this model, because object versions are connected only if their path does not change, the path of "fo2" is changed from "\do1\dox†fo2" to "\do1\fo2"; thus, a new object (not version) with first version is created. This is illustrated as object 2158, "fo2" v1. Because this is a new object and has nothing to do with the old one, there is no connection between object 2158 and object 951 (as was the case in the FIG. 20 embodiment). The old "fo2" object (object 951) is "deleted" or "terminated" by having its DateTimeTerminated anchor property set to the object relocation time, and its DateTimeEnded property in the latest version also set to object relocation time. Because objects 951 and 2158 have the same content, they both share the same binary page 952.

Figure 22:
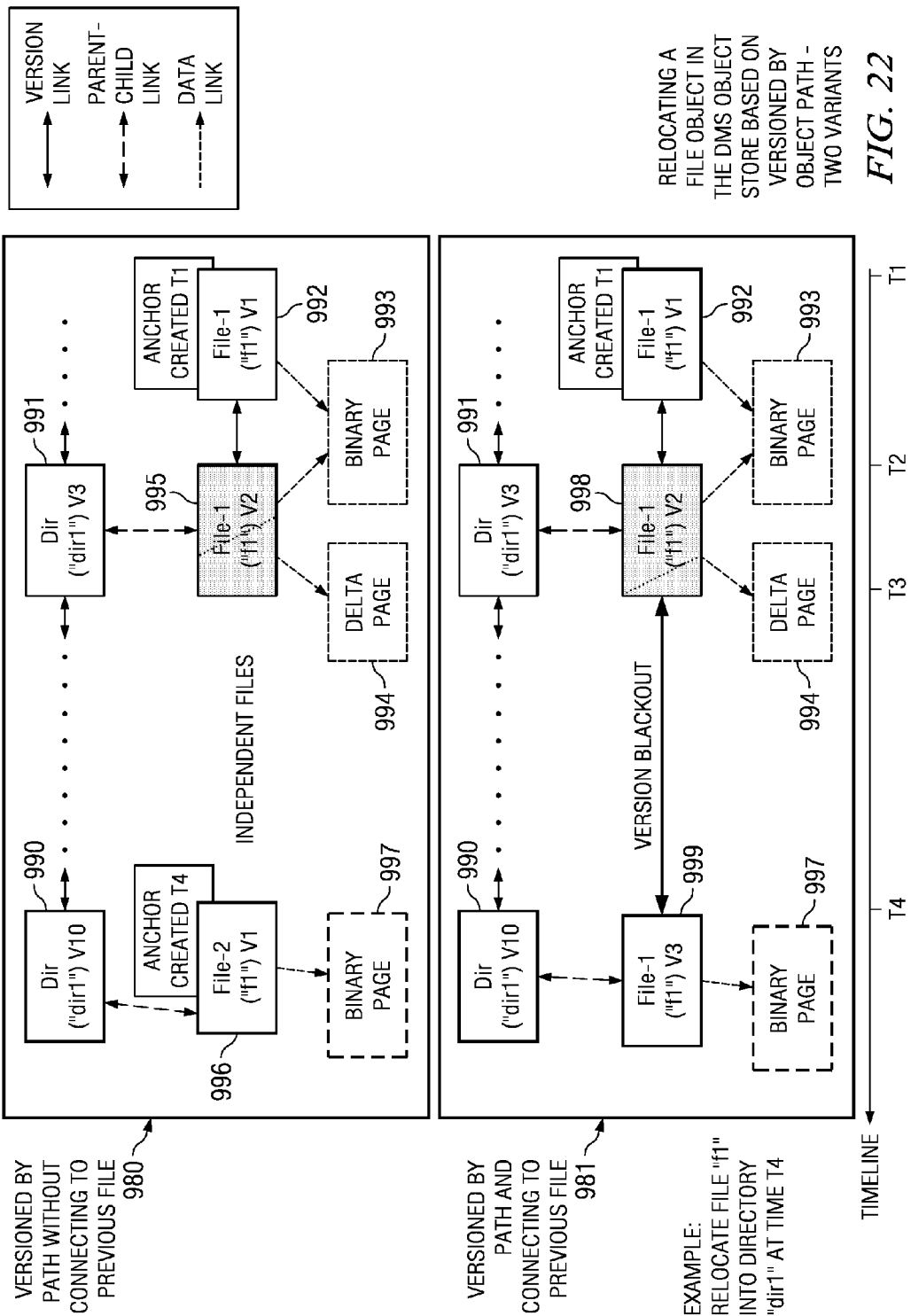
FIG. 22

In the versioned by object path model of FIG. 21, there are two variants of history management structure. These two variants of structure depend on if there exists a file object of the same name in the destination in the timeline. In either case, if an object of the same name already exists in the destination and is still active, the destination object is terminated (deleted). In one variant, indicated by reference numeral 980 in FIG. 22, all objects stand alone and are not connected to the past "deceased" objects. In this example, "f1" is moved into "dir1" at T4. As seen in the drawing, in the past a completely different object of the name "f1" existed; the former object was created at T1, modified at T2, and deleted/terminated at T3. In variant 980, the newly arriving has a new anchor page and a first version page 996 that has nothing to do with object 995. In this structure, if one were to take a snapshot at T4, "f1" would be seen to have only one version. In a second variant, indicated by reference numeral 981 in FIG. 22, objects of the same name in the same path are always connected in versions and share the same anchor page as if they are the same object. For example, in this variant 981, "f1" (object 999) is moved into "dir1" at T4; back before T3, an object of the same name existed but was terminated. In this case, the old object is re-born; its DateTimeTerminated at object 992 is reset from T3 to NULL. No new object is created; instead, a new version page (object 999) is created for the old object to fit in the new file. The DateTimeEnded of object 998 is set to T3 and the DateTimeModified of object 999 is set to T4, so there is a version time gap during which the file never existed. At T4, in this case, there are three versions of "f1" in the entire history.

The DMS may also include a temporary file handling process to minimize storage and bandwidth usage, e.g., by not transferring and storing potentially useless temporary files in the file system history. For example, Microsoft Word creates a temporary file when a Word document is modified. The updates are entered into a temporary file; upon a save event, the temporary file is renamed to the original file name. In this case, preferably creation and/or modification of the temporary file may be avoided; thus, preferably, only when the RENAME occurs are the above relocation process applied and object history linked together by pathname.

The above algorithm implements relocation of a file object; relocation of a directory object is more complex, as a directory may have children. Similar to relocating a file, the history management of relocation of a directory can also be based on model 1 (versioned by object instance) or model 2 (versioned by path). Also, one may connect the relocated object with a dead historical object while versioned by path or without connecting the relocated object with the historical object.

Figure 23:
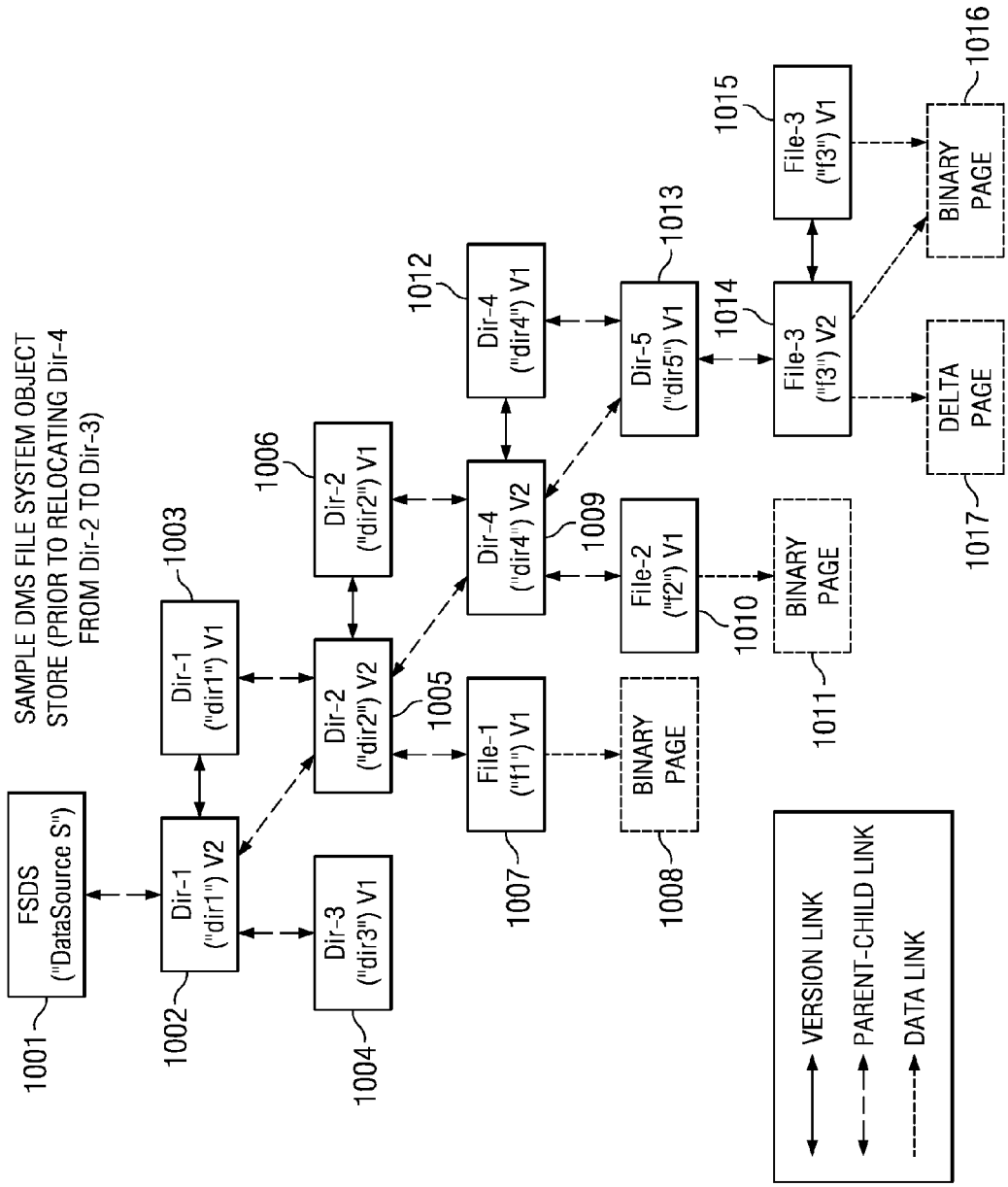
FIGS. 23-26 illustrate the DMS data structure changes during relocation of a directory object, with FIG. 23 illustrating a sample baseline structure.
Figure 24:
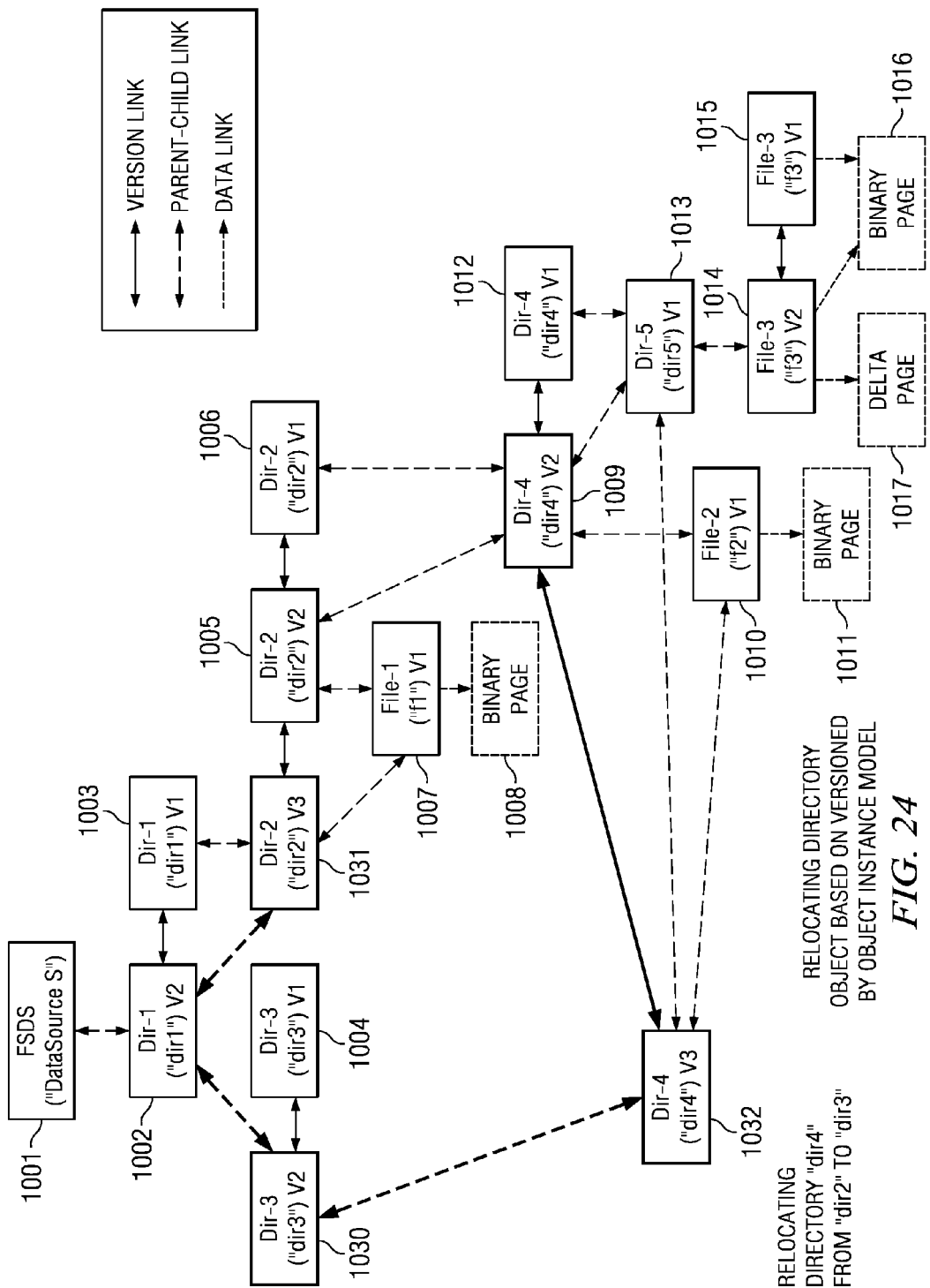
Figure 25:
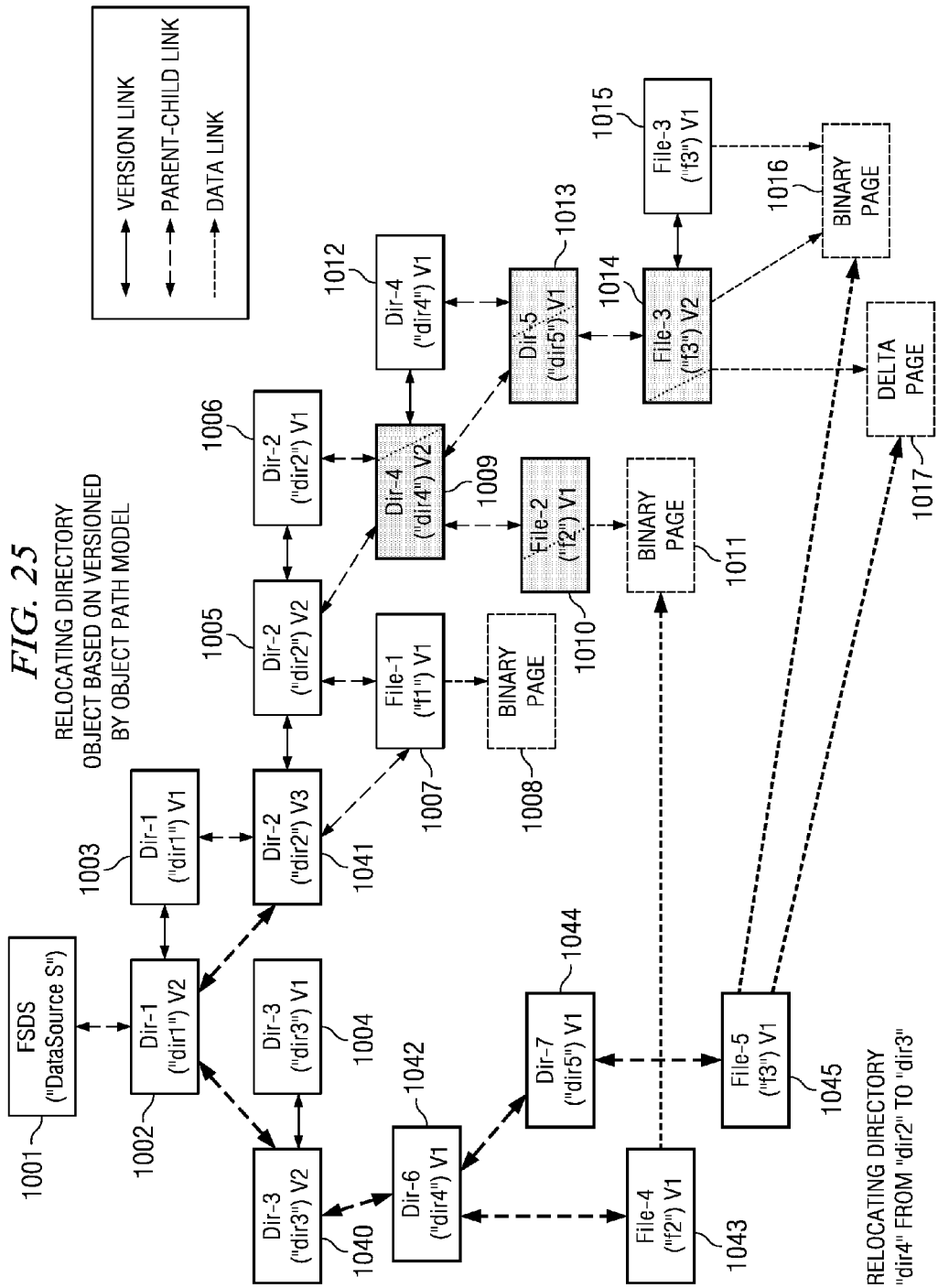
Figure 26:
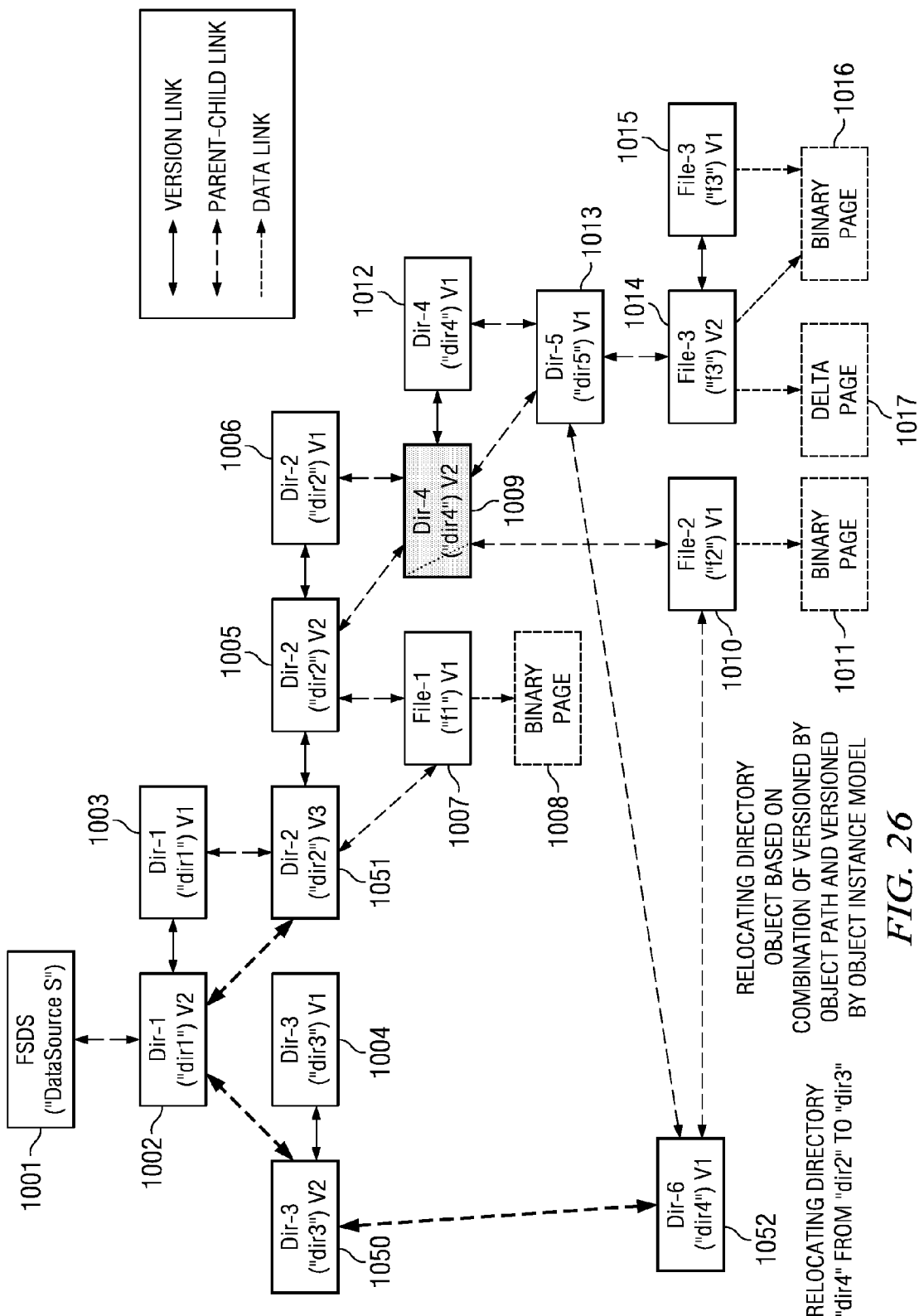

FIGS. 23-26 illustrate the DMS data structure changes during relocation of a directory object. As in the previous examples, these figures do not show the object anchor pages. FIG. 23 illustrates a sample baseline structure. FIG. 24 illustrates a directory relocation based on versioned by object instance model using FIG. 23 as the initial baseline. FIG. 25 illustrates a directory relocation based on versioned by object path model using FIG. 23 as the initial baseline. FIG. 26 illustrates a directory relocation based on a combination of versioned by object path and versioned by object instance, again using FIG. 23 as the initial baseline.

In FIG. 24, "dir4" is relocated from "dir2" to "dir3" using versioned by object instance model and figure FIG. 23 as the baseline. In this case, a new version of "dir2" is created (object 1031) and its CHILDREN property is modified such that it no-longer links to "dir4." The DateTimeEnded of object 1005 and the DateTimeModified property of object 1031 are set to the time when "dir4" is relocated. The CHILDREN property of parent of "dir2," which is version 2 of "dir1" (object 1002), is adjusted to refer to object 1031 instead of object 1005. Note that because there is no addition or deletion to "dir1," there is no need to create a new version. A new version of "dir3" 1030 is created, its CHILDREN reference is added "dir4" version 3 (object 1032), and its DateTimeModified property is set to the time when "dir4" is relocated. The parent reference of "dir3" (which is version 2 of "dir1" 1002) is also adjusted to refer to object 1030. New version of "dir4" 1032 is created with the same CHILDREN reference as its previous version 1009; the NAME property and PARENT property of object 1032 is changed accordingly. Versioned by object instance for directory relocation is straightforward as the version of the children does not have to be adjusted (because the instance has not changed).

FIG. 25 shows relocating of "dir4" from "dir2" to "dir3" using the versioned by object path model. As in FIG. 24, new versions of "dir2" and "dir3" are created with their CHILDREN link, DateTimeModified property, and parent property adjusted accordingly. In this model, when the object "dir4" 1009 is moved, the last version (object) 1009 ended, and the object is terminated; a new object for "di43" is created that has its own anchor page and a first version page 1042. All the descendents of "dir4", namely objects 1010, 1013, and 1014, are also terminated and new corresponding objects (objects 1043, 1044, and 1045) created. The file object "f2" (version 1, 1043) and "f3" (version 1, 1045) refer to the same binary and delta pages for shared content storage usage reduction.

As can be seen, the versioned by object path model has relatively high processing and storage cost when relocating a directory, although it is much simpler to traverse. The alternative is to have a versioned by object path and versioned by object instance hybrid as shown in FIG. 26. In FIG. 26, "dir4" version 2 (object 1009) is terminated when it is relocated from "dir2" to dir3," a new object "dir4" 1052 with a new anchor page and first version page is created. A new version is created for both "dir2" 1051 and "dir3" 1050, and their parent link is fixed. The new version of "dir3" (1050) refers to version 1 of the new object 1052, while version 3 of "dir2" (1051) no longer refers to "dir4." New NAME property may be entered into object 1052 as relocation may also change the name of the directory. The descendents of "dir4" do not change in this case.

Point-in-time Recovery with Guaranteed File System Structure Consistency and Integrity The following section provides additional details regarding how to generate a point-in-time snapshot or recovery with guaranteed file system structure consistency and file content integrity.

As described above, the DMS continuous real-time object store captures all real-time activities, with associated object metadata information. Thus, the DMS is capable of reintroducing any point-in-time view of data ranging from a granular object to the entire file system. It is also capable of producing application consistent data because consistent events are captured and stored.

The algorithms described above for generating and maintaining a file system history in the DMS always ensure that the latest version of a directory always refers to the latest version of its children until the directory changed. This means that the DateTimeEnded of a parent version can only be the same or prior to the DateTimeEnded of its children, namely:

DateTimeEnded (a version of a parent)=<DateTimeEnded (the reference version of its child)

Figure 27:
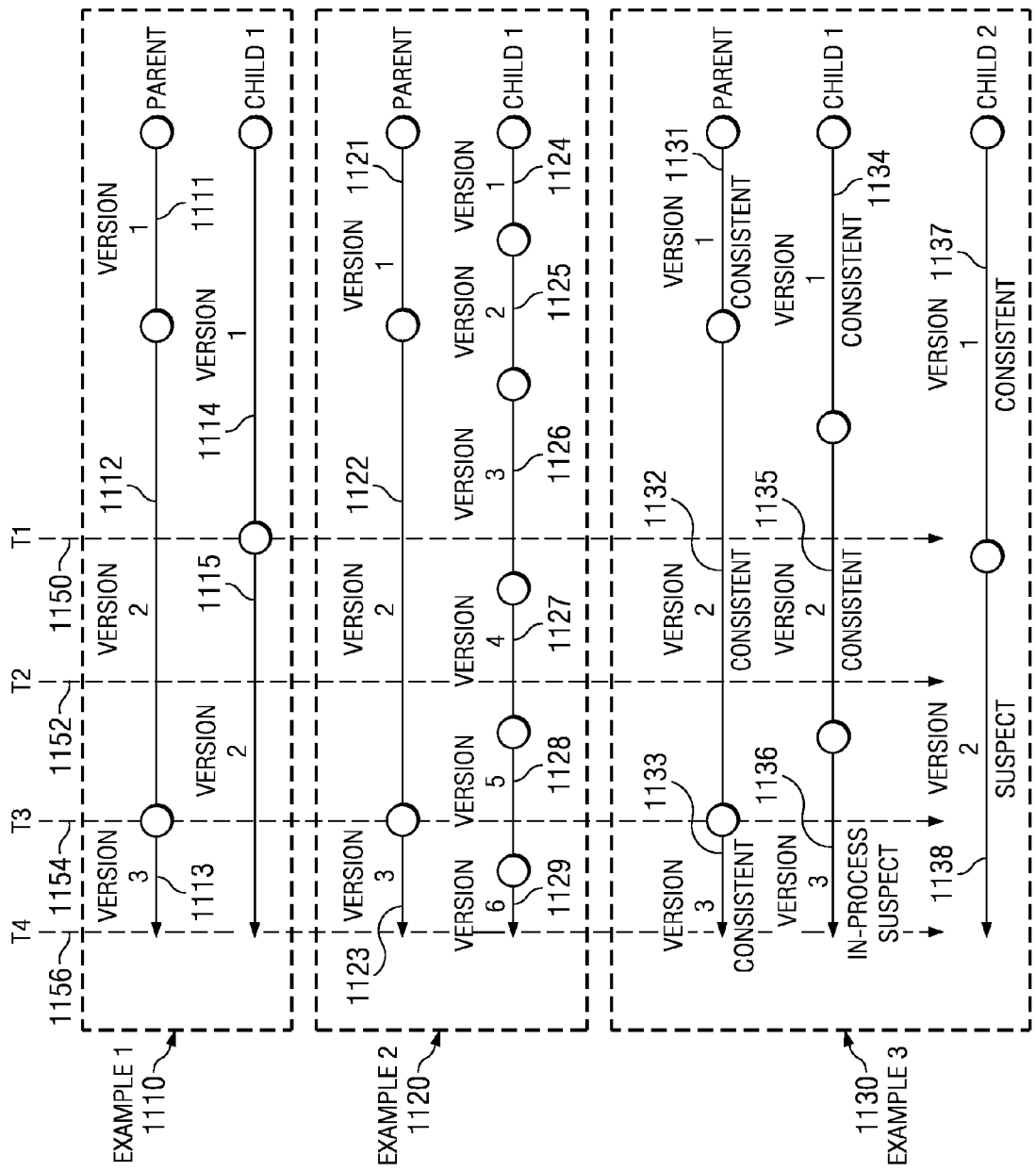
FIG. 27 illustrates a parent-child version timeline.

FIG. 27 illustrates the parent-child version in a timeline.

In example 1110, version 1 (1111) of the Parent is referring (by the CHILDREN property) to version 1 of Child (1114) until the Parent changes, which may be an addition of a new child. The new version (i.e. version 2, 1112) of the Parent continues to refer to version 1 (1114) of the Child until the Child changed, which changed the Parent's CHILDREN property to refer to version 2 of the child (1115). So, before time T1 (1150), version 2 (1112) of Parent refers to version 1 (1114) of Child 1, and after T1 (1150), version 2 (1112) of Parent refers to version 2 (1115) of Child. At T3 (1154), the Parent changed again, so version 3 (1113) of Parent is created and continues to refer to the latest Child 1, which is version 2 (1115). As one can see, at the end of Parent version 1 (1111), the CHILDREN property of the parent refers to Version 1 of Child 1. The DateTimeEnded of 1111 is prior to that of 1114. The DateTimeEnded of 1113 and 1115 are NULL simply because these versions are either in the process of being modified (in memory, or state is Suspect), or they are already modified successfully (even though the version has not be changed and the content is still valid at the current time).

In example 1120, Child 1 is modified three times (1125, 1126, and 1127) during the version 2 (1122) lifetime of Parent. Again, at the end of each version of the parent, the DateTimeEnded of the Parent is before the DateTimeEnded of Child 1.

Example 1130 shows versions of two children corresponding to the Parent. Suppose one wants to reconstruct the snapshot view of the file system at T1. At time T1, the correct version of the Parent is version 2 (1132); this is because the T1 is within range of DateTimeModified and DateTimeEnded of 1132 of Parent. If one would to navigate down from Parent to Child 1 using the most current data structure, 1132 (version 2) is referring to version 3 (1136) of Child 1. Because version 3 (1136) of Child 1 has a DateTimeModified that is much later then T, one must traverse back the history to locate the T1 point-in-time version of Child 1. By referring back to the previous version, version 2 (1135) can be located, and that T1 in this case, is within the time range of this version. Same for Child 2, the version of Child 2 connected to 1132 is version 2 (1138), one must traverse backward to locate an older version that covers T1, that older version would be version 1 (1137).

While traversing a DMS file system history to generate a point-in-time snapshot of a file system for recovery (the algorithm is discussed below), one should consider the consistency of the recovered data in the application point of view. There are file systems that contain only files that are individual owned by different applications; these files have nothing to do with one another and at any moment in time some of them are partially modified. The only time this type of file is guaranteed to have integrity is when the files are flushed and closed. There are also file systems that are used by applications that own a group of files; the only time that these files are consistent is when the applications generate a checkpoint or when the applications are shutdown. There are also files that are opened for update most of the time and rarely closed. There are yet some applications that can handle any partial update, in which case, a snapshot data of an exact point-in-time may be desired during recovery.

The current invention provides three different types of recovery consistency and integrity characteristic for different application needs. File object state is a key for determining recovery consistency.

In one embodiment of the current invention, there are two major states—Suspect or Consistent. The state of a version of a file object is Suspect when the version is still being worked on (in process, being modified), in which case, the object is opened, or when the version is closed (modification completed) but a version is not generated and therefore the consistency of the file is in question. Consistent state is when a file object version is completed, and that the version is generated as a result of a CHECKPOINT or CLOSE. In an alternate embodiment, there may be more then two states with object version generated by CHECKPOINT and CLOSE being recognized as two different states. In each version, content changes to all the files are entered in chunks or in the form of a delta string preserving the write order and tracked with sequence numbers. The host driver knows the application behavior and decides if the changes to a file must be sent immediately, or if it is fine to accumulate the changes for delta reduction. For example, preferably a database page should be accumulated and sent in full, not partial.

Figure 28:
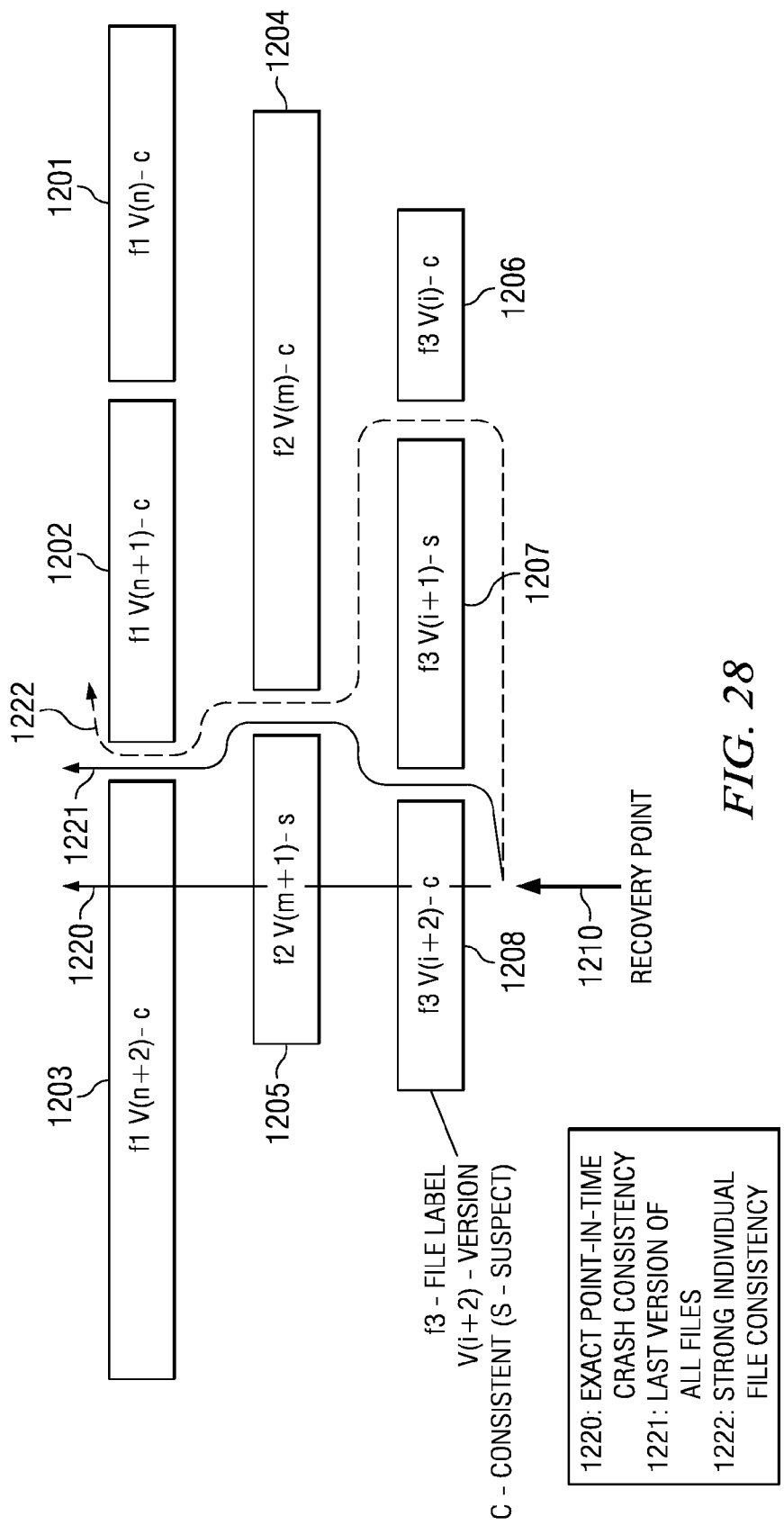
FIG. 28 illustrates strong individual file integrity recovery.

For data recovery, the current invention is capable of re-constructing a snapshot of any point-in-time in the past with any of three possible recovery consistency characteristics— 1) strong individual file integrity, 2) exact point-in-time crash consistency, and 3) last version of all files. Strong individual file integrity recovery (FIG. 28, line 1222) is capable of supporting file systems where individual files are owned by and constantly being updated by different applications, when at any point-in-time there are always partial updates to some files. This recovery searches for the latest version of each individual file, prior to the recovery point, that is "consistent," such that none of the recovered file is partially updated and therefore, none of the recovered file is corrupted. This recovery also recovers database files by locating the consistent versions at CHECKPOINT events. Exact point-in-time crash consistency recovery (FIG. 28, 1220) locates the latest version and applies only changes after the last version up to the recovery point to reconstruct the exact image of the file system at the recovery point. This type of recovery is only possible when the host driver does not buffer the changes and write-order of all changes is preserved. An application that can handle partial updates would be able to recovery its data to the selected recovery point without any data lost with this recovery (1220). Last version of all files (FIG. 28, 1221) recovers all the files up to the latest version regardless of whether the state of the file is consistent or suspect. The goal for (1221) is to recover to a latest version, although the suspect version are not generated by a consistency event and therefore may be inconsistent; this recovery (1221) provides an option to recover to the latest version in case the suspect version may be consistent.

These innovative ways of recovery are useful for all types of applications that use a file system as storage media; the existing conventional solutions are not capable of providing this varied type of recovery characteristic all at once.

Figure 29:
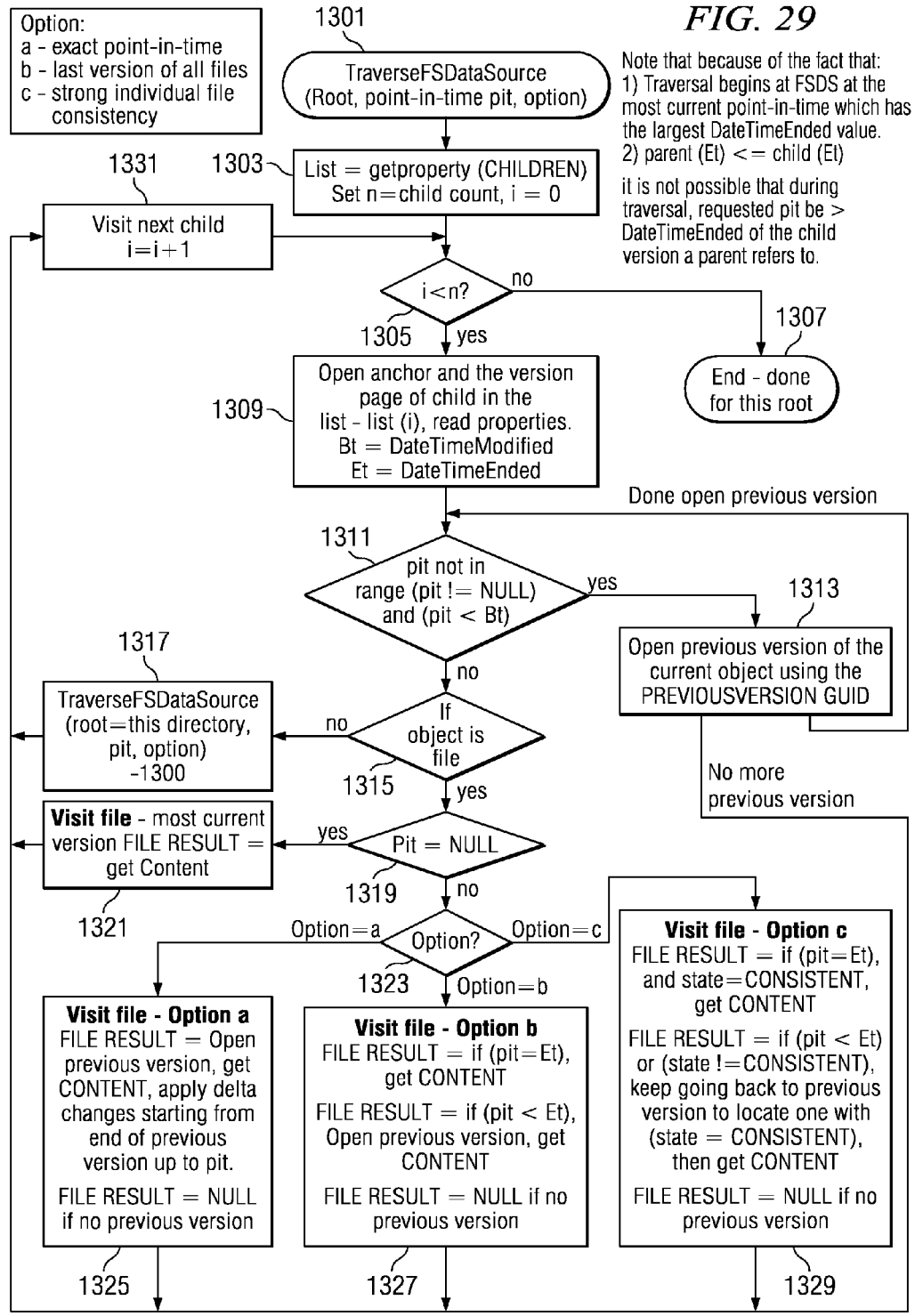
FIG. 29 illustrates a file traversal process.

FIG. 29 illustrates the traversal process that traverses from a root (starting from file system data source) down the entire tree visiting each file and directory either at 1) latest version with point-in-time (pit) set to NULL or 2) a point-in-time of any value in the past. For (2), there are also options to traverse and access all the objects with (a) exact point-in-time crash consistency, (b) last version of all files, and (c) strong individual file consistency. These options do not apply to traversal of latest version because a latest version may be live and consistently being modified.

One can begin traversing a data source by starting the process at 1301 with root set to a specific DMS file system data source (FSDS), and both pit and option set accordingly. The first step the process does it to get all the children from the current root (1303). If one would to begin from the FSDS, the list of children retrieved are the most recent version, so if pit is not NULL, it must be prior to the DateTimeEnded timestamp of the children. Note that DateTimeEnded of the children may be NULL, it which case, it just means that the DateTimeEnded is sometime in the future (not ended yet). Starting from 1305, the process iterates all the children in the list (of this current root). When all the children are visited, the process ended for this root (1307). At step 1309, the process open up the object, which includes opening of the anchor and the version page that is referred to by the current root, and BT is set to DateTimeModified, ET is set to DateTimeEnded of the current version of the opened child object. Step 1311 is for version time check, if the requested traversal time (pit) is for a specific point-in-time in the past (i.e., pit!=NULL), and that pit falls in a older version of this object (pit<BT), then the process opens the previous version of this current child (1313). At 1313, if there is no previous version, then the object does not exist at the requested point-in-time, the process move on to the next child (1331), otherwise, the process move back to 1311 to perform time check again. If requested traversal time is current (i.e. pit=NULL) or pit falls within the current opened version, then the process moves on to 1315. At 1315, object type is check. If the object is a directory, then the entire 1300 process is used to traverse the child directory, with the root set to this directory (1317), 1300 is a recursive process until the entire FSDS is traversed. When a child directory is completely traversed, the processing thread of traversing the child directory ends at 1307, and returns to 1317 of the parent's thread, and the process at the parent's thread moves on to the next child 1331. If the current child is a file object, and the traversal time is current (pit=NULL), 1319 branched to 1321 to "visit" the current file content. If the traversal time is set to a point-in-time in the past, then the traversal process checks the traversal options 1323. If option "a" is requested, the content at the exact pit is desired, in which case, the version prior to the current opened version is opened, changes from the prior version up to the desire pit is applied, and that would be the content "visited". If there is no prior version, then there would be no content to be visited (ie. file result=NULL), 1325. If option "b" is requested, then a completed version prior to pit is desired. If the current version is not ended, the process moves backward to an older version, the content of a full version is "visited", and if there is no full version, the visited content would be NULL, 1327. If option "c" is requested, then a full completed version that is consistent is requested. If current version is not ended, the process moves backward to an older version that is consistent (i.e. state=CONSISTENT) to visit its content, 1329. The process may move back several older versions to locate a consistent one. If no consistent version is found, then the file is considered to be none existing for the pit (file result is NULL) 1329.

Figure 30:
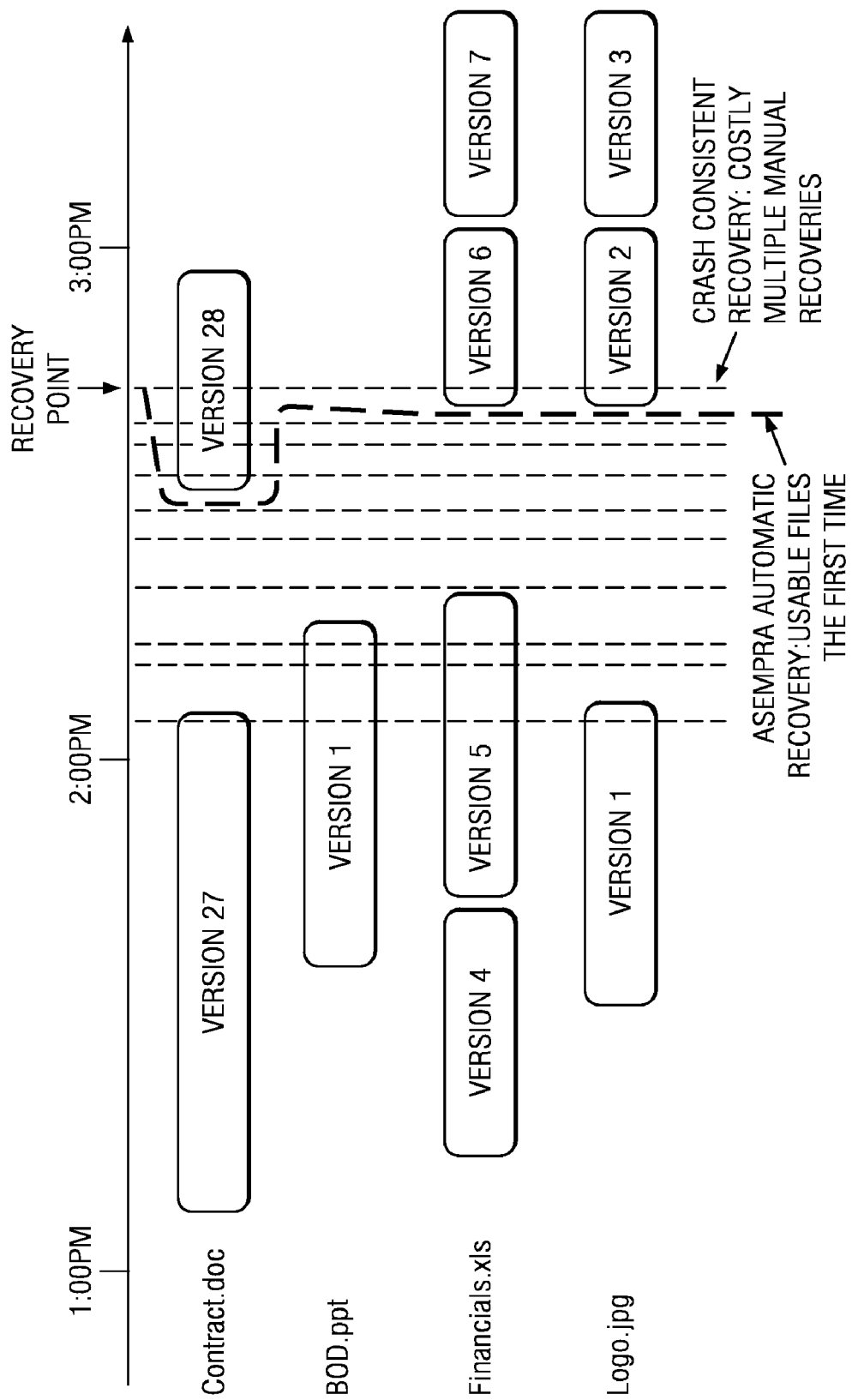
FIG. 30 illustrates how the subject disclosure provides any point-in-time file system recovery with guaranteed structure, content consistency and integrity.

FIG. 30 illustrates how the subject disclosure provides any point-in-time file system recovery with guaranteed structure, content consistency and integrity.

While the present invention has been described in the context of a method or process, the present invention also relates to apparatus for performing the operations herein. In an illustrated embodiment, the apparatus is implemented as a processor and associated program code that implements a finite state machine with a plurality of states and to effect transitions between the states. As described above, this apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While the above written description also describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Having described my invention, what I now claim is as follows.

What is claimed is:

1. A machine-implemented data management method, comprising:
   capturing, in real time, application data transactions of a data source;
   deciding whether to accumulate the captured application data transactions;
   receiving, from the data source, an application-aware data stream formed from the captured application data transactions;
   wherein the received application-aware data stream represents a continuous real-time history of the data source;
   wherein the received application-aware data stream comprises:
      events;
      metadata; and
      data changes;
   storing in a data store the continuous real-time history of the data source, or a component thereof, as an object-oriented logical representation;
   dynamically restructuring the object-oriented logical representation in response to one or more events occurring in the continuous real-time history;
   wherein, for a relocation event, the dynamic restructuring comprises relocating based on object instance where object versions connect across at least a portion of a lifetime of an object wherever the object is relocated; and
   using the object-oriented logical representation to provide an any point-in-time recovery of the data source;
   wherein the any point-in-time recovery of the data source has a recovery consistency characteristic.

2. The method of claim 1 wherein the object-oriented logical representation comprises at least a set of version metadata pages, and a set of one or more links that associate the version metadata pages of the set of version metadata pages.

3. The method of claim 2 wherein the object-oriented logical representation further comprises the entire binary content of a file associated with the data source.

4. The method of claim 2 wherein the object-oriented logical representation provides an n-dimensional logical representation of the data source at a given point in time.

5. The method of claim 1 wherein the data source is physically remote from the data store.

6. The method of claim 5 wherein the continuous real-time history of the data source provides one of: a data protection service and a data distribution service.

7. The method of claim 1 wherein the any point-in-time recovery of the data source includes recovery of one of: a file, a sub-directory, a file system volume, and a set of files that belong to a database.

8. The method of claim 7 wherein the set of files that belong to the database span one or more volumes.

9. The method of claim 1 further including extracting an audit trail from the data source identifying, for a given object, a change and an identifier associated with a user who initiated the change.

10. The method of claim 1 wherein capturing application data transactions occurs on the data source.

11. The method of claim 1 wherein capturing application data transactions occurs on a network data-source data path.

12. The method of claim 1 wherein exact point-in-time crash consistency constructs an image of the data source at a recovery point by obtaining a latest version and applying changes after the latest version and up to the recovery point.

13. The method of claim 1 wherein last version of all files in the data source recovers all files up to a latest version regardless of whether a state of a given file is consistent or suspect.

14. The method of claim 1, wherein the recovery consistency characteristic is selected from the group consisting of: strong individual file integrity, exact point-in-time crash consistency, and last version of all files.

15. The method of claim 1, wherein, for the relocation event, the dynamic restructuring comprises relocating based on object path where object versions connect when an object associated with a directory remains in the directory when relocated.

16. The method of claim 1, wherein, for the relocation event, the dynamic restructuring comprises relocating based on a combination of object path and object instance.

* * * * *